United States Patent [19]
Russell et al.

[11] 4,195,920
[45] Apr. 1, 1980

[54] GOLF GAME PROJECTOR

[75] Inventors: Jack A. Russell, Spring Lake; Goodrich B. Pratt, Grand Haven; Anthony J. Gretzky, Muskegan, all of Mich.

[73] Assignee: Brunswick Corporation, Skokie, Ill.

[21] Appl. No.: 758,353

[22] Filed: Jan. 10, 1977

Related U.S. Application Data

[62] Division of Ser. No. 618,002, Sep. 30, 1975, Pat. No. 4,168,115, which is a division of Ser. No. 426,505, Dec. 20, 1973, Pat. No. 3,924,122, which is a division of Ser. No. 69,768, Sep. 4, 1970, Pat. No. 3,802,614.

[51] Int. Cl.$^2$ .............................................. G03B 27/00
[52] U.S. Cl. .................... 353/26 A; 250/233
[58] Field of Search ................. 353/26 R, 26 A, 25; 250/233

[56] References Cited
U.S. PATENT DOCUMENTS 3,907,415  9/1975  Sone et al. ........................... 353/25

*Primary Examiner*—Steven L. Stephan
*Attorney, Agent, or Firm*—John G. Heimovics

[57] ABSTRACT

A visual display system selectively operable to display, upon command, any one of a plurality of different bits of information. The exemplary embodiment is intended for use in an indoor golf game to display scenes representing perspective views of any one of a plurality of different locations on any one of a plurality of different holes on a golf course. The system also includes a ball spot projector for projecting a spot of light on the projected scene in a manner to simulate the trajectory of a golf ball in flight. The scene selection system is a digital servo system for economy and reliability and is operative to minimize film fading on frequently used scenes such as a scene depicting the view from the tee on a golf hole and is further operative to reduce fading of any particular scene due to prolonged exposure by automatically shifting to an advertising scene or the like when the scene selection has not been made after a predetermined time.

7 Claims, 37 Drawing Figures

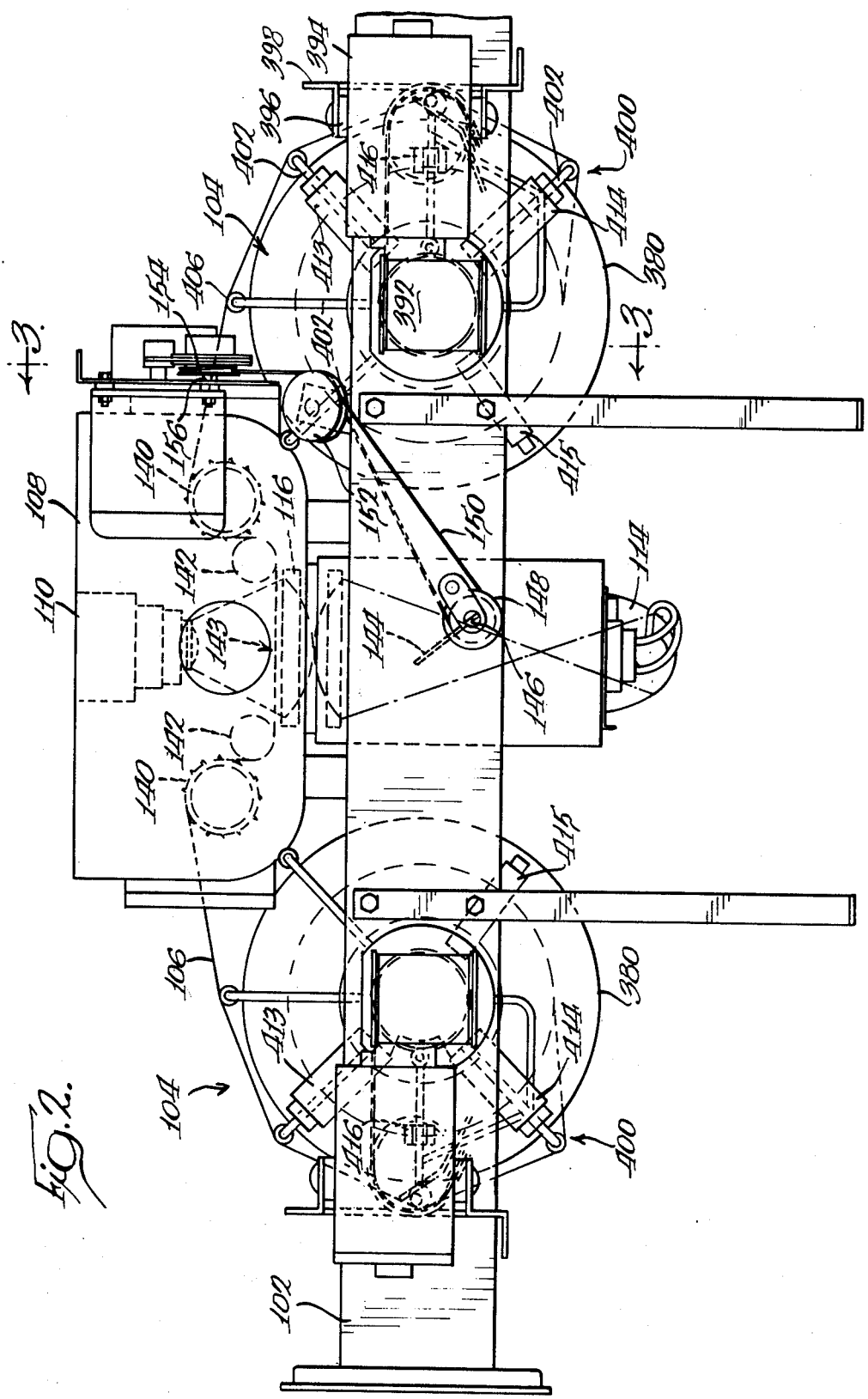

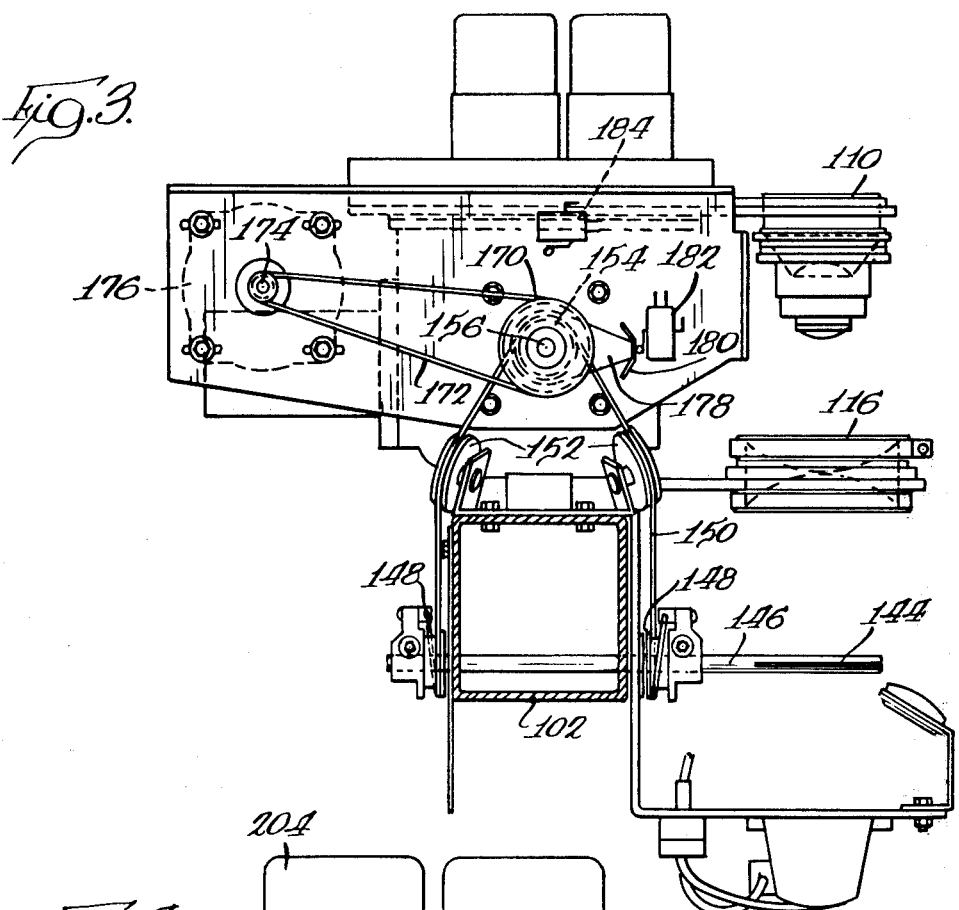
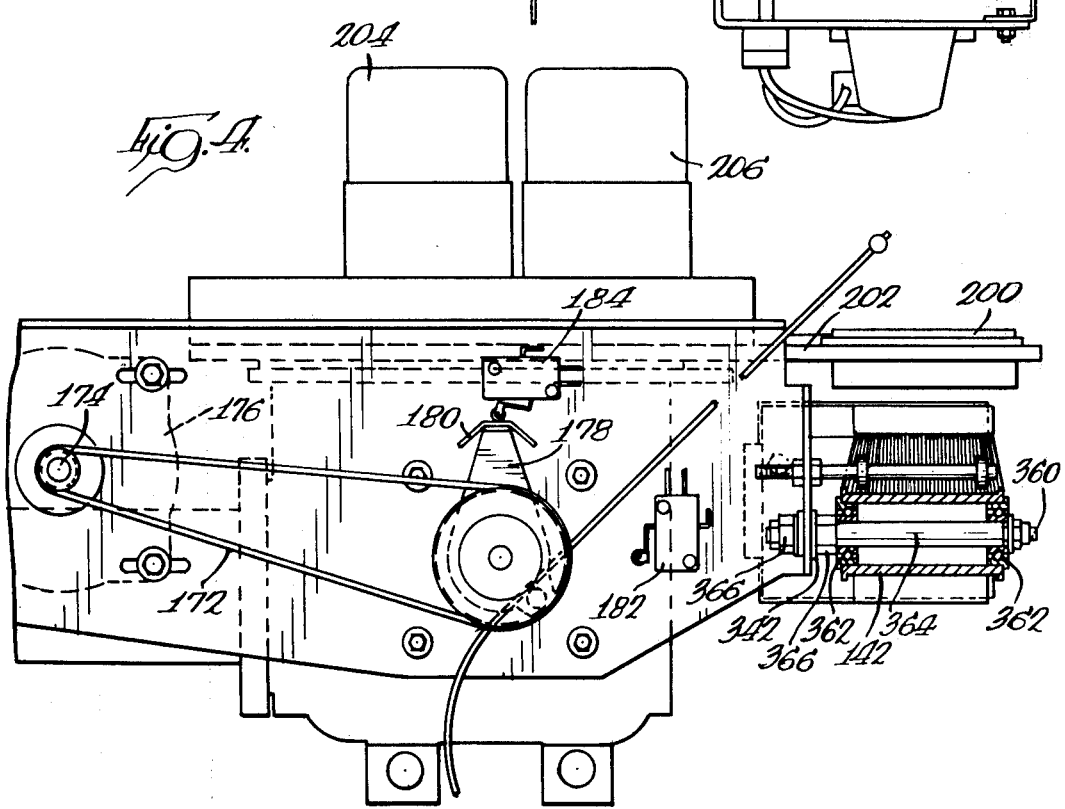

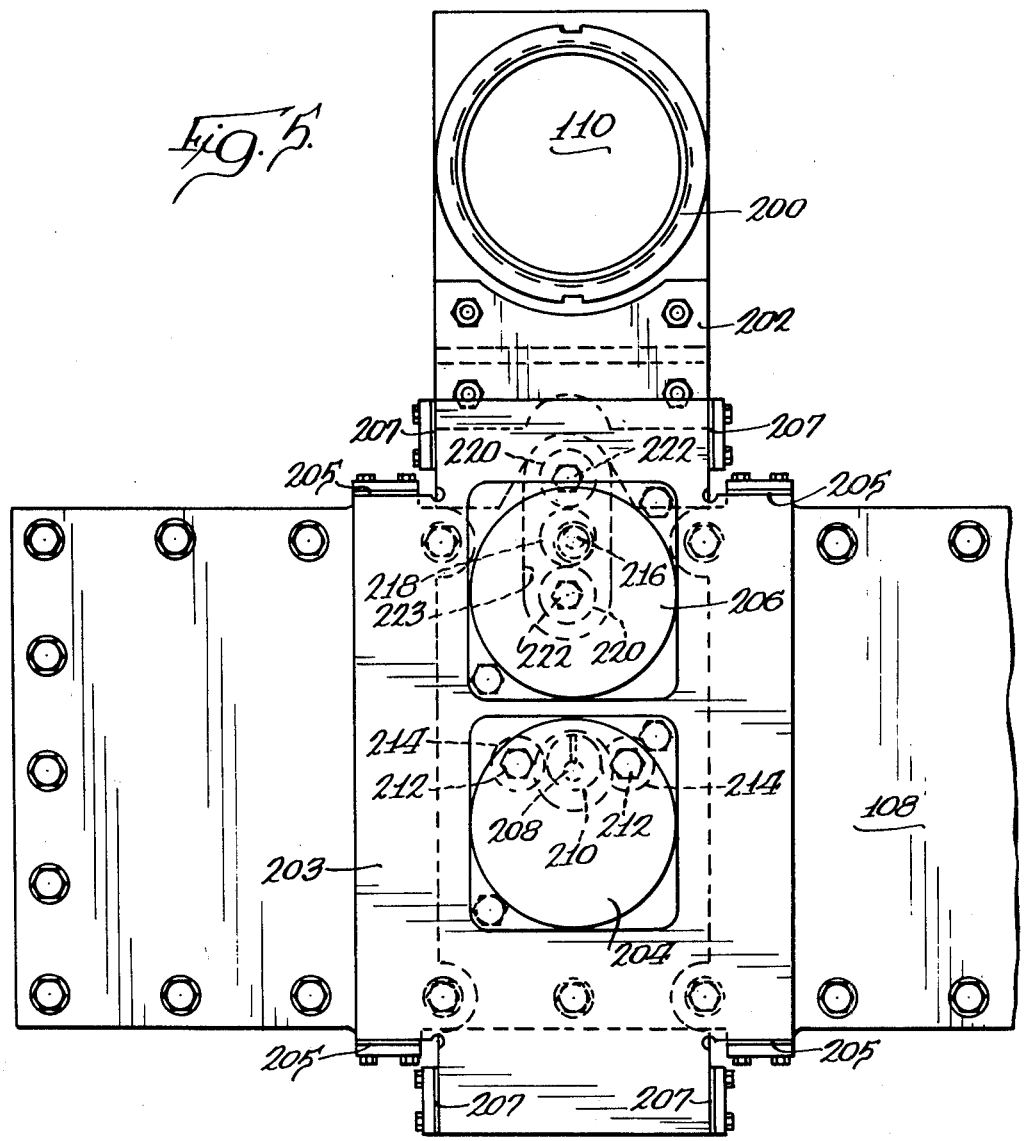

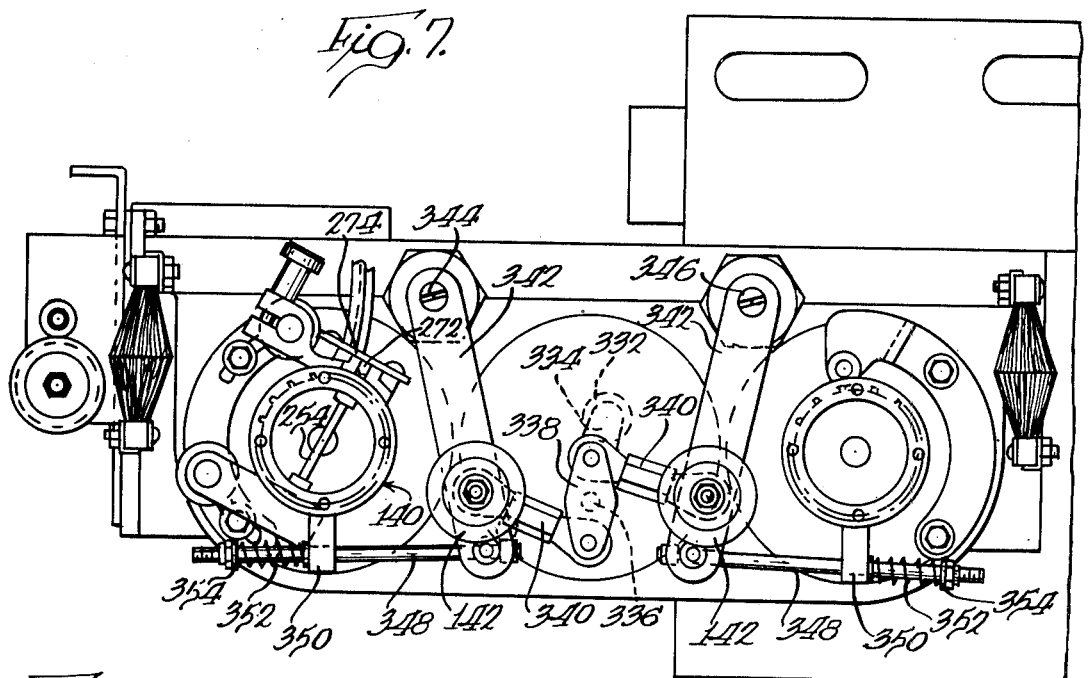
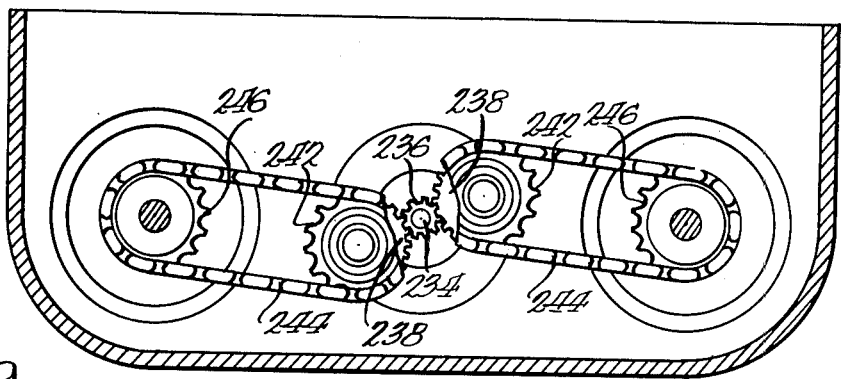
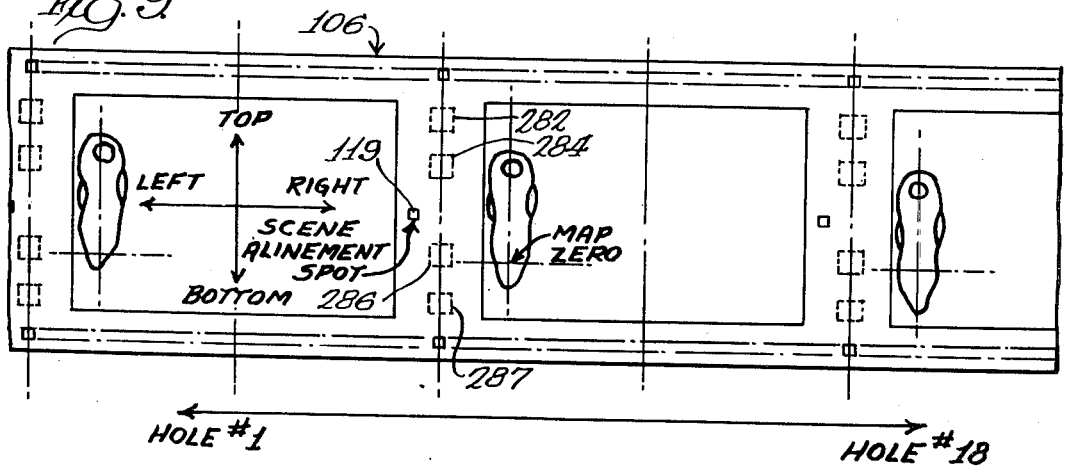

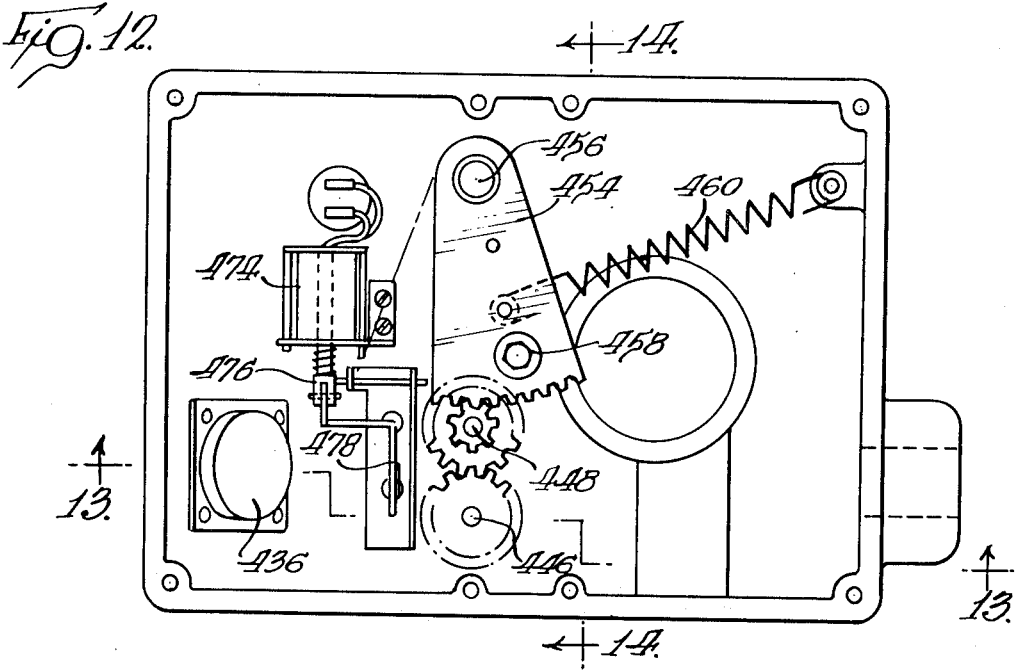
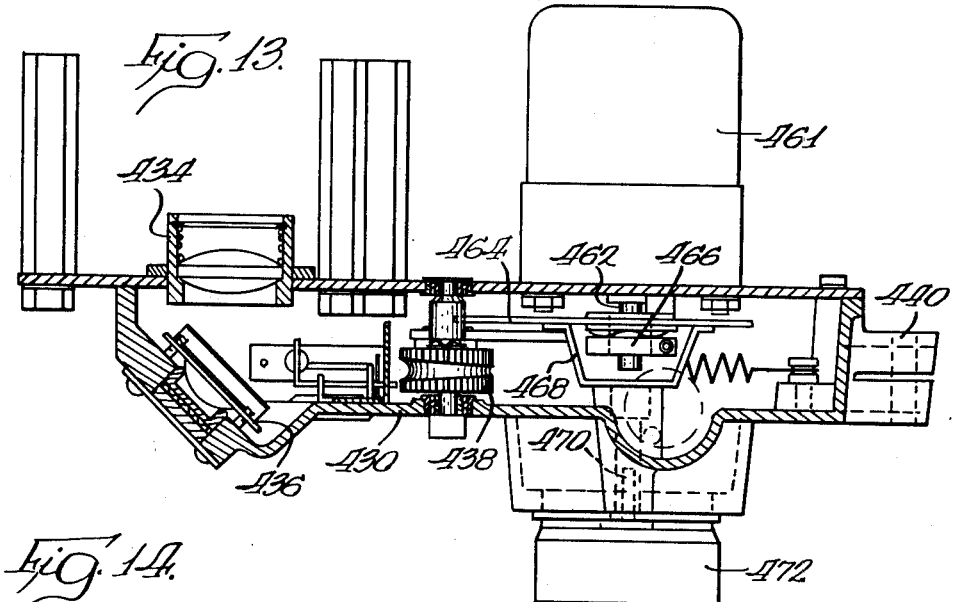
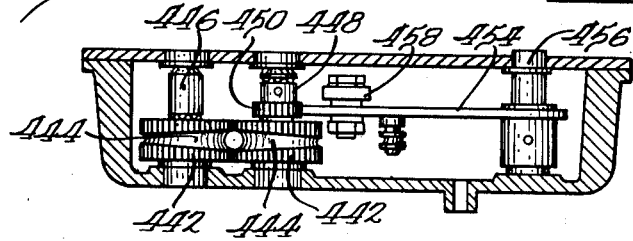

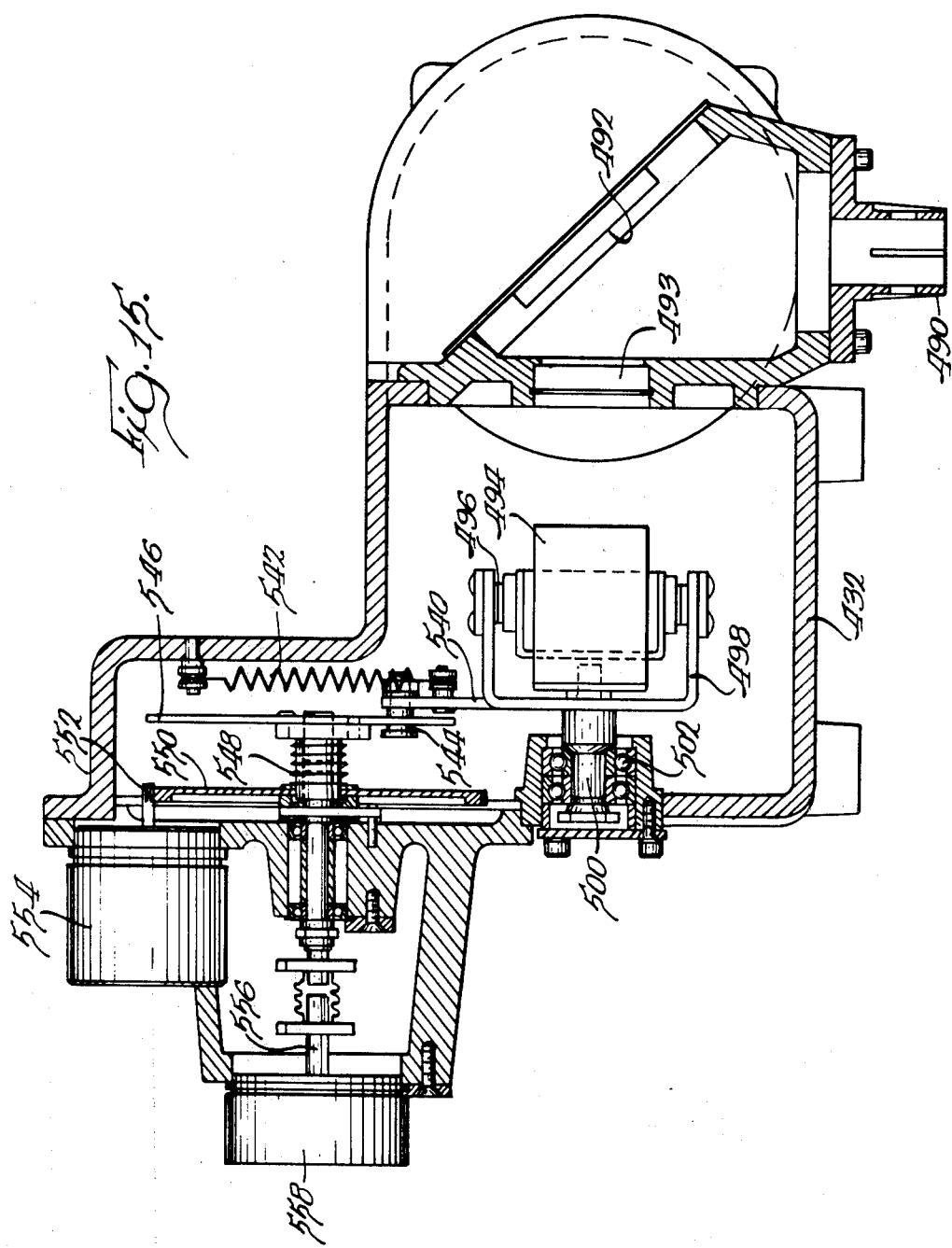

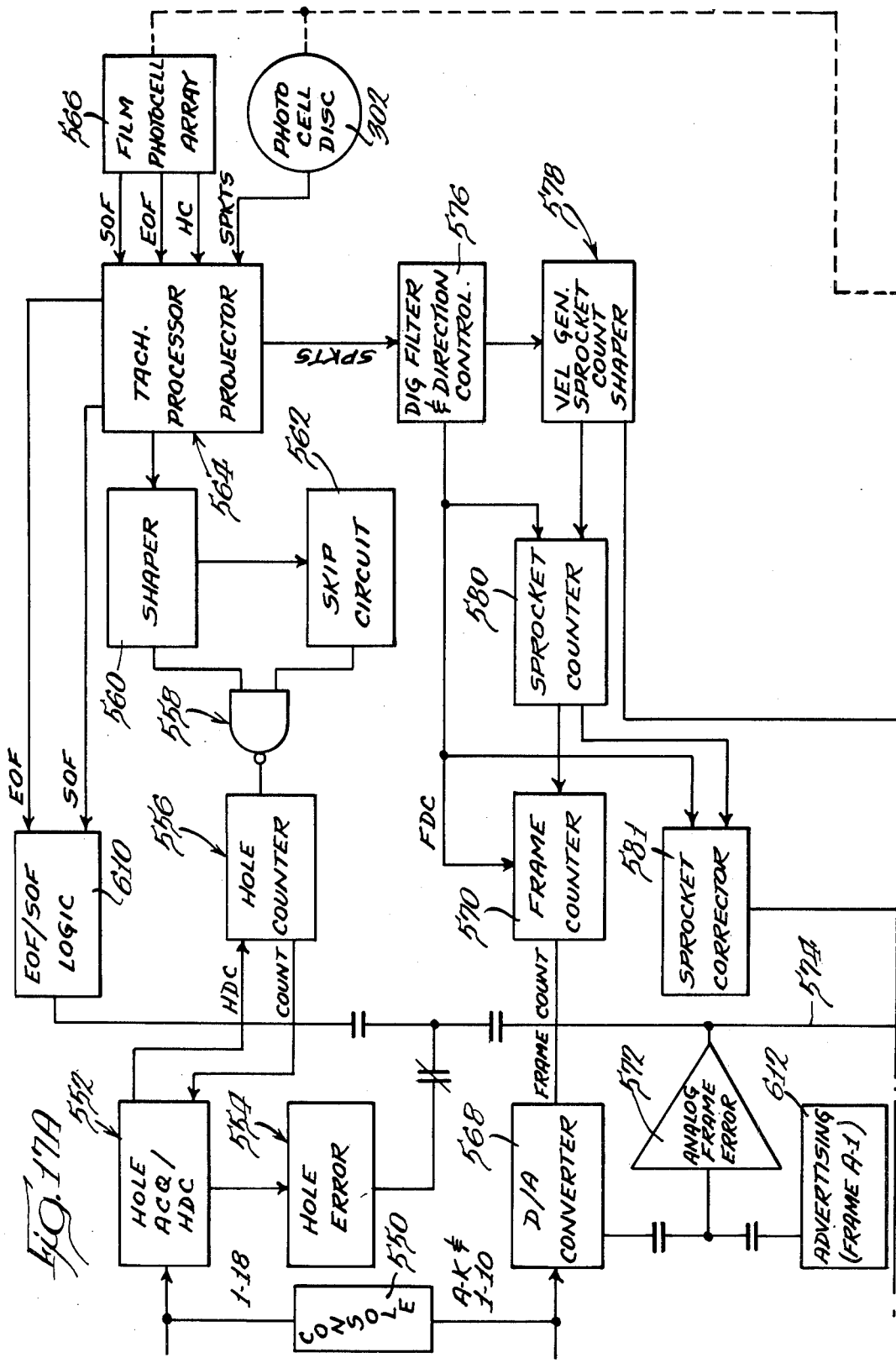

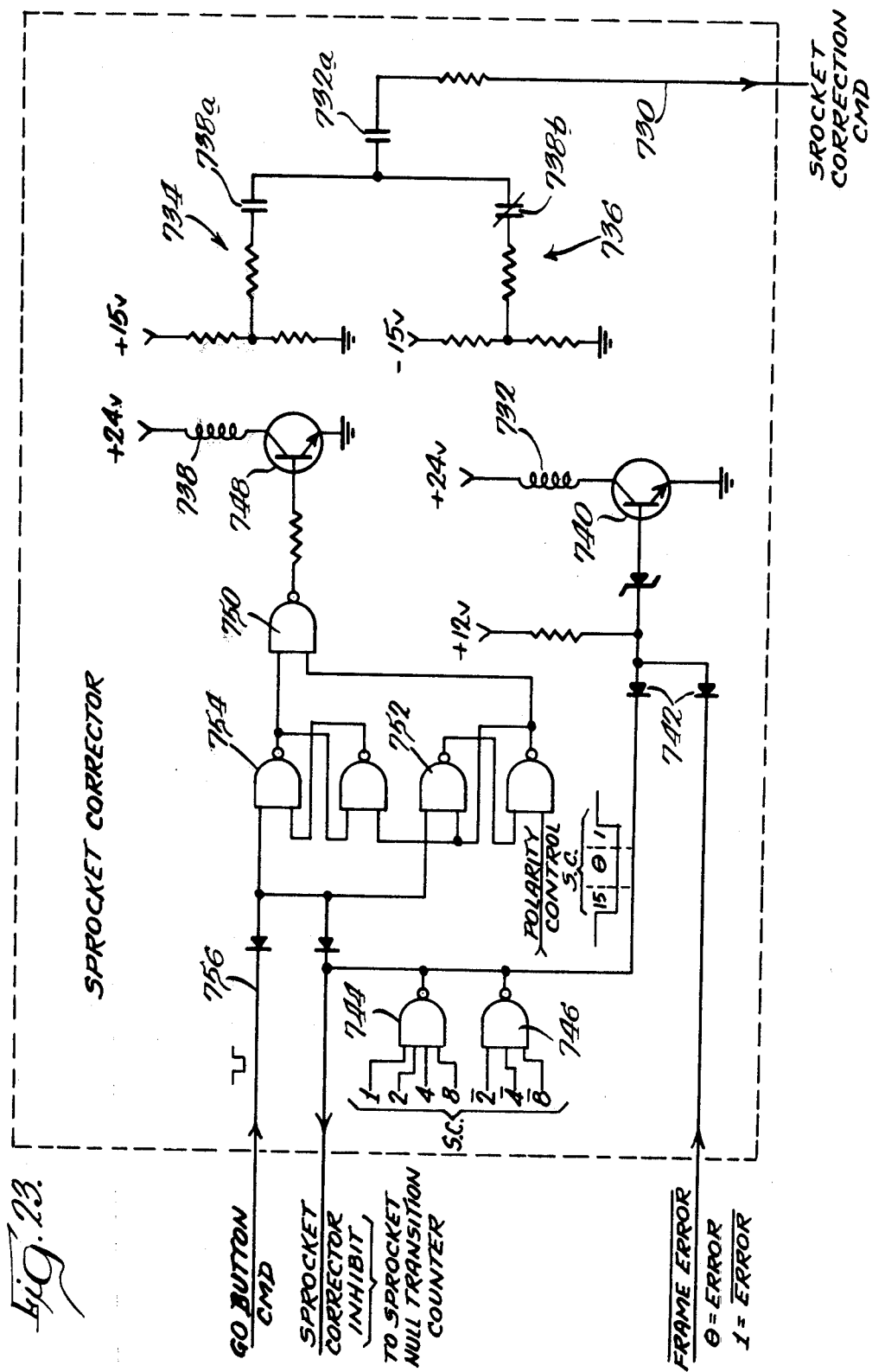

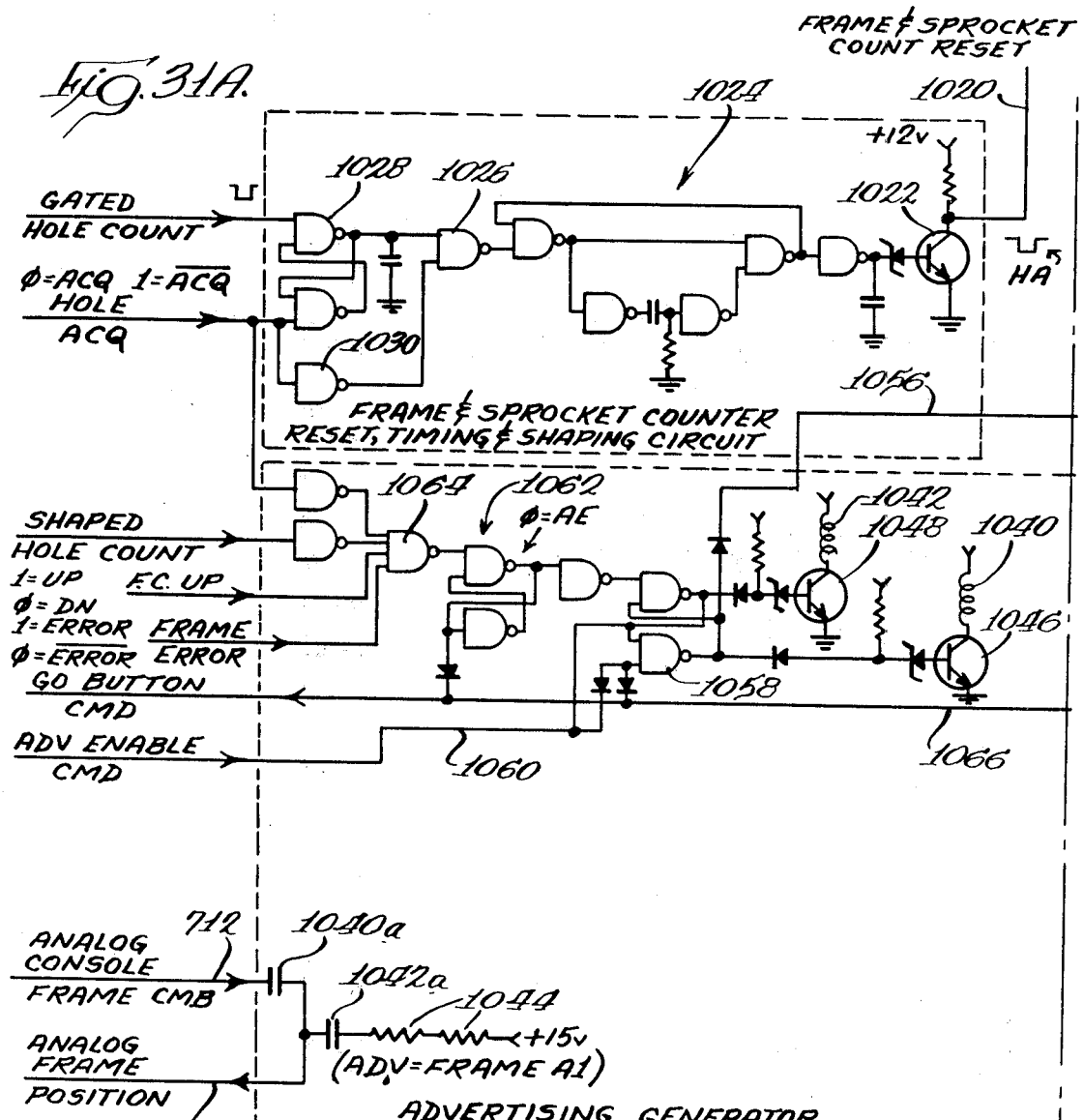

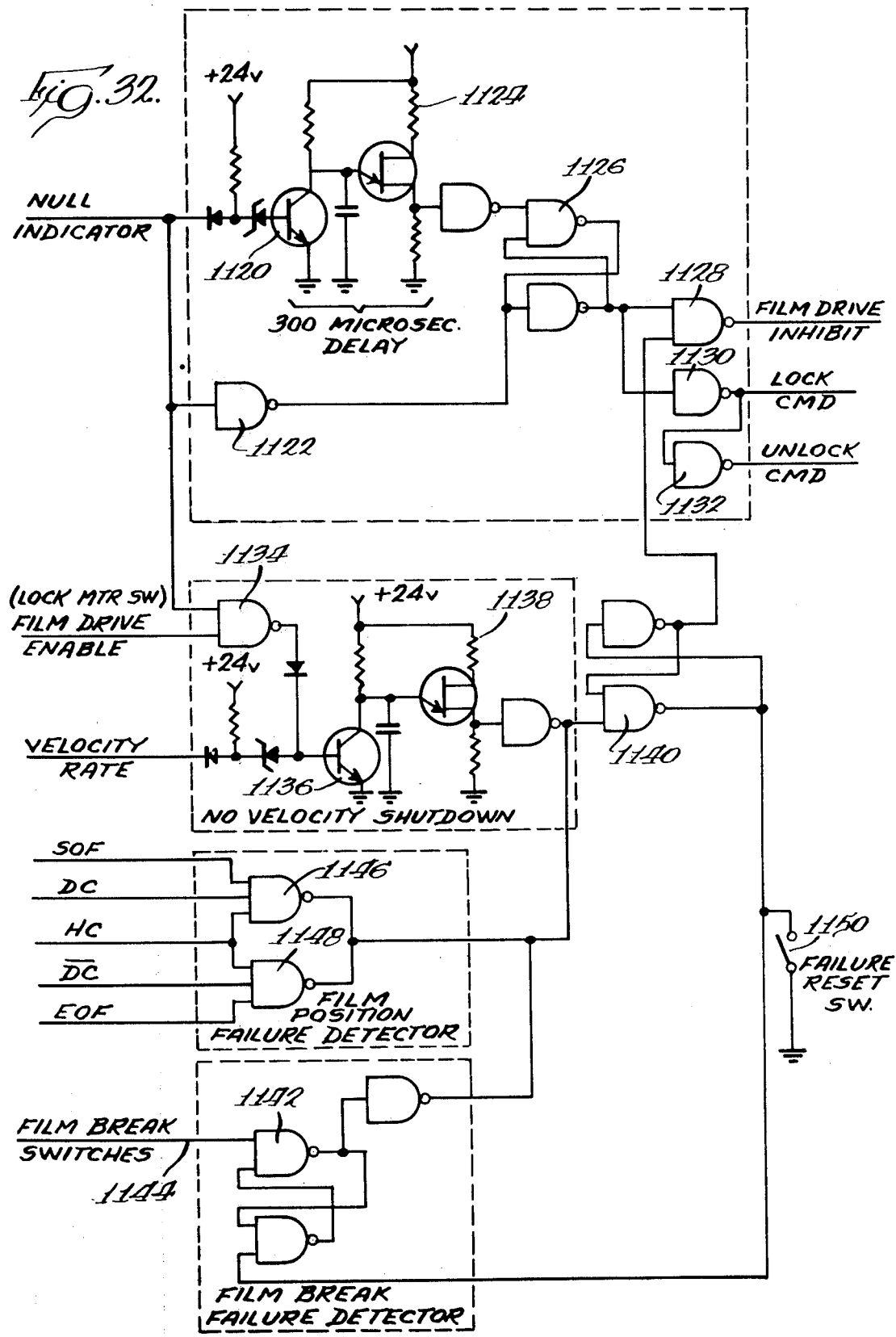

GOLF GAME PROJECTOR

CROSS REFERENCE TO CO-PENDING & OTHER APPLICATIONS

This Application is a divisional of now U.S. Pat. No. 4,168,115 issued Sept. 18, 1979 618,002, filed Sept. 30, 1975, which was a divisional of Ser. No. 426,505, filed Dec. 20, 1973, now U.S. Pat. No. 3,924,122 which was a divisional of Ser. No. 69,768, filed Sept. 4, 1970, now U.S. Pat. No. 3,802,614.

BACKGROUND OF THE INVENTION

In the copending, commonly assigned application of Pratt et al, Ser. No. 574,218, filed Aug. 22, 1966 entitled "Visual Display System", now U.S. Pat. No. 3,971,368 there is described a scene projection system particularly suited for use in indoor golf games for selectively displaying any one of a plurality of scenes depicting a perspective view from any one of a plurality of different locations on any one of a plurality of different holes in a golf course. The scene selection system in the Pratt et al device is an analog servo system and while perfectly satisfactory for its intended purpose, because the projector of that system may display any one of 1800 different scenes, considerable precision is required in the servo loop components. In particular, precision is required in electromechanical devices as the feed back potentiometers employed therein and as a result, such components are extremely expensive. Furthermore, because the same are electromechanical and are tied into the film drive system, they are prone to mechanical failure as well as electrical failure and the system is not as reliable as would be the case if the servo components were not subjected to mechanical failure.

The Pratt et al system also has a number of minor, peripheral deficiencies. For example, it is somewhat bulky due to the dancer arm assemblies employed in conjunction with film storage reels, and due to the nature of the system, certain frequently usd scenes on the film strip, such as views from the tees on a golf hole, are subject to fading thereby reducing the usable life of the film strip. Furthermore, when the scene is not changed by the person utilizing the same for a long period, the scene then being projected is subject to fading, whether or not it is a frequently used scene.

Furthermore, the same does not advantageously employ various parts of the projection system in concert with other elements required in an indoor golf game.

SUMMARY OF THE INVENTION

It is the principal object of this invention to provide a new and improved visual display system. More specifically, it is an object to provide a new and improved visual display system particularly suited for use in indoor golf games, although not limited thereto.

The foregoing objects are achieved in the exemplary embodiment through a variety of features, some of which are enumerated below.

For example, space requirements are minimized through a unique dancer arm construction that requires scarcely more space than the film storage reels required to hold the film strip.

A unique arrangement of film engaging, idler rollers on opposite sides of a projection station are employed to tension the film to prevent distortion of the projected image which idler rollers are sprocketless and do not cause wear on the sprocket holes on the film.

The scene selection system is a digital servo system thereby minimizing disruption of the control system by mechanical failures. Furthermore, through unique coding of certain mechanical parts as well as provision of coding in between frames on a film strip, appropriate control is made without providing separate control tracks on the film strip itself.

The system also includes means for automatically switching between a plurality of identical scenes so that frequently selected scenes are not as subject to film fading. That is, by alternating between identical, frequently selected scenes, film fading is distributed amongst such scenes to prolong the total life of the film.

Also included is a subsystem for automatically displaying an information bit that is relatively unimportant when there has not been a scene selection for a predetermined time period so that such film fading as does take place will not destroy valuable information, but rather, only relatively unimportant information.

The exemplary embodiment further takes advantage of the projector light source for generating light to operate a ball spot projector customary in indoor golf games to minimize the total number of components required in such a game and thereby improve the total reliability of the same.

Furthermore, the system includes a self-contained subsystem for sensing the position of the projected image and, in response thereto, automatically adjusting the path of projection until the projected image is in a predetermined position in the projection path. The components for the subsystem are totally contained within a housing for the projector thereby minimizing space requirements and electrical wiring problems.

Other objects and advantages will become apparent from the following specification taken in conjunction with the accompanying drawings.

DESCRIPTION OF THE DRAWINGS

FIG. 2 is an enlarged, rear elevation of the drive mechanism of the system including film storage reels and dancer arm assemblies;

FIG. 3 is an enlarged elevation of a portion of the system illustrating a dowser assembly;

FIG. 4 is an enlarged elevation of a portion of FIG. 3;

FIG. 5 illustrates a mechanism for changing the position of a portion of the optical system to alter the position of the projected image;

FIG. 7 is a front elevation of a film tensioning mechanism employed in the invention;

FIG. 8 is a sectional view of a sprocket drive system;

FIG. 9 illustrates a portion of a film strip employed in the system;

FIG. 12 illustrates a portion of a ball spot projector associated with the system and more specifically, a portion of a mechanism for changing the size of the projected spot;

FIG. 13 is a sectional view taken approximately along the line 13—13 of FIG. 12;

FIG. 14 is a sectional view taken approximately along the line 14—14 of FIG. 12;

FIG. 15 is a sectional view of another portion of ball spot projector assembly illustrating mechanism for altering the position of the projected spot;

FIG. 17 is composed of FIGS. 17a and 17b and is a block diagram of the control system employed in the invention. FIG. 17b is to be located to add the lower margin of FIG. 17a;

FIG. 19 is comprised of FIG. 19a and 19b with FIG. 19b being located at the right hand margin of FIG. 19a;

FIG. 23 is a logic diagram and illustrates a circuit for providing sprocket error correction information;

FIG. 32 illustrates logic for controlling a mechanical film positioning element employed in the system as well as various safety features.

DESCRIPTION OF THE PREFERRED EMBODIMENT

General Description

Figure 1:
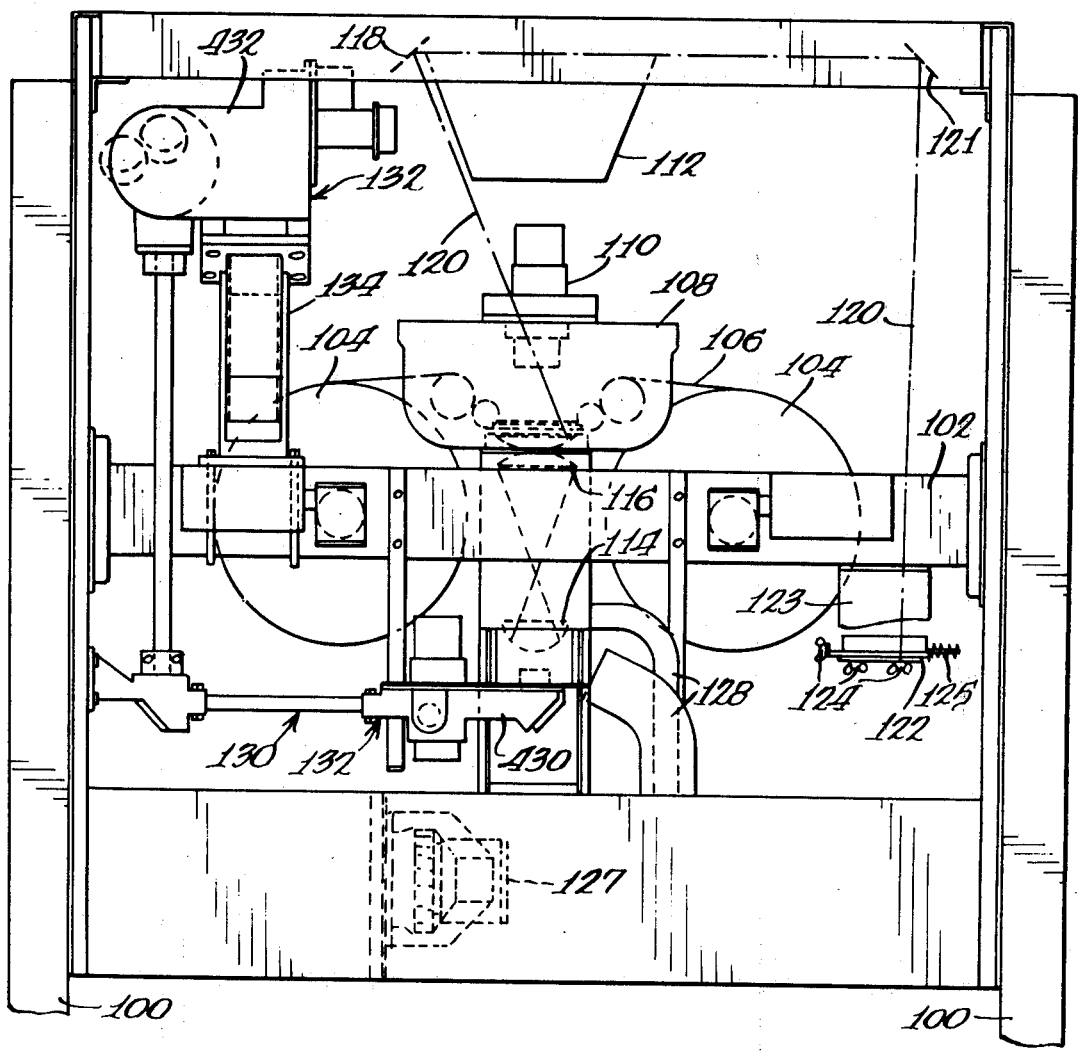
FIG. 1 is a rear elevation of a visual display system made according to the invention.

Disclosed herein is a visual display system for displaying any one of a plurality of frames of visual information on a film strip. The preferred embodiment is described in conjunction with one preferred use, namely, the displaying of any one of a plurality of scenes of a golf course, all taken from different locations thereon, for use in an indoor golf game. However, it is to be recognized that many of the principles of the invention enunciated hereinafter are applicable to visual display systems for displaying other types of information as, for example, educational materials, or for data retrieval purposes. It should also be recognized that many of the principles hereinafter disclosed are applicable to types of information bearing media other than film strips such as slides, magnetic tape, etc.

The disclosed system is intended for use in an indoor golf game having a screen upon which is displayed any one of a plurality of scenes taken from different locations on a golf course so that a golfer may hit a ball from a tee point in front of the screen in a normal fashion. As is known, such indoor golf games typically include data acquisition means which determine various parameters of a golf ball in flight hit from the tee and feed such information to a computer which then computes the theoretical trajectory that the ball would take in flight. Theoretical trajectory information is, in turn, fed to a so-called ball spot projector which, during the computation, projects a spot of light on the screen, and thus the scene thereon in such a way as to simulate the flight of the ball. Typically, a ball spot projector will reduce the size of the projected spot as the length of the trajectory increases, move the spot up or down depending upon the vertical direction of the ball at any given time in its flight and move the spot to the right or to the left dependent upon the initial direction of the ball and side spin placed thereon, if any.

In playing the game, the golfer will select a scene that corresponds to the view from a location on a particular hole from which he is to hit his next shot and such a scene will be displayed on the screen to simulate the view as it would appear to the golfer if he were on an actual golf course hitting a ball from the corresponding location.

In order to provide a sufficient degree of realism, the projector must be capable of displaying any one of a plurality of scenes for any one of a plurality of holes on the indoor course being played by the golfer. Accordingly, the exemplary embodiment is built so that scenes for eighteen different holes may be displayed on the screen with a capability of displaying up to one-hundred different scenes for each of the eighteen holes. That is, a total of about eighteen hundred bits of information are employed.

Information relative to scene selection according to the preferred embodiment is accomplished through manual input means which may typically be in the form of manually operable electrical switches. One such switch may provide information as to any one of the eighteen holes being played. A second manually operable switch may provide information as to any one of ten different groups of frames for a given one of the holes is to be displayed and a third manually operable switch may be employed to pick the one frame of ten frames in each of the groups to be displayed. Of course, if greater sophistication is required, it will be appreciated that the manually operable switches could be replaced by electronic switches operated in response to a computer output or the like.

Once the projector has been provided with information relative to a selected scene to be displayed, the same undergoes three basic positioning steps to ultimately locate the projected image of the selected scene at a predetermined location on the screen within rather precise limits. Firstly, the information from the three sets of switches is employed in a servo system to locate the selected scene within a third of a frame of a proper predetermined position within a projection station. Upon the nulling of the servo system, a mechanical positioning device is operative to locate the selected frame within about ten thousandths of a inch of a predetermined position in the projection station. Upon conclusion of the operation of the mechanical device, a system which senses the position of the projected image is actuated and, if necessary, will cause a shifting of the projected image until the same is in the predetermined location desired.

The servo system operates on digital information as opposed to analog information and in response to three types of error signals. The first type of error signal is termed a "hole error" and refers to any difference between the commanded hole to be displayed and the actual hole being displayed at any given time. For example, if the projector is projecting a scene from hole #2 and the next commanded scene to be displayed is for hole #3, a hole error signal will be present.

A second type of error signal is a "frame error" signal. A frame error signal will be present when the actual frame in the projection station does not correspond to the commanded frame. For example, if the commanded frame is frame twenty-three and frame nine is in the projection station, a frame error signal will be present.

The third type of error signal is a "sprocket error" signal. In order to locate the selected frame sufficiently close to a predetermined position within the projection station so that the mechanical positioning device can further adjust positioning, it is necessary that the selected scene be within a distance corresponding to the distance between a few sprocket teeth engaging the film from the predetermined position. The exemplary embodiment employs a film strip having sixteen sprocket holes per frame and the mechanical positioning system may adequately adjust the position of the selected frame within the projection station if the selected scene is no more than a few sprocket holes from the predetermined position within the projection station. The system is therefore designed to provide sprocket counts and when the sprocket count corresponds to a one, a fifteen or a zero (the same as sixteen), there will be no sprocket error signal. However, at any other time, a sprocket error signal will be generated to cause the servo system to bring the selected frame closer to the predetermined position so that the mechanical positioning system can subsequently finally position the selected frame at the projection station.

The general mode of operation of the servo system is as follows.

When the commanded scene is above the scene being displayed, the projector will run upwardly to the selected scene and, upon the achieving of a null, after a short time delay, the mechanical positioning device will operate and this action will then be followed by the operation of the system which senses the position of the projected image to make any final direction of the location of the projected image as may be required. When the commanded scene is below the scene being displayed, the projector will run downwardly to the first scene for the commanded hole and the reverse direction to run upwardly within the scenes for that hole until the selected scene is within the projection station and a null is achieved. Thereafter, the mechanical positioning device and the sensing system will operate in the manner generally mentioned previously.

The system also includes a number of peripheral features. For example, interlocks are provided to shut the system down when the film breaks or when there is an error signal but no motion of the film drive system as would occur in the case of a mechanical malfunction. Additionally, means are provided to shut down the system when there is a failure in the film position detecting mechanism.

Additionally, since certain scenes are displayed more often than others, as for example, the scenes for the tee location on each of the eighteen holes, and such scenes are therefore more prone to film fading, a plurality of such scenes are used. Means are then provided to alternate between identical scenes when the same command is given to reduce film fading.

Finally, a system is provided to automatically switch the projector to project a scene bearing advertising or the like which is not material to the golf game whenever the projector has not been operated for a predetermined time. Thus, when a scene has been displayed for a prolonged interval equal to the predetermined time in order to preclude fading of that scene, the projector will automatically display another scene which can be displayed without worry for the effect of film fading.

DETAILED DESCRIPTION

An exemplary embodiment of the projecting system made according to the invention is shown in FIG. 1 as being interposed between a pair of upright frame members 100 and mounted on a cross-member 102. The projection system includes a pair of film storage means 104 which store a film strip 106 bearing the scenes to be projected. A drive mechanism 108 is operative to shift the film strip 106 from the film storage means 104 and the same mounts a projection lens 110 which is adapted to project the image of the film strip 106 upwardly to a canted mirror 112 from which it is reflected to a viewing screen located forwardly of the structure illustrated in FIG. 1.

The projector also includes a light source having a reflector 114 and a condensing lens system 116 which condenses light from the light source and directs the same through the film strip 106 to the projection lens 110.

To one side of the mirror 112 is a mirror 118 which is adapted to receive the projected image of a translucent portion 119 (FIG. 9) of the film strip 106. The translucent portion 119 is located in the border between each scene and is in the form of a square, fully developed area. The path of projection of the image of the translucent portion is indicated at 120 and is reflected from the mirror 118 toward the right-hand upright to a mirror 121 which then reflects the same downwardly to a conventional photocell quadrant 122 mounted on a bracket 123. The mounting includes thumb screws 124 and spring biasing means 125 whereby the position of the quadrant with respect to the light path 120 may be finely adjusted in a known manner. The purpose of this construction will become apparent hereinafter.

The system also includes a blower 127 associated with conduits 128 for conveying air for cooling purposes to the projection system.

As will be seen, the reflector 114 includes a small aperture in its center so that some light from the light source is made available to an optical light tunnel, generally designated 130 in which it is conveyed upwardly to a ball spot projector 132 mounted on the cross-member 102 by means of a frame element 134. As is well known, in indoor golf games, it is desired to provide a moving spot of light which is projected on a scene of a golf hole on a screen and which is moved in such a way as to simulate the light of the ball. The ball spot projector 132 is for this purpose and, as will be explained in greater detail hereinafter, includes means for deflecting the light in a horizontal direction, in a vertical direction, and for changing the size of the projected spot to simulate the effect of distance.

Turning now to FIG. 2, the projector structure per se may be seen in greater detail. The drive mechanism 108 mounts a pair of drive sprockets 140 about which the film strip 106 is trained. Between the drive sprockets 140 are a pair of idler rollers 142 which, when a selected scene is disposed at a projection station 143 in front of the condensing lens system 116, are moved outwardly therefrom to tension the film strip 106 to preclude a so-called "oil canning" of the film strip and thus prevent distortion of the projected image.

As seen in FIGS. 2 and 3, the structure also includes a dowser 144 pivotally mounted on a shaft 146 and which is adapted to be interposed between the light source included with the reflector 114 and the condensing lens system 116 when the film strip 106 is in motion so that the viewer will not be subjected to a continual blur of passing scenes. The shaft 146 is rotated by means of a sheave 148 secured thereto and about which is trained a cable 150. The cable 150 is passed about a rotatably mounted idler sheave 152 to a sheave 154 on a shaft 156 which extends from one side of the housing of the drive mechanism 108.

More specifically and with reference to FIG. 3, the shaft 146 is journalled in the cross member 102 and mounts a pair of the sheaves 148, one on either side of the cross member 102. The dowser 144 projects from the rightmost extension of the shaft 146 and the cable 150 is trained about two of the sheaves 152, each mounted on opposite sides of the upper surface of the cross member 102 to then be trained about the sheave 154 on the shaft 156.

The shaft 156 also mounts a second sheave 170 which is a driven sheave. A cable or timing belt or the like, 172 is trained about sheave 170 to the output sheave 174 of a motor 176. The motor 176 is bidirectional and its operation is effected during the mechanical frame positioning portion of the selection cycle in a manner to be described in greater detail hereinafter.

The shaft 156 also carries an arm 178 mounting an outer cam surface 180 which may be moved between positions by the motor 176 to engage the actuators of a pair of micro switches 182 and 184 for timing purposes to be seen.

Turning now to FIGS. 4 and 5, the projection lens 110 is received in a mounting ring 200 carried on one end of a plate 202 which is spaced above the upper side of the drive mechanism 108. By means of interconnecting leaf springs 205, a motor mounting plate 203 is mounted above the plate 202 and by means of leaf springs 207 interconnecting both of the plates 202 and 203, the plate 202 is interposed between the drive mechanism 108 and the motor mounting plate 203.

A first motor 204 mounted on the plate 203 is mechanically associated with the plate 202 so that when actuated, it will shift the plate 200, and thus the projection lens, into and out of the paper as illustrated in FIG. 4. A second motor 206 mounted on the plate 203 is similarly mechanically associated with the plate 202 so that when energized, it will shift the plate 202 left and right in the plane of the paper as viewed in FIG. 4.

The mechanical associations of the motors 204 and 206 with the plate 202 are seen in better detail in FIG. 5. Specifically, the motor 204 has an output shaft 208 which mounts an eccentric 210. Mounted on the plate 202 by studs 212 located to either side of the eccentric 210 are a pair of rollers 214 which engage the eccentric 210. As a result, when the shaft 208 is rotated in a counterclockwise direction from the position shown in FIG. 5, for the first 90° of rotation, the plate 202 and thus the projection lens 110 will be shifted to the left as viewed in FIG. 5. For the next 180° of rotation, the plate 202 and thus the projection lens 110 will be shifted to the right while for the last 90°, the direction of shift will be to the left.

The motor 206 similarly includes an output shaft 216 mounting an eccentric 218 interposed between a pair of rollers 202 mounted on the upper surface of the drive mechanism 108 by means of studs 222. The rollers 220 extend upwardly through an elongated, enlarged opening 223 in the plate 202 and flank the eccentric 218. As a result, rotation of the output shaft 216 of the motor 206 will cause a shift in the position of the motor mounting plate 203 through the springs 205 and since the plate 202 is carried thereby through the connection of the springs 207 thereto, the plate 202 will shift in the vertical direction as viewed in FIG. 5.

By means to be described in greater detail hereinafter, operation of the motors 204 and 206 is controlled by signals received from the photocell quadrant 122 in such a way that the position of the projected image may be accurately controlled. The photocell quadrant 122 in effect senses the position of the projected image and when the same is not correct, the motors 204 and 206 are energized as may be appropriate to cause a shifting of the position of the projection lens 110 to result in a shifting of the position of the projected image. When the projected image is properly located, operation of the motors 204 and 206 is terminated with the scene occupying the predetermined position.

Figure 6:
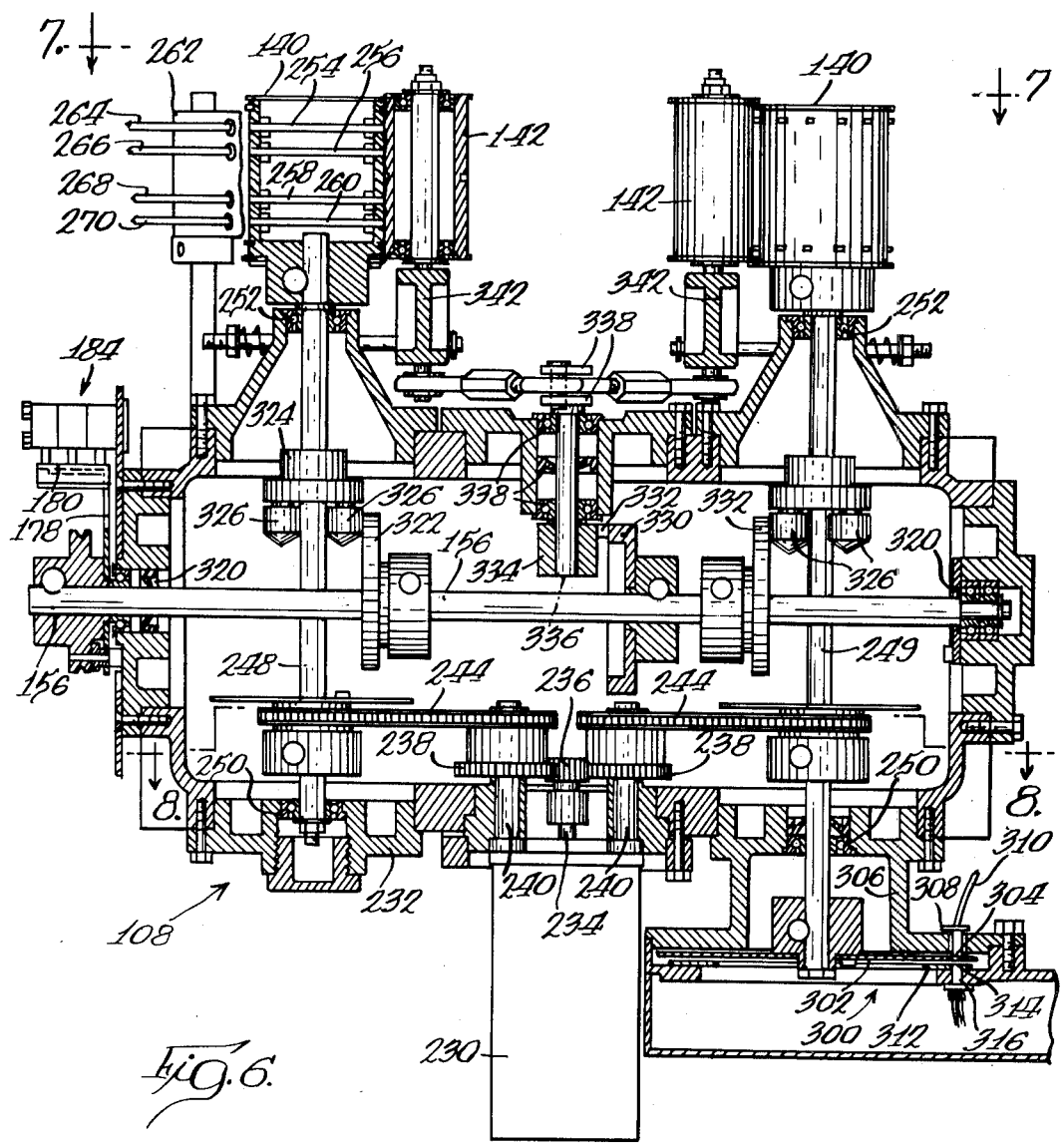
FIG. 6 is a horizontal section of the drive mechanism.

Turning now to FIGS. 6 and 8, the drive mechanism 108 will be described. The drive mechanism 108 includes a bidirectional drive motor 230 secured to one side of a drive housing 232 formed of a plurality of castings. The drive motor 230 includes an output shaft 234 mounting a gear 236 which is interposed and meshed with two adjacent gears 238. The gears 238 are journalled for rotation within the housing on shafts 240 and are integral with respective sprockets 242. The sprockets 242 each have a respective chain 244 trained thereabout, each of which is in turn, trained about a sprocket 246.

The sprockets 246 are, in turn, mechanically connected to respective shafts 248 and 249, both of which are journalled within the housing for rotation in lower bearings 250 and upper bearings 252. The upper ends of each of the shafts 248 and 249 are received in and mechanically connected to the film drive sprockets 140 and as a result of the foregoing arrangement, it will be appreciated that when the motor 230 is energized, the film drive sprockets 140 will be driven in the same direction at the same speed. As will be seen, there is provided a control system for the motor 230 which will result in the positioning of a selected scene in close proximity to the desired position in the projection station 143.

As seen in FIG. 6, the left-hand drive sprocket 140 includes four light pipes 254, 256, 258 and 260 extending therethrough. Mounted on a bracket 262 are four additional light pipes 264, 266, 268 and 270 which are aligned with the light pipes 254–260, respectively. The light pipes 264–270 extend to the light source associated with the reflector 114 (FIG. 2) to receive light therefrom and conduct the same upwardly to the left-hand drive sprocket 140.

Referring to FIG. 7, the uppermost one of four photocells 272 is seen to be mounted on a mounting bracket 274. The four photocells 272 are respectively aligned with the light pipes 254-260 carried by the sprocket 140. The arrangement is such that when the sprocket 140 is in the position shown in FIG. 7 or rotated 180° from the position, under certain circumstances, a light path may be established from the light pipes 264-270 through the light pipes 254-260 to the four photocells 272. The presence or absence of such a light path is used for control purposes in determining film position.

As best seen in FIG. 9, the boundaries between frames and the film strip 106 are provided with four control positions, 282, 284, 286 and 287 which are aligned with corresponding ones of the light pipes 254-60 in terms of vertical position. Furthermore, the number of teeth on each sprocket 140 is made to correspond to a multiple that is an integer of the number of sprocket holes on the film strip 106 for each frame thereon. In the preferred embodiment, each sprocket 140 has thirty-two teeth while there are sixteen sprocket holes per frame on the film strip 106.

When the film strip 106 is loaded on the sprocket 140, it is positioned so that a plane encompassing light pipes 254-260 will extend through the boundary between adjacent frames. Therefore, as the film strip is in transit, depending upon whether the sensing portions 282-287 are transparent or opaque, light will or will not be transmitted from the light pipes 264-270 to corresponding ones of the photocells 272.

The four sensing portions 282-287 are used for the following purposes. One of the portions is always made transparent and acts as a strobe for timing purposes. That is, each time a frame on the film strip 106 passes about the sprocket 140, a light path will be established.

Another one of the portions is used for hole count purposes and the generation of a hole error signal. Normally, this portion will be transparent but one such portion is made opaque for each hole and is located on the film strip 106 so that when a new hole is passing into the projection station, a normally existing light path will be blocked. The third and fourth portions are used for start of film and end of film indications. They are normally transparent but one of the portions is made opaque near the start of the film and the other is made opaque near the end of the film. Thus, when the film is driven to the beginning thereof, a normally established light path will be blocked to provide a start of film indication while when the film is driven to the end thereof, a normally established light path will be blocked to provide an end of film indication.

Also utilized in the control system for the motor 230 is a tachometer system, generally designated 300. As seen in FIG. 6, the lowermost end of the shaft 249 extends through the housing and mounts a disc 302 for rotation therewith. The disc 302 includes a number of apertures 304 only one of which is shown. A housing extension 306 includes apertures 308 aligned with the apertures 304 and the disc 302 and receives the end of a plurality of light pipes 310 which, like light pipes 264-270, are associated with the reflector 114 and the light source accompanying the same.

The housing extension 306 also mounts a mask 312 having a plurality of apertures 314 therein. Associated with each aperture 314 is a photocell 316. In the preferred embodiment, the disc 302 includes five rows of apertures 304 with each row containing thirty-two of the apertures 304. A photocell 316 is provided for each row and there are five corresponding light pipes.

As a result of the foregoing construction, the photocells 316 will be shaded or illuminated in one of two sequences depending upon the direction of rotation of the motor 230 and at various intervals dependent upon the rate of rotation of the motor 230. This information is used by the control system in a manner to be described hereinafter.

As will be seen, the operation of the control system for the motor 230 will result in a selected frame approximately positioned in the projection station 143 for projection on the screen. Generally, the selected frame will be within about one-third of a frame from proper positioning. However, in order to achieve accurate positioning of the selected frame in the projection station 143, a second drive system is used which will result in the selected frame being positioned in a desired location within the projection station 143 to a tolerance of plus or minus 0.010 inches.

It will be recalled from the previous discussion of FIGS. 3 and 4 that there is provided a shaft 156 which is ultimately driven by a motor 176. The shaft 156 is journalled within the housing 232 by bearings 320 and, intermediate its ends, mounts a pair of cams 322.

Mounted on the shafts 248 and 249 which cause rotation of the film drive sprockets 140 are respective cam followers 324 each including a pair of rotatable rollers 326 which are adapted to be engaged by the respective one of the cams 322.

By means of the control system to be described in greater detail hereinafter, the motor 176 which drives the shaft 156 is operative to rotate the shaft 156 in such a way that the cams 322 will not be in engagement with the cam followers 326 when the motor 230 is energized. However, when the motor 230 is deenergized representing that a selected scene is within a third of a frame of being properly positioned within the projection station, the motor 176 will be energized to drive the shaft 156 in such a way as to bring the cams 322 into engagement with one or the other of the associated cam follower rollers 326. Such engagement will cause rotation of the shafts 248 and 249 and thus, rotation of the film drive sprockets 140. Because the number of teeth on each film drive sprocket 140 is selected as a multiple of the integer denominating the number of holes in the film per scene and the film is oriented on the sprockets 140 in the particular manner mentioned previously, when the cams 322 have rotated to the extent permitted by the structure, the resulting camming action on the shafts 248 and 249 will result in the selected scene being accurately located within the projection station.

Figure 10:
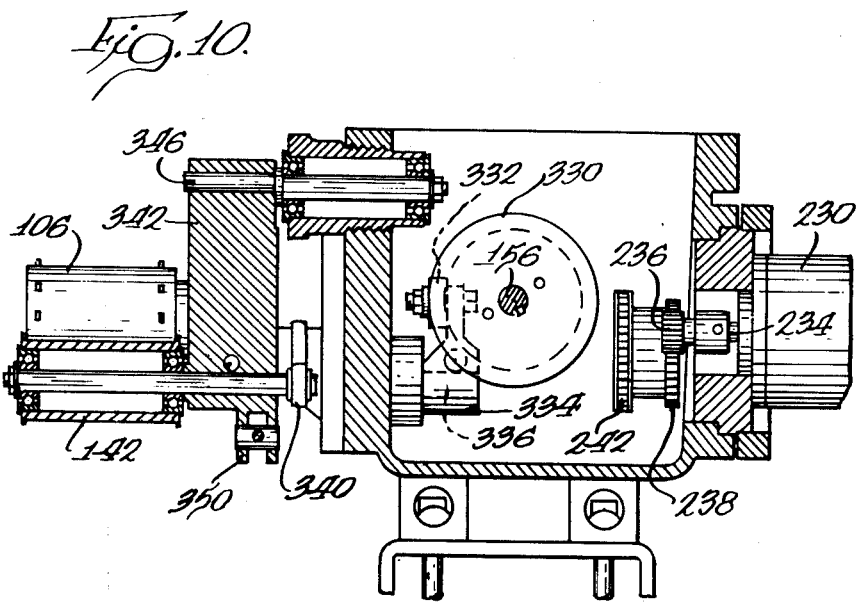
FIG. 10 is a sectional view illustrating a portion of the film tensioning mechanism.

With reference to FIGS. 6, 7 and 10, the shaft 156 also mounts cam 330 which is adapted to engage a rotatable cam follower 332 at a point in the rotation of the shaft 156 slightly following the amount of rotation required to provide full camming action by the cams 322 on the cam follower rollers 326. The cam follower 332 is mounted on one end of an arm 334 which in turn is secured to the end of a shaft 336 journalled by means of bearings 338 in one end of the housing. The end of the shaft 336 extending through the housing is, in turn, secured to the midpoint of spaced lever arms 338.

The respective ends of the arms 338 are connected to one end of respective turn buckles 340. The other end of the turn buckles 340 are connected to respective pivotal arms 342 pivotally connected to the housing as at 344 and 346.

Near the opposite ends of the arms 342, the idler rollers 142 are pivotally secured and at the far ends of each of the arms 342, there is a pivotal connection to respective rods 348. Each rod 348 is passed through a respective bracket 350 and the portion of each rod 348 extending through the brackets 350 is surrounded by a coil spring 352 held in place by a nut 354.

The coil springs 352 are constructed so as to normally urge the arms 342 away from the projection station and therefore move the idlers 142 away from the projection station to tension the film.

The above-mentioned cam 330 and associated mechanism is arranged so that when the film strip is in transit, the cam follower 332 will be in its counterclockwise-most position as viewed in FIG. 7 which, by virtue of the connection through the shaft 336 to the arms 338, will result in the idlers 142 being in their closest proximity to the projection station. However, when the shaft 156 is rotated to accurately locate the selected scene in the projection station by virtue of the action provided by the cams 322, and shortly after that action is completed, the cam 330 will permit the bias of the spring 352 to move the idlers 142 away from the projection station to thereby tension the film to preclude distortion of the same which could result in distortion of the projected image.

In order to insure that the film within the projection station is transverse to the primary path of light in the optical system, and because the relative orientation of the idlers 132 control the position of the film within the projection station, one of the idlers 142 is provided with an adjustable mount so that misalignment can be corrected. Referring to FIG. 4, one of the idlers 142 is seen to be rotatably mounted on a shaft 360 by bearings 362. That part of the shaft 360 in contact with the inner races of the bearings 362 is eccentric as indicated at 364. Also provided are adjustment nuts 366 associated with the respective arm 342. Accordingly, by releasing the adjustment nuts 366, the shaft 364 may be rotated with respect to the mounting arm 342 and because of the eccentric portion 364 thereof, the position of the idler 142 illustrated in FIG. 4 with respect to the other idler 142 may be changed to insure accurate alignment. Once accurate alignment is attained, the nuts 366 may be tightened to maintain such alignment.

Figure 11:
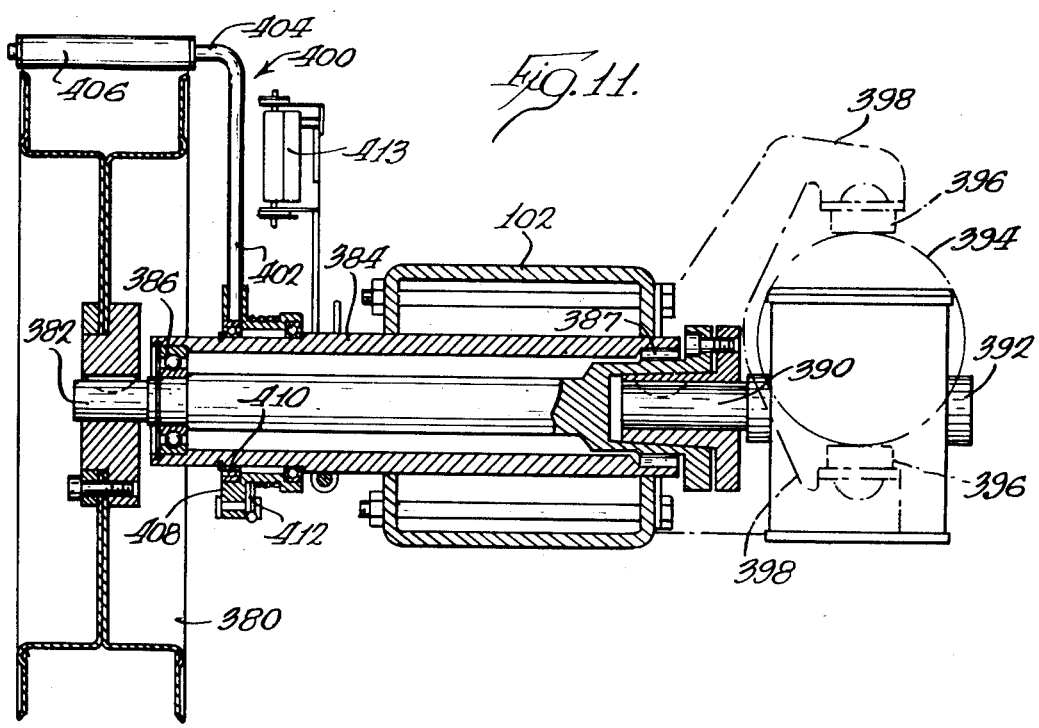
FIG. 11 is an enlarged sectional view of a film storage reel and associated dancer arm assembly.

With reference now to FIGS. 2 and 11, the nature of the film storage means 104 will be described in greater detail. Since both are identical, only one will be described in detail. Each includes a conventional film storage reel 380 which is mounted on the end of a shaft 382 for rotation therewith. The shaft 382 is journaled in a sleeve 384 by means of bearings 386 and 387 with the sleeve 384 extending through the cross member 102.

The end of the shaft 382 opposite the reel 380 emerges from the sleeve 384 and, at its point of emergence, is connected to the output shaft 390 of a speed reducing gear train 392 associated with a drive motor 394. The drive motor 394 is not mounted to the cross member 102 directly. Rather, the same is interposed between a pair of rubber bumpers 396 mounted on arms 398 which are secured to the cross member 102.

As is known, in high speed transport systems of the type employed herein, a reel drive motor such as the motor 394 is constantly changing speed either through changes in acceleration due to an off-on type of operation. As a result, substantial torque pulses are generated and the bumpers 396 tend to absorb the same and thereby minimize stress on the components of the drive due to such pulses.

Also mounted by the sleeve 384 is a dancer arm assembly, generally designated 400 which, as best seen in FIG. 2, includes five radially extending arms 402. The end of each arm 402 is inturned as at 404 to overlie the periphery of the reel 380 and rotatably mounts a film engaging idler roller 406. The innermost ends of each arm 402 are fixedly secured to a hub 408 journaled by means of bearings 410 on the sleeve 384. Coiled about the center of the hub 410 is a cable 412 having one end fixedly secured to the hub 408 and the other end secured to any known constant tension spring device (not shown).

As best seen in FIG. 2, a variety of sensing elements 413, 414 and 415 may extend radially in predetermined positions from the sleeve 384. According to the preferred embodiment, the sensing elements 413–415 may be reed switches and one or more of the arms 402 may carry magnets 416 for operating the reed switches.

Referring specifically to FIG. 2, the nature of the biasing of the cable 412 is such that the righthandmost dancer arm assembly 400 is biased in a clockwise direction while the leftmost dance arm assembly is biased in a counterclockwise direction. Further, the biasing is uniform for any position of the dancer arms 400 within their range of movement because of the connection of the cables 412 to constant tension springs as mentioned previously thereby resulting in constant film tension for all dancer arm positions. The film strip 106 is taken off of the drive sprocket 140 and, in the position shown, engages the idler rollers 406 intermediate the two endmost idler rollers and is then taken to the remote end idler roller 406 and reversed about the same to be trained about the reel 380.

The general operation of the system is as follows. Let us assume that the film strip 106 is to be taken off of the leftmost reel 380 and placed on the rightmost reel 380. When the drive sprockets 140 are driven, the leftmost dancer arm assembly 400 will tend to be rotated against the bias of its spring in a clockwise direction as the drive sprockets demand more film from the leftmost reel 380. The action at the rightmost dancer arm assembly 400 will be the same as an excess of film will be present on that side of the apparatus permitting spring biasing to move the rightmost dancer arm assembly 400 in a clockwise direction. At some point in time, the magnet 416 on one of the arms 402 associated with the leftmost dancer arm assembly will pass the sensing means 413 to cause the associated motor 394 to be energized by any suitable conventional circuit heretofore used in conjunction with dancer arm assemblies and forming no part of the invention herein.

This will result in the driving of the lefthand reel 380 in a counterclockwise direction to provide film to the drive mechanism. If the drive mechanism is operating at a lesser rate of speed than the reel 380, the biasing of the dancer arm assembly results in the magnet 416 shifting in the counterclockwise direction until it passes the sensing means 414 at which time the drive motor 394 will be deenergized. The foregoing operation will then repeat cyclically until the drive mechanism 108 is deenergized.

Looking now at the action at the righthand dancer arm assembly, as film is fed thereto from the drive mechanism 108, the biasing of the spring will cause the dancer arm assembly to rotate in a clockwise direction.

At some point in time, the magnet 416 will be detected by the sensing means 414 which will energize the associated motor 392 to drive the reel 380 in a counterclockwise direction to take up the film. Again, if the reel 380 is being driven faster than the drive mechanism 180, the magnet 416 will be slowly moved in a counterclockwise direction until it is detected by the sensing means 413 at which time the drive motor 394 will be deenergized and again, the operation will repeat itself cyclically until the drive mechanism 108 is deenergized.

Normally, the sensing means 415 are inactive, the position of the dancer arms being such that the magnet 416 will normally dwell between the sensing means 413 and 414. However, should there be a malfunction in the control for the motor 394, the continual driving of the film strip 106 will ultimately result in one of the dancer arm assemblies being moved to a point where the magnet 416 will trip one of the associated sensing means 415 to indicate that the associated dancer arm assembly is approaching the limit of its travel and this occurrence is employed in the control system to shut down the same so that such a malfunction can be corrected. Additionally, should the film strip break, the biasing of the dancer arm assembly is such that the free dancer arm assembly (due to the breakage of the film) will move to energize the magnet 415 to shutdown the system.

Turning now to FIGS. 1 and 12–16, inclusive, the construction of the ball spot projector 132 will be described. As shown in FIG. 1, the ball spot projector 132 is located in two separate housings, 430 and 432 which are interconnected by the optical tunnel 130. The housing 430 is best illustrated in FIGS. 12–14 and is seen to include an optical system 434 which is adapted to underlie the reflector 114 which, it will be recalled, includes an aperture in the lower side thereof. As a result, light from the light source associated with the reflector 114 may enter the housing 430 through the optical system 434 to impinge upon an angled mirror 436. The mirror 436 rotates the beam of light approximately 90° toward an iris 438 which controls the size of the spot ultimately projected on the screen in an indoor golf game. From the iris 438, the light beam passes to the horizontal front of the light tunnel 430 via an outlet 440 in the housing 430.

As best seen in FIG. 14, the iris 438 comprises a pair of meshed gear elements 442 each having a semicircular groove cut in its peripheral surface. Each circular groove 444 further has a decreasing radius as it extends about the periphery of its corresponding gear 442 from the point of intersection of the two gears as illustrated in FIG. 14. As a result, light directed to the riis 438 will emerge therefrom in the form of a circular beam having a diameter controlled by the position of rotation of the gears 442 within the housing 430.

Each of the gears 442 is mounted on a respective shaft 446 and 448 with the shaft 448 further bearing a drive gear 450. As best seen in FIG. 12, the drive gear 450 is in mesh with a sector gear 454 mounted for rotation by a shaft 456. The sector gear 454 also mounts a rotatable cam follower roller 458 on one side thereof and is biased in a counterclockwise direction about the shaft 456 by means of a coil spring 460.

Returning to FIG. 13, the upper side of the housing 430 mounts a drive motor 461 having an output shaft 462 mounting a cam 464 in engagement with the cam follower roller 458. A friction clutch 466 is interposed between the shaft 462 and the cam 464. Depending from the underside of the cam 464 is a bracket 468 which is connected to the wiper driving shaft 470 of a feedback potentiometer 472. As is well known, the feedback potentiometer 472 may provide a signal whose potential is representative of the position of the cam 464 and thus, the position of the gears 442 and ultimately the size of the projected spot. The same is employed in a golf game in a manner heretofore known and forms no part of the instant invention.

Also within the housing 430 is a dowser assembly which may be operated by a golf game computer to preclude the projection of a spot on the screen when such is not desired. The dowser assembly is operated by a solenoid 474 having its armature 476 connected to a dowser element 478 interposed between the mirror 436 and the gears 442 when the solenoid 474 is deenergized. When a spot is to be projected on the screen, the golf game computer can drive the solenoid 474 to cause the same to withdraw the dowser 478 from its point of interposition to allow the beam of light reflected by the mirror 436 to pass to the gears 442 to permit projection of a circular spot having a diameter controlled as appropriate by the motor 461 and the feedback potentiometer 472.

Figure 16:
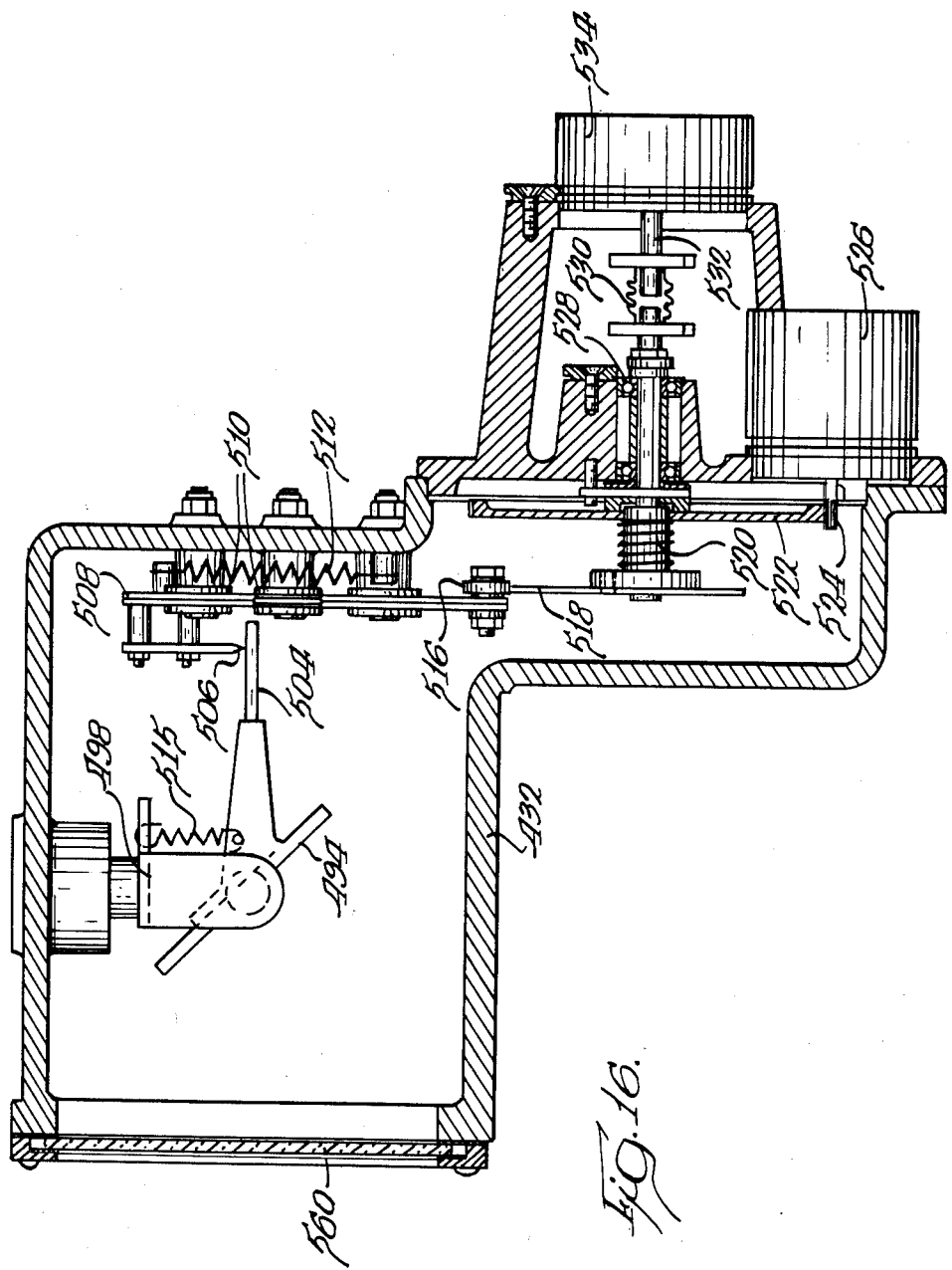
FIG. 16 is a sectional view of the portion of the ball spot projector shown in FIG. 16 taken at approximately right angles to the view of FIG. 15.

Turning now to FIGS. 15 and 16, the ball spot projector elements contained within the housing 432 will be described. With specific reference to FIG. 15, the housing 432 includes an inlet 490 associated with the vertical run of the optical tunnel 130 to receive the regulated beam of light passed thereby from the housing 430. Immediately upon entry of the beam of light through the inlet 490, the same is rotated approximately 90° by a mirror 492 through a lens 493 to a movable mirror 494. The movable mirror 494 is mounted for movement about two mutually perpendicular axes. This is accomplished by rotatably mounting the mirror 494 by means of a shaft 496 in a yoke 498 having its bight pivotally mounted by bearings 502 mounted in the housing 432. Accordingly, when the mirror 494 is rotated about the axis provided by shaft 496, it may move in one direction and when the entire assembly is rotated about the axis provided by the shaft 500 in the bearings 502, the mirror 494 is moved in a second direction.

With reference to FIG. 16, the means by which movement of the mirror 494 about the axis of shaft 496 is accomplished will be described. Extending from the rear side of the mirror 494 is a circular post 504 which may be engaged by an elongated knife edge 506 mounted on a slide 508. Suitable rollers 510 mount the slide 508 for reciprocating, linear motion within the housing 432. The slide 508 is biased by means of a spring 512 in a downward direction as viewed in FIG. 16 while a spring 514 biases the mirror 494 such that the circular post 504 tends to move in a counterclockwise direction. As a result, engagement of the post 504 with the knife edge is assured.

The lowermost end of the slide 508 has a rotatable cam follower roller 516 mounted thereon. The cam follower roller 516 is in engagement with a cam 518 mounted on a shaft 520 for movement therewith. The shaft 520 also mounts an enlarged gear 522 which engages the gear surface 524 on the output shaft of a drive motor 526. Thus, when the drive motor 526 is energized, the cam 518 will be rotated to control the position of the slide 508 and thus the angular position of the mirror 494 about the axis provided by shaft 496. The shaft 520 is journaled by means of bearings 528 in the housing and is connected via a coupling 530 to the wiper control shaft 532 of a feedback potentiometer 534. In a manner known in the art, the feedback potentiometer 534 works in concert with the motor 526 to control the angular position of the mirror 594 and thus, the position of the projected spot on the screen for one direction of movement.

Returning now to FIG. 15, the means by which the angular position of the mirror 494 with respect to the axis provided by shaft 500 will be seen. Extending from the yoke 498 is an arm 540 which is biased by a spring 542 in a direction out of the paper as viewed in FIG. 15. At the uppermost extremity of the arm 540 there is a rotatable cam follower roller 544 which is biased by the spring 542 into engagement with a cam 546 mounted on a shaft 548. The shaft 548 also mounts a gear 550 in engagement with a gear surface 552 on the output shaft of a drive motor 554 and is connected to the wiper control shaft 556 of the feedback potentiometer 558 in the same manner described previously with regard to the shaft 520. It will therefore be apparent that energization of the motor 554 will cause a corresponding rotation of the cam 546 and, due to the bias of the spring 542, the arm 540 and thus the mirror 494 will follow the cam surface 496 about the axis defined by shaft 500 to control the position of the projected spot on the screen in a second direction transverse to the first mentioned direction above.

The housing 432 is completed by a transparent window 560 mounted forwardly of the mirror 494 from which the projected spot of light as reflected by the mirror 494 may emerge to be projected on the scene bearing screen employed in an indoor golf game.

Figure 17B:
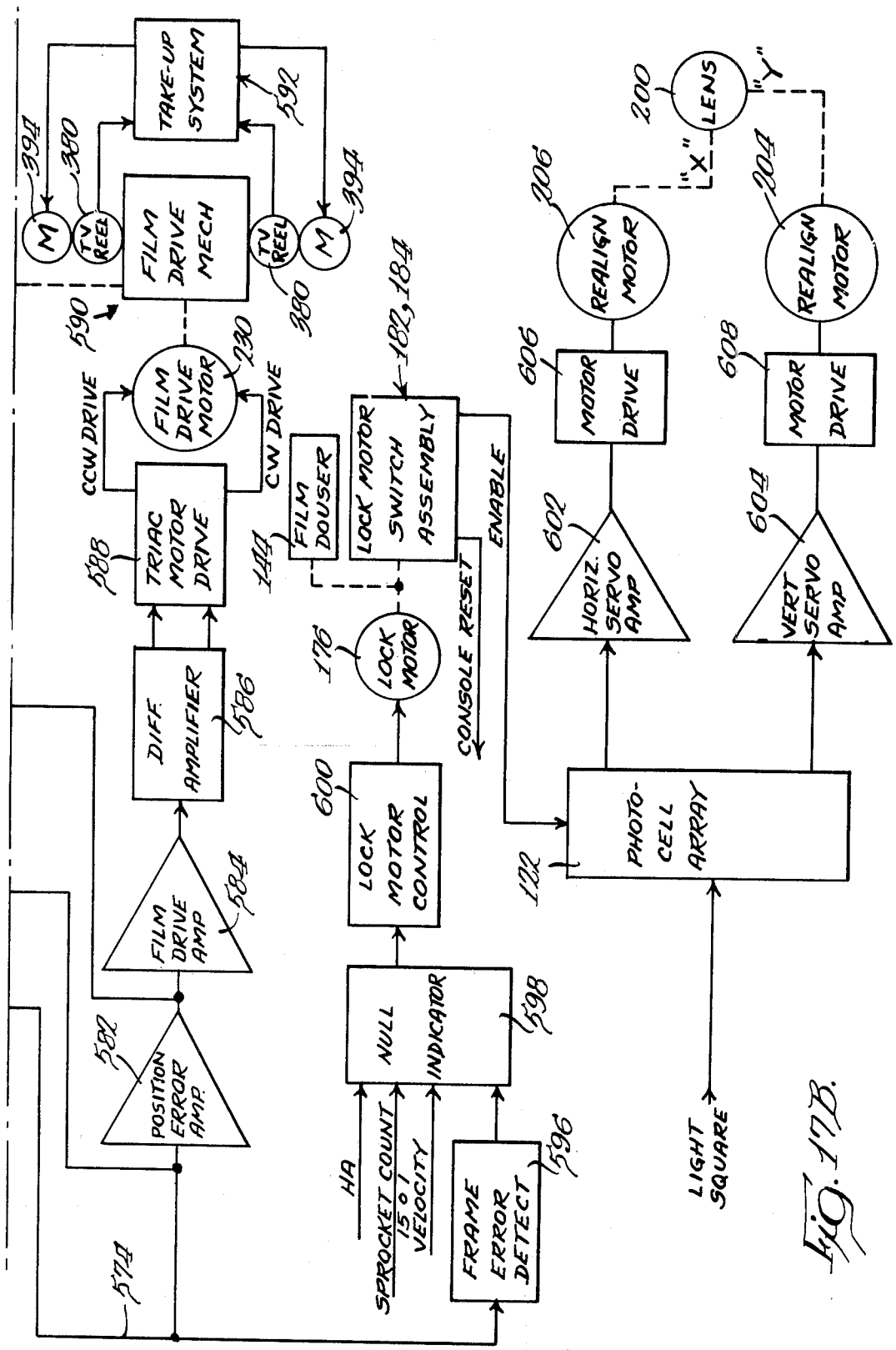

The control section of the projecting system is illustrated in block form in FIGS. 17a and 17b and is seen to include a console 550 which houses switches for providing scene selection command information to the remainder of the system. The console 550, as will be seen, provides three types of information, the first commanding the selection of the scenes for a given one of the eighteen holes that may be played; the second for commanding any one of ten groups of scenes within the total number of scenes for the hole; and the third for commanding any one of ten frames within the last mentioned group.

The information outputs from the console are therefore designated 1-18 representing the hole being played, A-K representing the ten groups of scenes for any given hole (there is no I output as the use of the letter I could cause confusion with the numeral 1); and 1-10 indicating the particular frame within a selected A-K group.

The commanded 1-18 signal is fed to a hole acquisition and hole direction control designated 552 and the same provides output information indicating whether the commanded hole corresponds to the hole then being displayed. This information is fed to a hole error generator 554 which, in turn, provides a hole error signal for use in a servo system when an error exists.

Hole direction control information from the block 552 is also provided to a hole counter 556 which contains information identifying the hole of the scenes then in the projection station. The hole counter 556 provides such information back to the hole acquisition and hole direction control 552 so that the latter can determine whether a difference exists and provides such information to the hole error generator 554.

The hole counter 556 receives information relative to the hole in the projection station from a NAND gate 558 acting as an OR gate which in turn receives hole count information from either one of a shaper 560 or a skip circuit 562, the latter also receiving information from the shaper 560. The shaper receives hole count information from a tachometer processor 564 which is associated with a film photocell array 556 including the photocells 272 mentioned previously whereby the shaper ultimately provides a pulse to the hole counter 556 each time the projector runs from the scenes of one hole to the scenes for the next. The skip circuit 562 is operative only when the projector is running down to the commanded hole to cause the hole counter 556 to skip the first hole count during such downward movement. It will be recalled that the projector, when running down, runs down to the commanded hole and then runs up to the selected frame within the hole. Now if, for example, the actual hole position was hole #6 and it was desired to run down to hole #5, upon energization of the projector, the same would begin to run down and in crossing from the scenes for hole #6 to the scenes for hole #5, a hole count pulse would be generated and logic locking the skip circuit 562 would indicate that hole #5 had been acquired. The projector would then run upwardly to the selected frame. However, in such a case, the selected frame would be for hole #6 and the result would be a selection error. Therefore, when the projector is running downwardly, the skip circuit 562 is operative to cause the hole counter 556 to skip the first hole count so that the first hole count pulse would be generated at the transition from the scenes of hole #5 to the scenes of hole 190 4. Accordingly, the projector would then begin to run upwardly to the selected frame which would be a selected frame in the group of frames for hole #5.

Returning to the tachometer processor 564, it will be seen that it receives other information from the photocell array 566. Specifically, start of film information and end of film information is provided to the tachometer processor 564 by the film photocell array 566.

The tachometer processor 564 further receives information from the photocell disc 302 in the form of sprocket count information.

A digital analog converter 568 also receives inputs from the console 550 and specifically, binary coded A-K and 1-10 signals mentioned previously. Frame feedback information to the digital to analog converter 568 is received from a frame counter 570 which contains information corresponding to the actual frame in the projection station for comparison with the commanded frame position by the digital to analog converter. Any resultant error is fed to an analog frame error generator 572 and the output of the same is connected in common with the output of the hole error generator 554 to a line 574.

The frame counter 570 receives direction control information from a digital filter and direction control circuit 576 which, in turn, determines such information from sprocket count information processed by the tachometer processor 564 after being received thereby from the photocell disc 302. Sprocket information received by the circuit 576 is also fed to a velocity generator and sprocket count shaper 578. The latter then provides sprocket count information to a sprocket counter 580 which, like the frame counter 570, receives direction control information from the circuit 576.

The sprocket counter 580 normally contains information as to the actual position of a frame in the projection station based on sprocket count and such information is employed in generating a frame count signal which is used to step the frame counter 570. That is, actual frame position information is generated within the frame counter 570 as a result of input information from the sprocket counter 580.

Sprocket count information from the counter 580 is also fed to a sprocket corrector 581 which generates a sprocket error signal by comparing actual sprocket count information with a preset standard known, due to film geometry, to be necessary for proper positioning of a frame in the projection station. The sprocket error information is placed on the line 574 as the latter is taken as an input to a film position error amplifier 582. The position error amplifier 582 in turn drives a film drive amplifier 584 which, in addition to receiving the position error information from the amplifier 582, also receives velocity information from the velocity generator 578 and employs the same on a so-called "velocity loop" to maximize the projector response to an input command.

The combined position error and velocity error output of the film drive amplifier 584 is then fed to a differential amplifier 586 which in turn operates a conventional bidirectional triac motor drive system 588 which controls the rate of speed and direction of movement of the output shaft of the film drive motor 230.

As indicated in FIG. 17b, the film drive mechanism, generally designated 590 in FIG. 17b, is mechanically linked to the motor 230 and to the disc 302 and the film photocell array 566 as well as the film storage reels 380 and their respective motors 394. A conventional control system, generally designated 592, may be employed to control operation of the motors 392 in response to movement of the dancer arms mentioned previously.

Also included is a frame error detector 596 which receives an input from the line 574 as is associated with a null indicator 598. The null indicator 598 receives hole acquisition information, sprocket count and velocity information, as well, to determine when all three types of the errors mentioned previously, namely, hole errors, frame errors and sprocket errors, have been eliminated by response of the film drive motor 230 to operate a lock motor control circuit 600. The lock motor control circuit 600 when null is achieved, causes the lock motor 176 to bring the cams on the cam shaft mentioned previously into engagement with the respective cam followers so that the projector will go through the mechanical positioning mode as mentioned previously. When a null indication is removed as, for example, when a new scene is selected, the lock motor control system 600 will cause the lock motor 176 to rotate the cam shaft in the opposite direction to remove the cams from engagement with the respective cam followers and permit operation of the servo system to select a new scene. The lock motor 176 is mechanically connected to the dowser 144 as well as to the lock motor switch assembly including the switch banks 182 and 184 for various purposes mentioned throughout the specification. One such functional purpose is the enabling of the photocell array 172 which receives the projected light square. The photocell array 122 provides both horizontal position information and vertical position information, all relative to the position of the projected image with regard to a predetermined light path. This information is fed to respective servo amplifiers 602 and 604 which in turn operate motor drives 606 and 608 respectively. The motor drive units in turn operate respective ones of the motors 204 and 206 to shift the position of the lens 200 and thus the position of the projected image. The control circuits including the amplifier 602 and 604 in the drive system 606 and 608 may be of conventional construction.

Returning now to FIG. 17a, the tachometer processor 564 also provides end of film and start of film information to a block 610 which is operative to cause the projector to run down to the start of the film when an end of film signal is received as well as to cause the same occurrence when the entire system is energized following a shutdown. Logic performing various safety functions is also included in the block 610.

Finally, there is provided an automatic scene changing block 612 which, upon certain occurrences, directs the projector to display a scene of little value such as an advertising scene so that scenes containing important information are not exposed to the light source of the projector for a long period which could result in substantial fading thereof.

Figure 18:
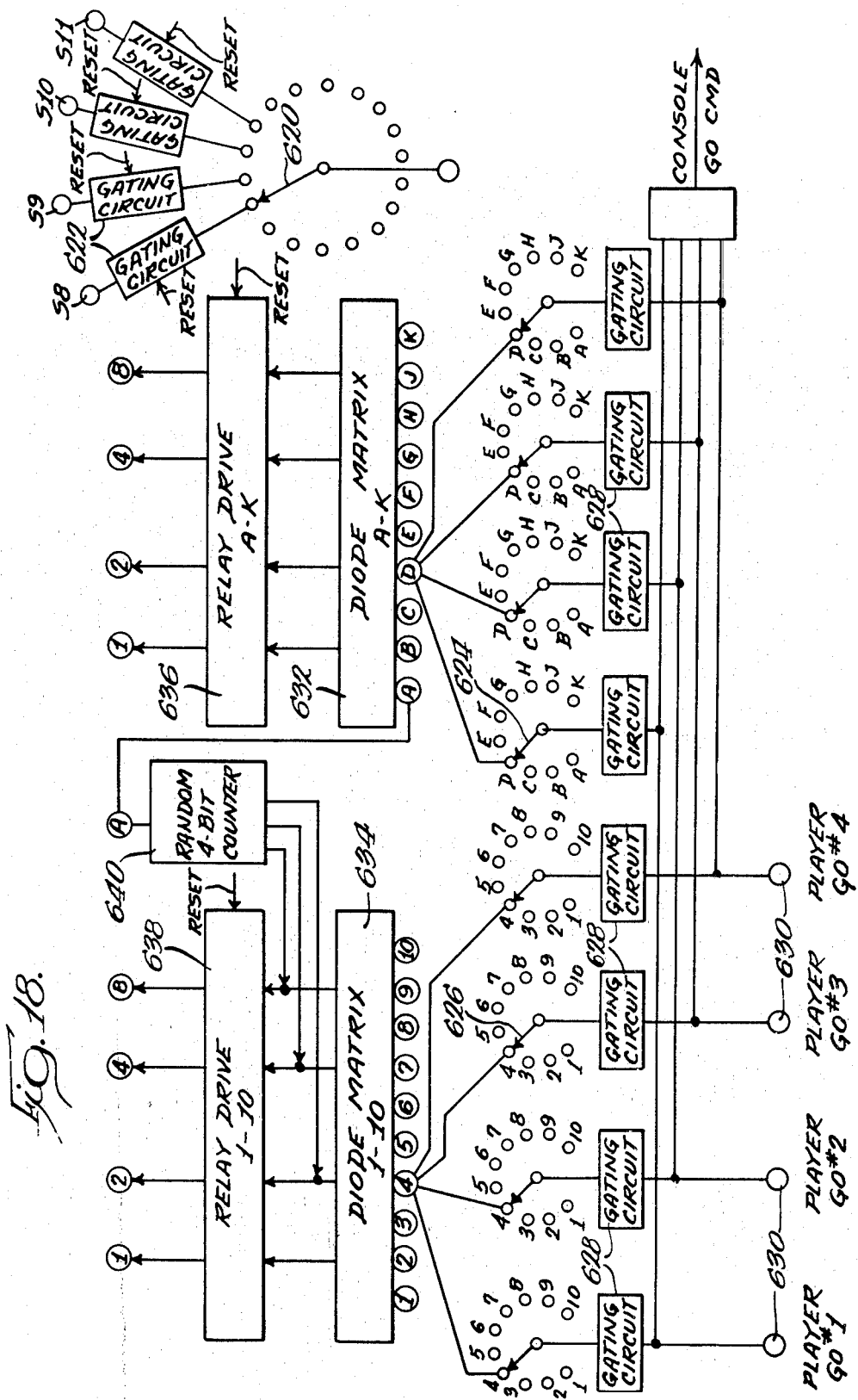
FIG. 18 is a block diagram of manual controls for scene selection purposes.

Turning now to FIG. 18, the logic contained within the console 550 is illustrated in block form and is seen to comprise an eighteen-position rotary switch 620 which a golfer may manually set to select the scenes for any one of the eighteen holes being played. Each of the contacts of the rotary switch 620 provides a respective output signal S1-S18 through respective gating circuits 622 which act as buffers. Specifically, once the switch 620 has been set at a desired position and the projector operation has been initiated, the gating circuits 622 are operative to allow only the selected hole signal to be issued to the scene selection logic and preclude any other signal from being issued as, for example, if a golfer attempted to change the position of the switch 620 while the projector was selecting a scene, until the scene selection process is terminated.

The console logic also includes eight ten-position rotary switches including one group of four switches 624 and another group of four switches 626. One each of the switches 624 and 626 is assigned to a particular golfer for manual operation by that golfer with the switches 624 providing information relative to any one of ten groups (A-K) of frames within the frames for a particular hole and the switches 626 designating a particular frame (1-10) within a selected group. Associated with the wiper of each of the switches 624 and 626 is a gating circuit 628 which is provided for the same purpose as the gating circuit 622.

The purpose of providing a switch 624 and a switch 626 for each golfer is as follows. As is well-known in the game of golf, the golfers do not play their shots in a predetermined order. Rather, the order in which the golfers play their shot is dependent upon the previous shot. For example, it is customary that, for a tee shot, the golfer achieving the best score on the hole preceding shoots first while the golfer achieving the worst score on such a hole shoots last. For shots other than tee shots, it is customary that the golfer furthest from the cup hit before the other golfers. Since the golf game will provide each golfer with information relative to the point of termination of his shot following each shot, and more often than not, another golfer will then take a shot before the first player takes a subsequent shot, it is desirable to provide means capable of retaining the information relative to the point of termination of the first golfer's first shot and the switches 624 and 626 serve this purpose. For example, if a golfer observes that his shot terminated in a zone that requires the next scene to be displayed by that designated, for example, C7, upon noting the point of termination of his shot, he need merely set his assigned switch 624 to the C position and has assigned switch 626 to the 7 position and await the completion of shots by the other golfers until his turn comes up next before energizing the projector to display the scene for zone C7.

To further serve this end, each player is further assigned a given one of four GO switches 630. The GO switches 630 are arranged so that the associated player's switches 624 and 626 cannot be energized for scene selection purposes until the GO switch 630 is temporarily closed and the gating circuits 628 are operative to prevent more than one player's GO command from being issued at the same time. Any one of the switches 630 may issue a CONSOLE GO COMMAND signal to initiate scene selection as will appear.

The information from the switches 624 is fed to a A-K diode matrix 632 which then converts the single signal received from a given one of the switches 624 to a binary coded command. Similarily, a 1-10 diode matrix 634 converts the single signal issued to it by a given one of the switches 626 to a binary coded signal.

The diode matrices 632 and 634 are associated with relay drives 636 and 638 respectively which issue commands to other logic to be described in greater detail hereinafter.

The console electronics further include a four bit binary counter 640 which is stepped one count each time one of the switches 624 is closed through its A contact and the corresponding GO button 630 is pushed. Associated with the counter 640 is a decoding matrix of a conventional construction that is arranged to override the 1-10 diode matrix 634 in issuing commands to the relay drive unit 638 in the following manner. Every second time that an A1 command is issued by the switches 624 and 626 in conjunction with their associated GO button 638, the relay drive unit 638 will issue a binary signal that is two counts higher than that for which it was previously programmed in the 1 position. Thus, the first two times A1 is selected, the command from the relay drive unit 636 and 638 will be A1. The following two times that A1 is selected, the output command will be A3. The next two times, A5 will be issued while for the next two times, A7 will be issued. The arrangement is such that A9 is not controlled by the counter 640. The arrangement is further such that the same sequence of events occurs when A2 is programmed in through the switches 624 and 626. In this case, every second time that A2 is selected, the commands issued will step through the sequence of A2, A4, A6 and A8. Again, A10 is not used.

The purpose of the foregoing logic is as follows. In correlating the scenes of a golf hole with the location on the hole, the men's tee location is arbitrarily designated as A1 while the ladies' tee position is arbitrarily designated A2. Since all tee shots for a given hole will be hit from position A1 or position A2 depending upon whether the men's or the women's tee are being used, the scenes corresponding to positions A1 and A2 receive the most usage and therefore are more prone to film fading. And of course, when certain scenes on the film have faded sufficiently, the entire film must be disposed of or repaired. In order to minimize maintenance, four identical men's tee scenes are placed on the film strip for each hole for the A1 position and are located on the film strip at positions A1, A3, A5 and A7 while four additional tee scenes corresponding to the women's tee are employed on the film strip at positions A2, A4, A6 and A8.

As a result, even though the golfer commands the designated tee scene as either A1 or A2, he may be viewing any one of the scenes of A1, A3, A5, A7 or A2, A4, A6, A8, respectively. And since the use of such scenes is evenly distributed amongst the four in each group by the counter 640, film fading will be minimized thereby substantially prolonging the life of the film.

Summarizing, the console electronics provide any one of eighteen signals designating a hole, provide four binary coded signals designating any one of ten groups of frames within the frames for a particular hole, four binary coded signals designating a particular frame within a designated group, and provide a CONSOLE GO COMMAND signal to initiate a scene change.

Figure 19A:
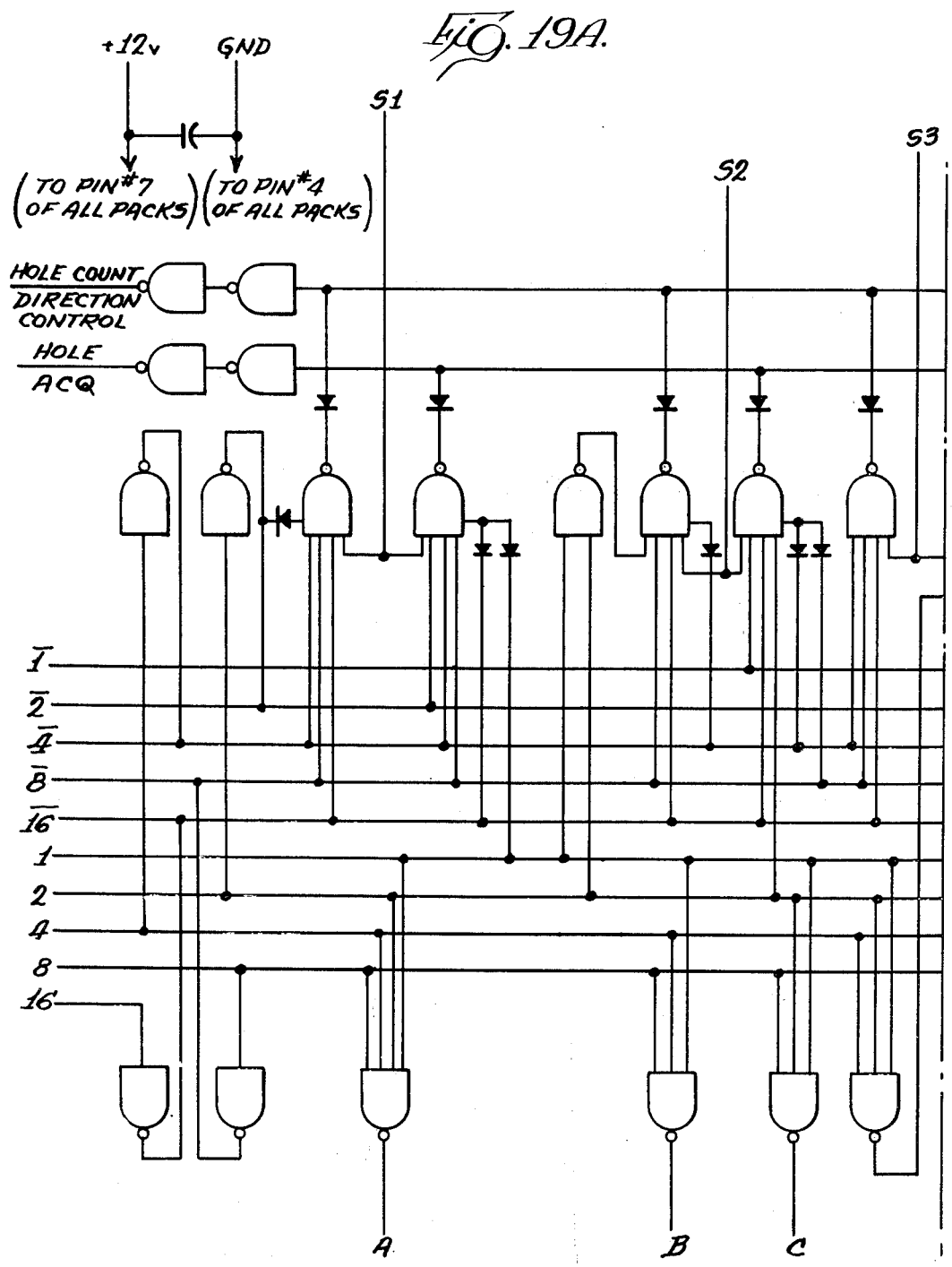
FIGS. 19 and 20 are logic diagrams of logic employed to select the frames for a particular hole and to provide direction control information.
Figure 19B:
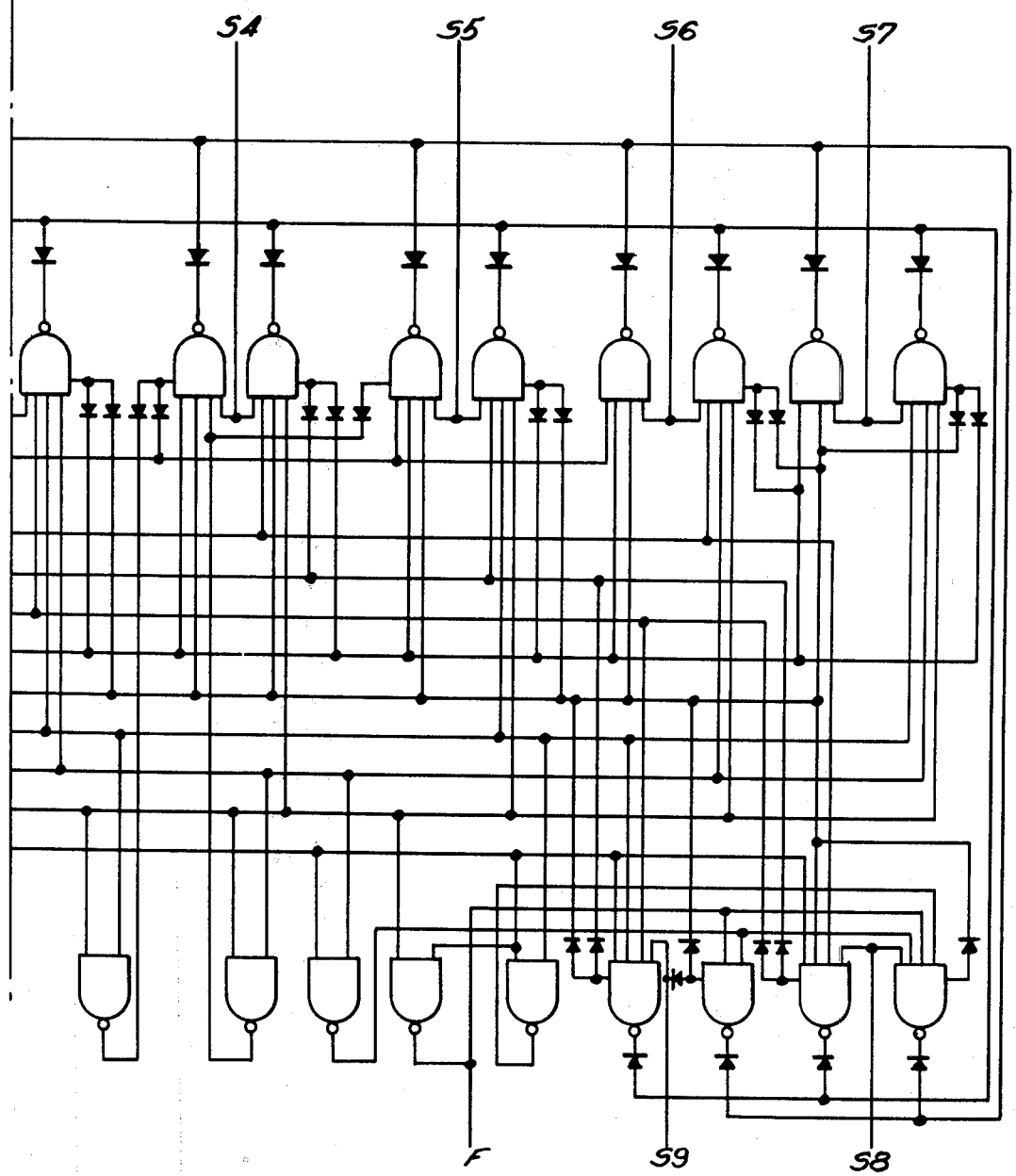
Figure 20:
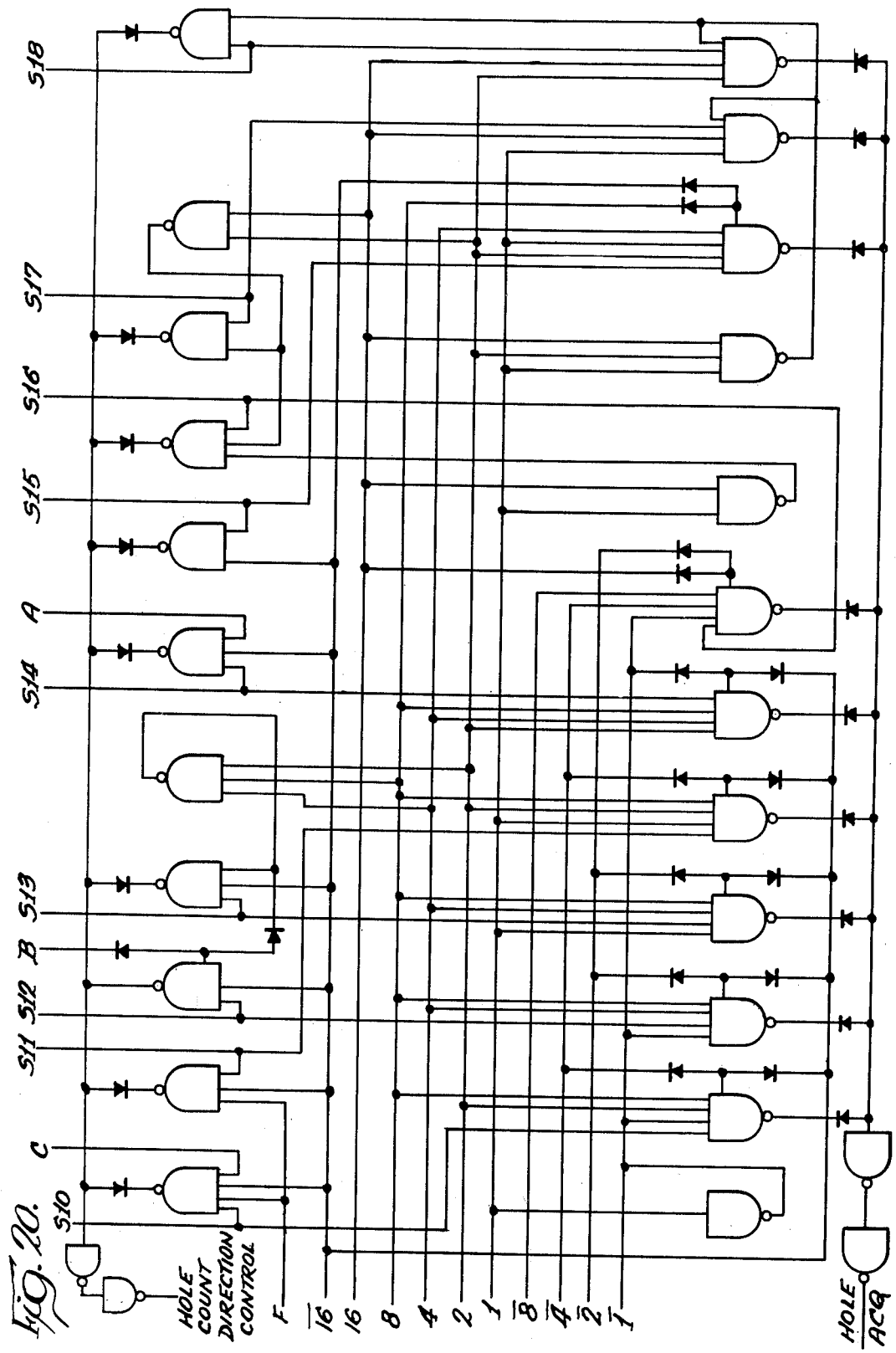

Referring now to FIGS. 19A, 19B and 20, the gating employed in the hole acquisition and hole direction control logic 552 may be seen. The logic employed is basically that of a comparator which compares actual hole position information from the hole counter 556 with command hold position information generated in the console 550 to not only provide an indication whether command position or the actual position are equal or unequal, but an indication whether the actual position is above or below the command position if the two are not the same.

FIGS. 19A and 19B indicate that portion of the comparator which receives command information relative to any of holes 1 through 9, inclusive, while FIG. 20 illustrates that portion of the comparator which receives command position information relative to holes 10-18, inclusive. The terminals marked S1-S18 in FIGS. 19A and 19B and 20 are connected to the console 550 to receive a signal representative of the commanded hole. For example, if the commanded hole is hole #1, a signal will be placed on the terminal S1 shown in FIG. 19A.

Additional input information is supplied to the logic blocks illustrated in both FIGS. 19A and 20 from the hole counter. Specifically, the leads designated 1, 2, 4, 8, 16 in both figures are connected to corresponding outputs of the hole counter to receive binary coded information relative to the actual hole position. Various inverting circuits as shown in both FIGS. 19A and 20 utilize the 1, 2, 4, 8, 16 signals to provide $\overline{1}, \overline{2}, \overline{4}, \overline{8}$ and $\overline{16}$ signals which are used elsewhere in the logic shown in FIGS. 19A, 19B and 20 as indicated. Furthermore, signals designated A, B, C and F generated by the logic shown in FIGS. 19A and 19B are employed as inputs where indicated to logic in FIG. 20.

The control outputs from the logic shown in FIGS. 19A, 19B and 20 are two in number. One is designated HOLE ACQUISITION and the terminal bearing the legend will have a signal of a particular polarity placed thereon when the actual hole location disagrees with the commanded hole location. The absence of such a signal indicates that the commanded position and the actual position are in agreement viz, the commanded hole has been acquired.

The second output is designated HOLE COUNT DIRECTION CONTROL. The output signal on this terminal will have a signal representing a "one" when the actual hole position is greater than the commanded hole position and an absence of signal or zero when the reverse is true.

Figure 21A:
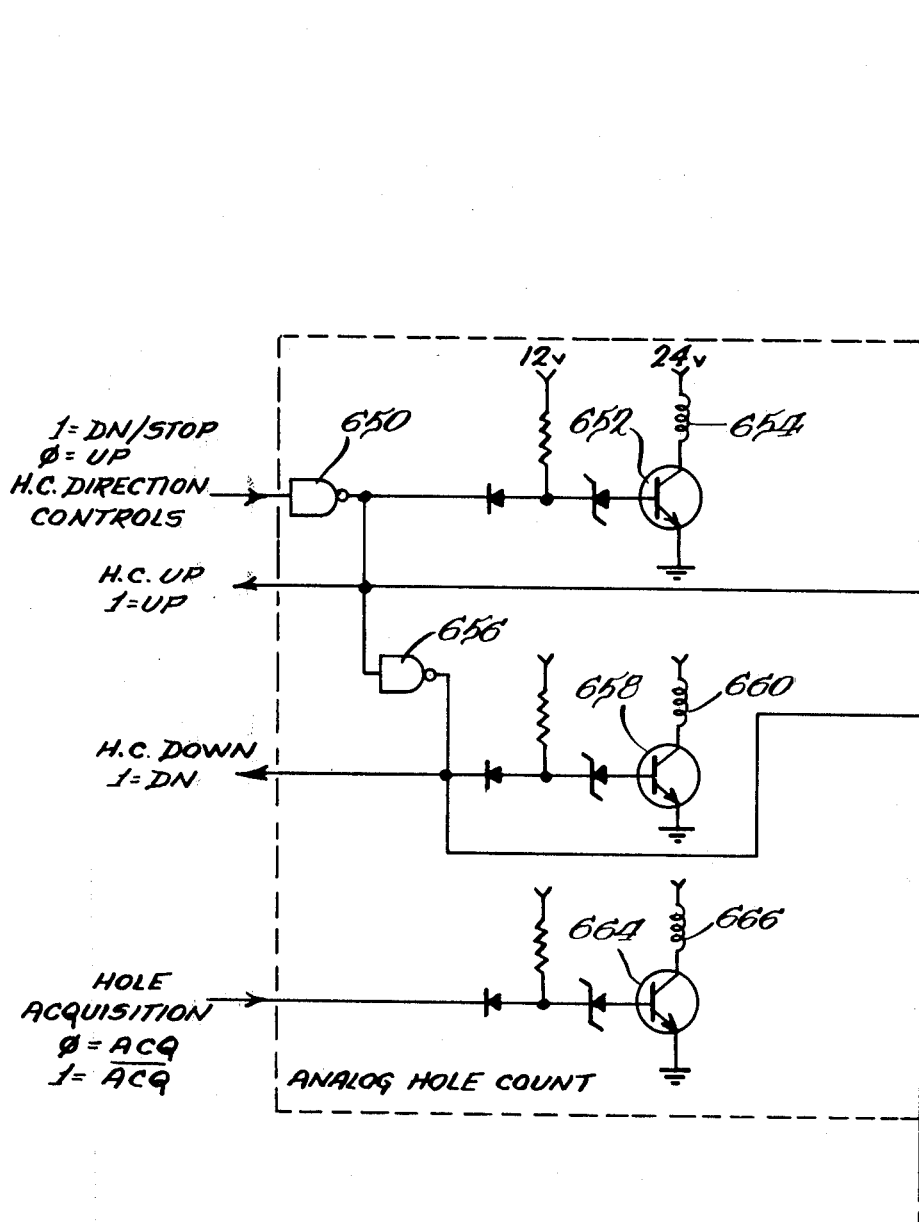
FIG. 21 is comprised of FIGS. 21a and 21b, with FIG. 21b to be located at the right hand margin of FIG. 21a and illustrates direction control logic and position error generating logic.

Referring now to FIG. 21A the HOLE COUNT DIRECTION CONTROL signal is placed as an input to a gate 650 which in turn is connected to a transistor 652 having a relay coil 654 in its emitter-collector circuit. The arrangement is such that when the polarity of the HOLE COUNT DIRECTION CONTROL signal is such as to indicate that the commanded hole position is above the actual hole position, the relay 654 will be energized.

The output of the gate 650 is inverted by a gate 656 which is operative to drive a transistor 658 having a relay coil 660 in its emitter-collector circuit. The arrangement is such that the relay 660 will be energized whenever the relay 654 is deenergized and vice versa. The logic also includes an output interposed between the gates 650 and 656 for issuing a HOLE COUNT UP command as well as an output connected to the output of the gate 656 for issuing a HOLE COUNT DOWN signal. Both the HOLE COUNT UP and HOLE COUNT DOWN signals are additionally fed to a skip circuit, generally designated 662, which cause the hole counter 556 to skip the first hole count when the system is running down.

A second input to the logic illustrated in FIG. 21A from the hole acquisition logic shown in FIGS. 19A, 19B and 20, namely, the HOLE ACQUISITION signal, is fed as an input to a transistor 664 having a relay coil 666 in its emitter-collector circuit with the arrangement being such that whenever the polarity of the HOLE ACQUISITION signal is indicative of the fact that the commanded hole position is not the same as the actual hole position, the relay 666 will be energized.

The relays 654, 660 and 666 are operative to normally provide a hole position error signal whenever the commanded hole position does not equal the actual hole position and to change the polarity of the error signal dependent upon whether the actual hole position is above or below the commanded hole position. To this end, there is provided a voltage divider network, generally designated 668. The center of the network is connected through normally open contacts 666a operated by the relay 666 to an output line 670 which issues an ANALOG HOLE COUNT ERROR signal. One leg of the network 668 is connectable to positive power through a set of normally open contacts 660a of the relay 660 while the other leg of the network 668 is connectable to the negative side of power through normally open contacts 654a of the relay 654.

The operation will therefore be seen to be as follows. When the commanded hole has not been acquired, the relay 666 will be energized thereby closing the contacts 666a to permit an output error signal to be placed on line 670. If the commanded hole count is less than the actual hole count, the relay 660 will also be energized thereby closing normally open contacts 660a to permit a positive signal of constant magnitude to be placed on the line 670. However, if the error is such as to direct the projector upwardly, i.e., the commanded position is greater than the actual position, the relay 654 will be energized thereby closing the contacts 654a to provide a negative signal of constant magnitude on the line 670.

The resulting error signal is used in driving the film drive motor 230 until such time as the commanded hole position is equal to the actual hole position (hole acquisition has taken place) at which time the relay 666 will be deenergized thereby opening the contacts 666a to eliminate the hole count error signal.

The skip circuit 662 includes a two bit binary counter consisting of a pair of JK flip-flops designated 671 and 672 with the flip-flop 671 being preset to binary one. The skip circuit also includes an output gate 673 which receives an input from the gate 656 to sense when the projector is running down. The second input to the output gate 673 is taken from the flip-flop 672 and, when the flip-flop 672 is reset, corresponding to binary zero in the second digit, and when the computer is running down, the output gate 673 generates a SKIP CIRCUIT COMMAND to inhibit counting by the hole counter. However, since it is only necessary and desired to skip one hole count when the projector is running down, other logic is provided to disable the output gate 673 after the first hole count pulse in a count sequence is present. In particular, there is provided a gate 674 which is connected to receive hole count pulses and which is operative to provide a pulse to the flip-flop 671 each time a hole count pulse is received. Since the flip-flop 671 is preset to a binary one condition, when the first hole count pulse is received, the same will switch to a binary zero and will cause the flip-flop 672 to become set corresponding to a binary one at the second digit and the change in state of the flip-flop 672 will disable the output gate 673.

The flip-flop 671 and 672 will then be held in this condition until the projector begins to run up or a null is achieved as sensed by a gate 675.

Figure 22A:
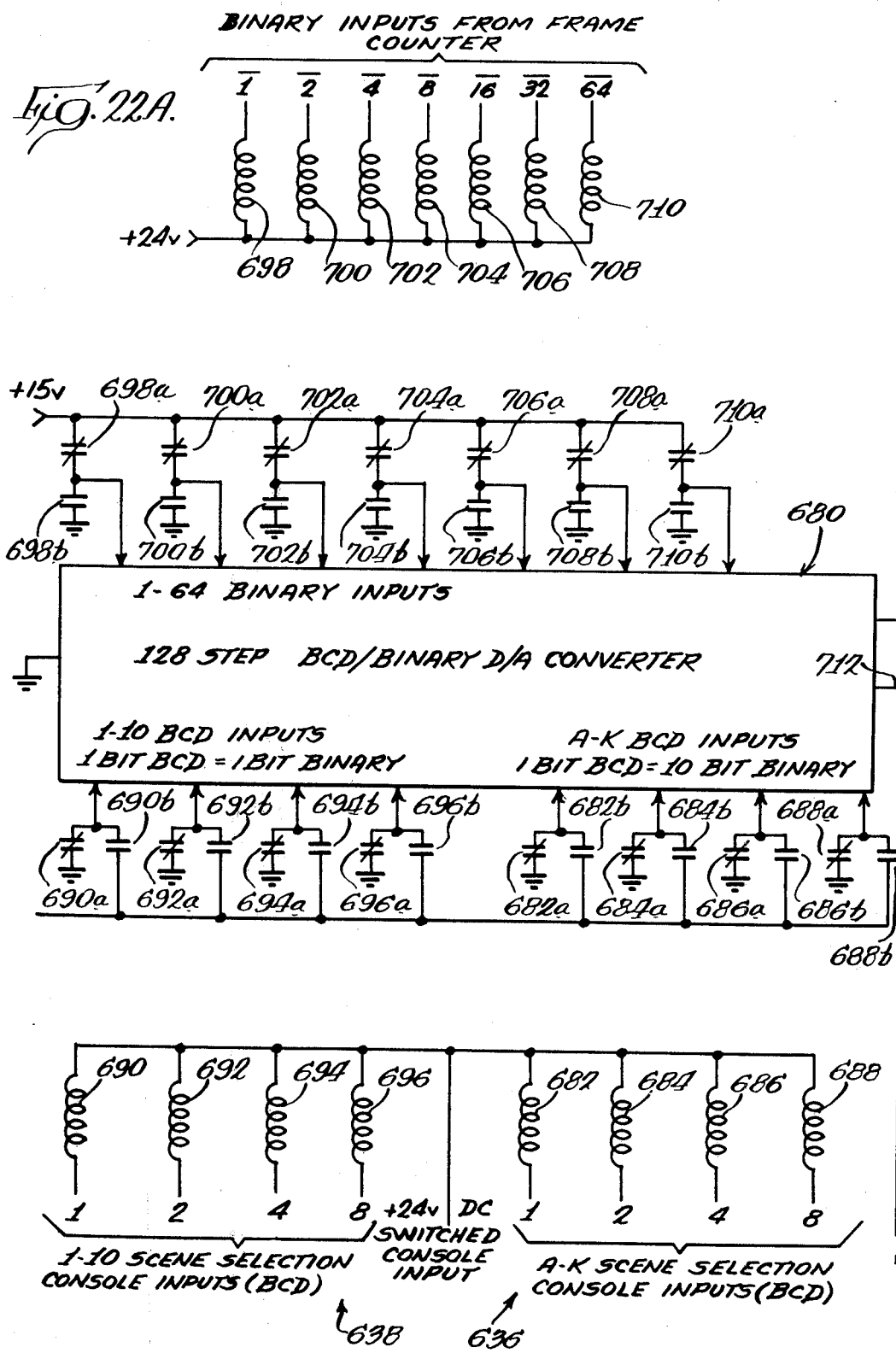
FIG. 22 is comprised of FIGS. 22a and 22b with FIG. 22b to be located at the right hand margin of FIG. 22a and ilustrates a digital analog conversion matrix for providing frame error signals.
Figure 22B:
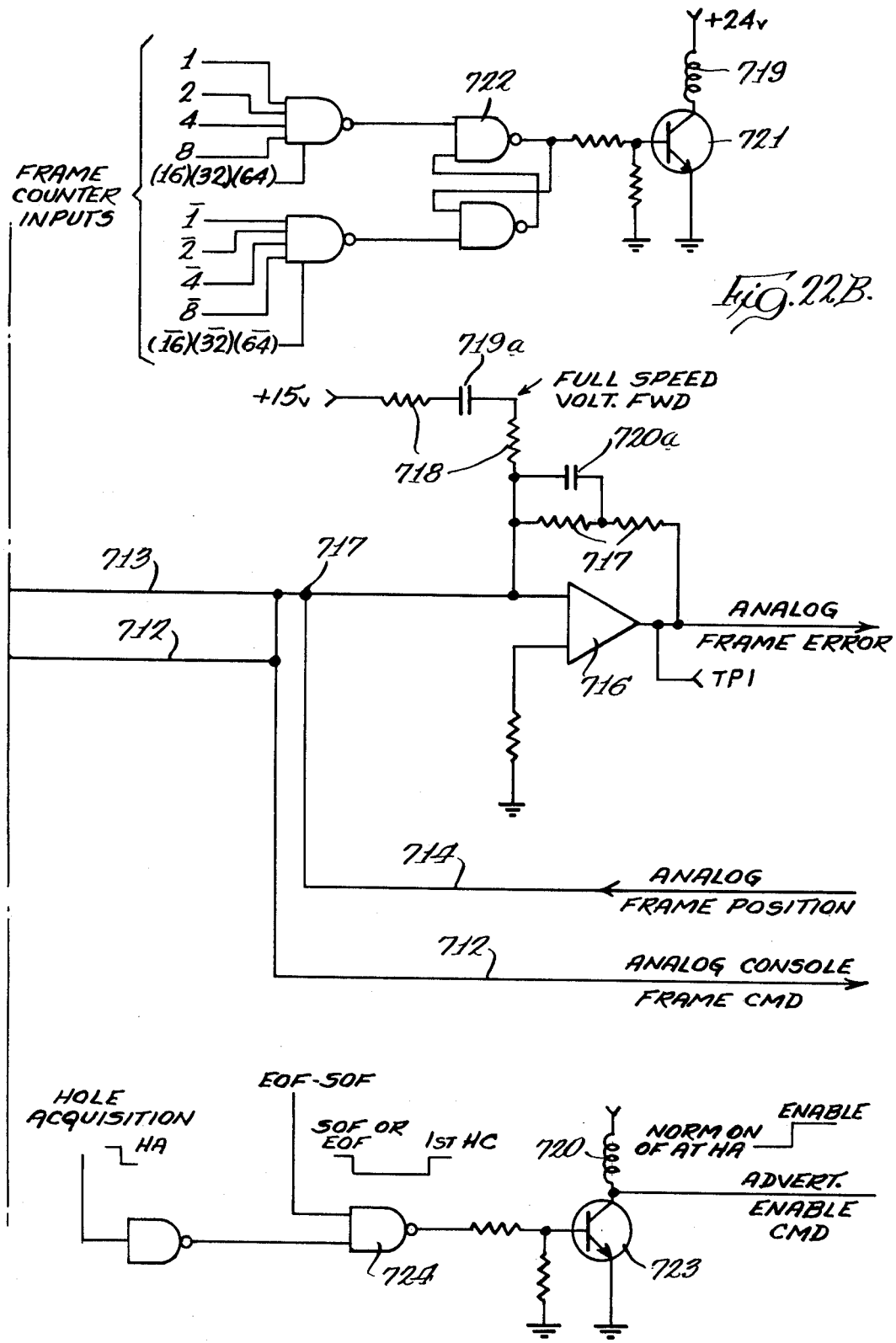

FIGS. 22A and 22B illustrate means for utilizing the signals from the console 550 in the scene selection logic with regard to the A-K and 1-10 inputs for generating a frame error signal.

With reference specifically to FIG. 22A, there is provided a conventional 128 step binary coded decimal binary digital to analog converter, generally designated 680. The relay drive unit 636 (see also FIG. 18) is seen to comprise four relays 682, 684, 686 and 688 which are connected to the 1-8 outputs of the diode matrix 632 shown in FIG. 18, respectively. Similarly, four relays, 690, 692, 694 and 696 comprise the relay drive unit 638 shown in FIG. 18. Each of the relays is operative to control a pair of normally closed contacts designated by the same numeral as the corresponding relay followed by a subscript "a" and a pair of normally open contacts identified by the same numeral as the corresponding relay and followed by the subscript "b". Thus, the relay 688 includes normally closed contacts 688a and 688b.

One side of the "a" contacts of each of the relays is connectable to ground through the corresponding "b" contact while the other side is connected to power as indicated and the common junction of a and b contacts of each relay is connected as an input to the digital to analog converter 680. As a result, the digital scene selection command from the diode matrices 632 and 634 and generated by the switches 624 and 626 (FIG. 18) is converted to an analog signal.

The second set of inputs to the digital to analog converter 680 is provided by any one of a plurality of seven relays 698, 700, 702, 704, 706, 708 and 710 which are driven by the frame counter 570 (FIG. 17A). Each of the relays 698-710 includes normally closed or "a" contacts and normally open or "b" contacts with the normally closed contacts being connected to power and the normally open contacts being connected to ground. The common junction of the contacts of each relay is connected to the digital to analog converter 680. As a result of the foregoing, the digital to analog converter 680 is also provided with actual frame position information.

The digital to analog converter 680 further includes an output line 712 on which a voltage related to the commanded frame is issued, which voltage is determined by the setting of the controls on console. A second voltage signal from the digital to analog converter 680 is impressed upon a line 713 and is related to the actual frame in the projection station for feedback purposes. The second voltage signal is determined by the count contained in the frame counter.

The line 712 is connected to the null indicator 593 (FIGS. 17b and 31a) where it is gated for purposes to be described in detail hereinafter and returned on a line 714. Both the line 714 and the line 713 are connected as inputs to a differential amplifier 716 at a common summing junction 717. As a result of the foregoing, the input to the amplifier 716 from the summing junction 717 will correspond to the error between the commanded frame position and the actual frame position and the amplifier 716 will therefore provide an output entitled ANALOG FRAME ERROR signal for use as will be seen.

The circuit including the amplifier 716 further includes a branch across the amplifier 716 including a pair of resistors 717. Also connected to the input of the differential amplifier 716 is a resistive string including resistors 718 connected to a positive source of power with the string including normally open contacts 719a of a relay 719. The circuit is completed by a shunting branch for one of the resistors 717 including normally open contacts 720a of a relay 720.

The relay 719 is in the emitter-collector circuit of a transistor 721 which may be turned on when a flip-flop 722 is set. As indicated in FIG. 22b, when all bits of the frame counter are set, the flip-flop 722 will be set. On the other hand, when all bits of the frame counter are reset, the flip-flop 722 will be reset. In other words, the relay contacts 719a will be closed from a time beginning with an all bit set condition in the frame counter and will be opened when, following the above occurrence, all bits are in a reset condition. The purpose of the foregoing construction is as follows.

It will be recalled that when the commanded hole is below the actual hole, the projector will run downwardly to the beginning of the commanded hole and then run up to the correct frame within the commanded hole. Because of the momentum in the film drive mechanism, when the projector is running downwardly, it will slightly overrun the beginning of the commanded hole and when such happens, the frame counter will first pass through an all bits set condition as it continues to count down during such overrunning. This will result in the setting of the flip-flop 722 and the closing of the contacts 719a to momentarily apply a relatively large, fixed voltage to the input of the differential amplifier 716, which voltage is, in effect, a large position error signal indicating that the projector should run upwardly. The result will be that the projector will begin to run up and as soon as it passes to the desired hole, all bits in the frame counter will momentarily be in a reset condition thereby resetting the flip-flop 722 to open the contacts 719a thereby halting the application of the relatively large, artificial error signal. In operation, the foregoing circuitry provides for a quick reversal of film drive direction so as to minimize the time required to position and display the selected frame.

The relay 720 is in the emitter-collector circuit of a transistor 723 which will be turned on to close the contacts 720a until the commanded hole is acquired. This has the effect of reducing the gain of the amplifier 716 until the commanded hole is acquired and is desirable since the frame error signal is not of great importance until the commanded hole is acquired. By reducing the gain of the amplifier 716, the effect of the frame error is minimized.

A line connected from the junction of the transistor 723 and the relay coil 720 may issue in advertising an ADVERTISING ENABLE COMMAND signal for use elsewhere in the system for permitting the projector to go to an advertising scene of its own accord in a manner to be described hereinafter. In particular, the signal is issued whenever the transistor 723 is not conducting.

Control over the conduction of the transistor 723 is achieved by a gate 724 which may receive a EOF . SOF signal (from FIG. 27) as well as an inverted HOLE ACQUISITION signal. The arrangement is such that whenever the control system indicates that a commanded hole is not being sought or the start of film or end of film conditions are not present, the transistor 723 will be turned off.

A third source of an error signal is the sprocket corrector. As mentioned previously, the mechanical position mode takes place when the selected frame is close to being within a predetermined position within the projection station. With the type of film used, there are sixteen sprocket holes per frame, and due to the geometry of the drive mechanism, whenever the sprocket count is 15, 0 or 1, the selected frame will be sufficiently close to the projection station to be accurately positioned therein by the camming mechanism. However, if the sprocket count were to be twelve, it is possible, although not likely, that the camming mechanism would not be operative to perform the accurate location function while the frame error could be satisfied as well as the hole error. Thus, the sprocket corrector provides an error signal to drive the film until the sprocket count is as mentioned above.

With reference to FIG. 23, the sprocket error signal is issued as a SPROCKET CORRECTION COMMAND signal and is on a line 730 which is connected through normally open contacts 732a of a relay 732 to the common junction of a pair of voltage divider networks generally designated 734 and 736 respectively. The network 734 includes normally open contact 738a operated by a relay 738 and is connected to a positive source of power while the network 736 includes normally closed contacts 738b operated by the relay 738 and is connected to a negative source of power. Thus, when the relay 732 is energized, either a positive or a negative error signal will be placed on the line 730 depending upon whether the relay 738 is energized or deenergized.

The relay 732 is in the emitter-collector circuit of a transistor 740 which has its base connected to a gate formed by a pair of diodes 742. One of the diodes 742 is connected to the output of a pair of gates 744 and 746 respectively while the other diode 742 is connected to a FRAME ERROR terminal illustrated in FIG. 21A.

The gate 744 is connected to outputs of the sprocket counter 580 (FIG. 17A) to detect when the sprocket count is 15 while the gate 746 is similarly connected to the sprocket counter to determine when the sprocket count is 0 or 1.

The arrangement is such that when there is no frame error present and when the sprocket count is 0, 1 or 15, the transistor 740 will be turned off thereby deenergizing the relay 732 to permit the contacts 732a to open to preclude the provision of a sprocket error signal.

The relay 732 is similarly deenergized whenever there is a frame error by virtue of the connection through the diode 742 to receive the FRAME ERROR signal. The purpose of this connection is to preclude intermittant energization and deenergization of the relay 732 when the desired frame has not yet been selected as it will be appreciated that during movement of the film, for each frame, the 15, the 0 and 1 sprocket counts will be generated. In other words, since the relay 732 is deenergized except when there is no frame error, the generation of sprocket counts 2-14, inherent in the operation of the system, as well as the generation of the sprocket count 0, 1 and 15 are not permitted to cause alternate energization and deenergization of the relay 732.

The polarity of the sprocket error signal for direction control purposes is determined by whether the relay 738 is energized or not as this will control the opening and the closing of the contacts 738a and 738b. The relay 738 is driven by a transistor 748 which is responsive to the output of a gate 750. The gate 750 includes a pair of inputs, one from a flip-flop 752 and another from a flip-flop 754.

The state of the flip-flop 752 is dictated by the presence or absence of a POLARITY CONTROL signal generated elsewhere in the logic as will be seen while the state of the flip-flop 754 is controlled by the level placed on a line 756 from logic elsewhere in the system and responsive to the depression of one of the GO buttons 730 (FIG. 18). The arrangement is such that when a GO BUTTON COMMAND has been issued on the line 756 informing the projector logic to select a scene, the flip-flop 754 will issue one enabling input to the gate 750. The nature of the error present at that time will control the condition of the flip-flop 752 so that either an enabling or a disabling input will be issued from its output to the gate 750. If the gate 750 receives enabling inputs on both lines, the transistor 748 will be turned on to energize the relay 738 and issue a sprocket correction command of one polarity. On the other hand, if the condition of the flip-flop 752 is the opposite for that set forth in the previous example due to the presence of an input on the polarity control input of a different polarity, the gate 750 will not be enabled so that the transistor 748 will be turned off and the relay 738 will be deenergized. As a result, a sprocket error signal of the opposite polarity will be issued.

The logic illustrated in FIG. 23 also provides a SPROCKET CORRECTOR INHIBIT signal for use elsewhere in the logic and which is taken off the output of the gates 744 and 746.

The foregoing describes the nature of the command inputs to the system. The feedback signals used to generate the error signals mentioned previously will now be described.

More specifically, the various feedback inputs are generated by the film photocell array 556 and the photocell disc 302. As will be recalled from the description of FIG. 9, the film 106, between each frame, is provided with four discontinuities 282-287. In actuality, in almost every instance, the discontinuities 282-287 are transparent rectangular portions and the absence of a transparent portion is sensed as characteristic of a coding.

One of the discontinuities 282 is used to provide an end of film indication (EOF) while another is utilized to provide a start of film (SOF) designation. That is, one of the discontinuities 282-287 will be black for the start of the film position while another will be black for the end of the film position.

A third of the discontinuities 282-287 will be blackened at the beginning of each hole position. Thus, there will be eighteen blacked-out discontinuities of this type. The fourth and last discontinuity is transparent in all positions and is used as a so-called strobe for synchronization purposes. Thus, there are four possible inputs that can be taken from the film, one a start of film designation, another an end of film designation, a third a designation that the hole count is to be changed and a fourth used for synchronization purposes.

The photocell disc 302 is provided with apertures which cooperate with the photocells 304 in such a way that five possible output signals are generated. Hereinafter, they will be designated A, B, C, D, and E.

Figure 24:
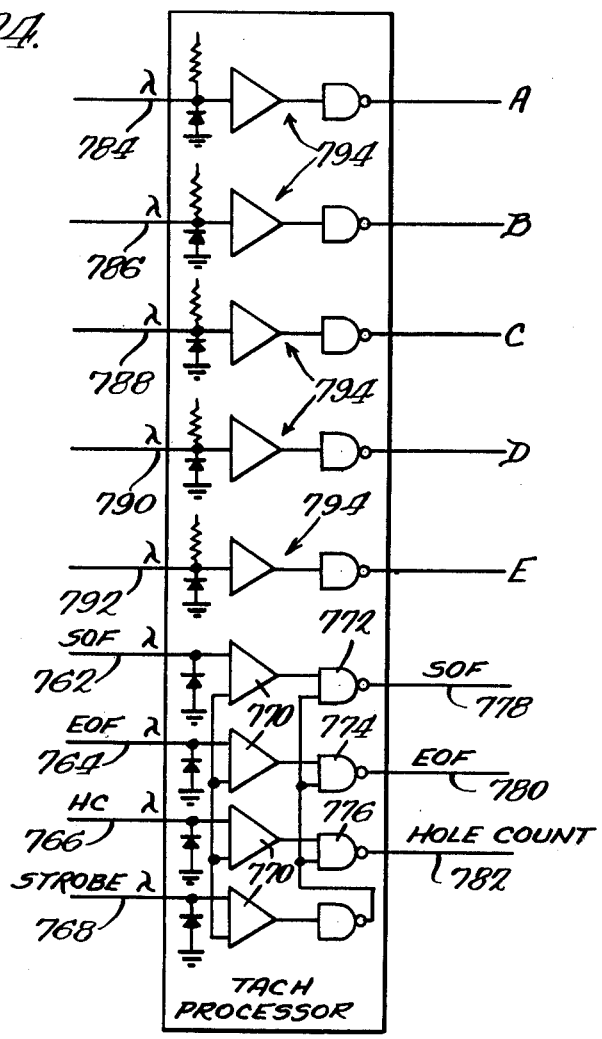
FIG. 24 is a block diagram of a tachometer processor.

Referring now to FIG. 24, the inputs from the film sensing photocells 272 are fed to logic, generally designated 760 on any one of four input lines 762, 764, 766 and 768. Specifically, the photocell arranged to sense the start of film coding is associated with line 762; the photocell for sensing the end of film coding is associated with line 764; the photocell adapted to sense the hole count coding is associated with line 766 and the photocell utilized to sense the discontinuities associated with the strobe are connected to the line 768.

Within the logic block 760 are a plurality of conventional shaping networks 770, one for each of the input lines 762-768. Also included are three logic gates 772, 774 and 776, each performing an AND function. The output from the shaping network 770 associated with the strobe line 768 is fed as an input to each of the gates 772-776 while the gate 772 further receives a start of film pulse; the gate 774 further receives an end of film pulse; and the gate 776 receives a hole count pulse.

It will be apparent from the foregoing arrangement that the gates 772-776 will be enabled only when their corresponding input pulse for start of film, end of film or hole count and a strobe pulse is present. When any one of the foregoing occurs, a start of film signal will be issued by the gate 772 on a line 778; and end of film signal will be issued on a line 780 by the gate 774 and a hole count pulse will be issued by the gate 776 on a line 782. The manner in which such pulses are utilized will be described in greater detail hereinafter.

The inputs from the photocells associated with the photocell disc, five in all, are received on respective lines 784, 786, 788, 790 and 792 are fed to respective shaping networks 794. Each shaping network issues a corresponding output designated in FIG. 25 as A, B, C, D or E.

Figure 25:
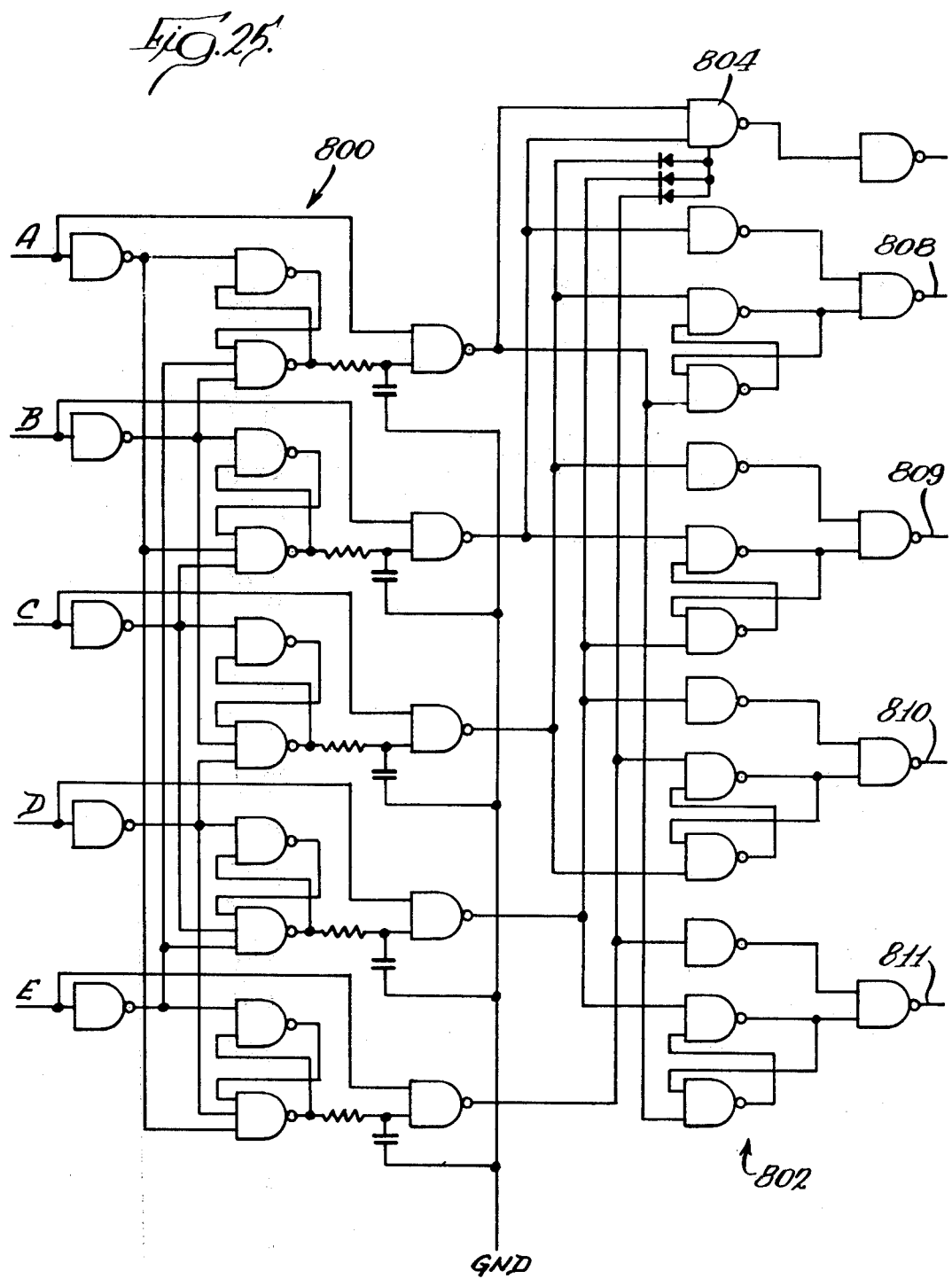
FIG. 25 is a logic diagram and illustrates gating for converting information from the tachometer processor to sprocket count and direction control information.
Figure 26:
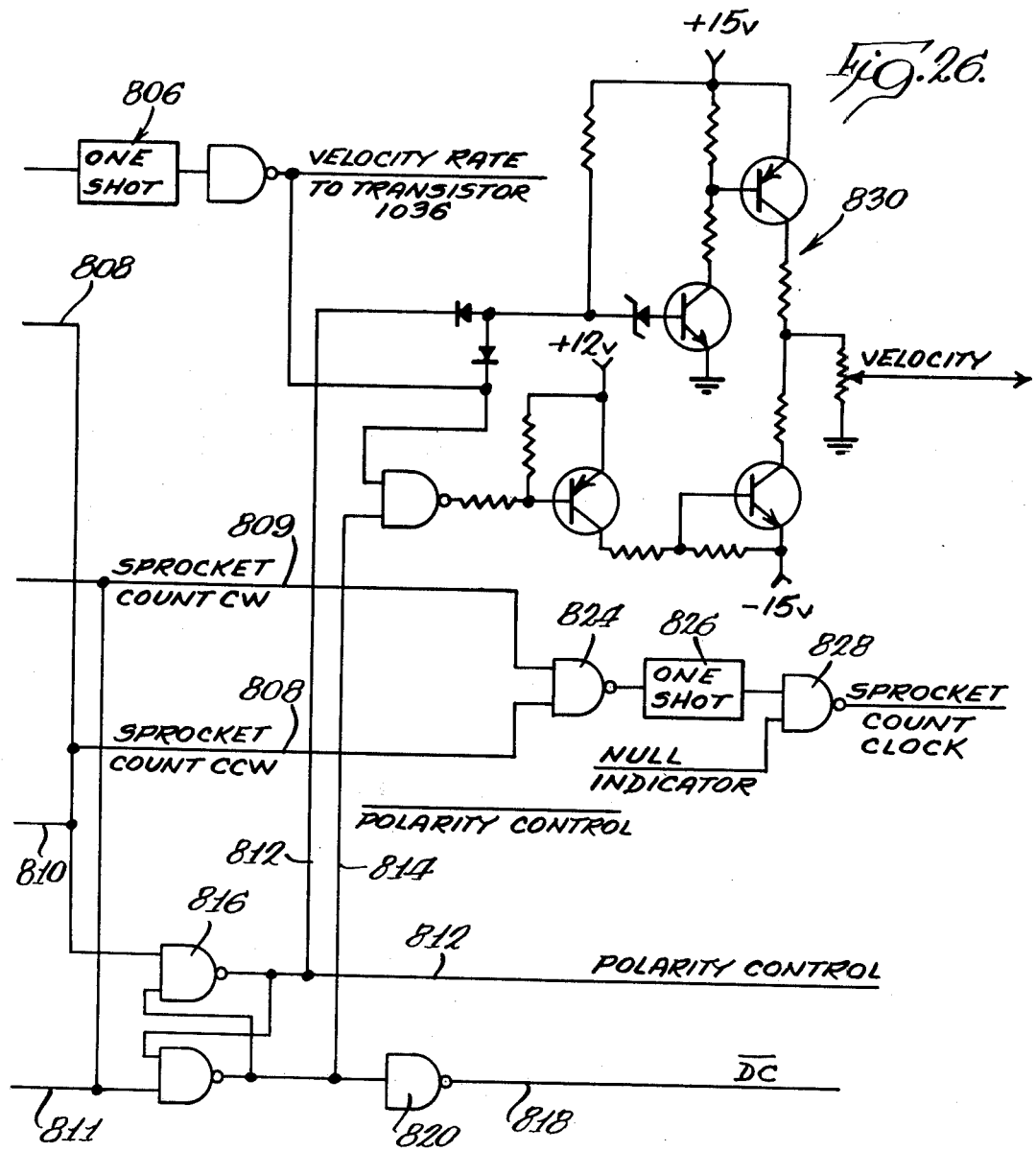
FIG. 26 is a logic diagram of a circuit operative to provide direction control information, sprocket counts and tachometer information.

Referring now to FIGS. 25 and 26, the shaped pulses A-E, inclusive, are firstly fed to a shaping network, generally designated 800 and which acts as a pulse filter and, on respective output lines, are then fed to a sprocket count and direction generator, generally designated 802. One gate 804 in the network 802 serves to sum the pulses and provide an output to a fast recovery one-shot and driver, generally designated 806 which in turn provides an output signal designated VELOCITY RATE as seen in FIG. 26.

The remaining gating in the network 802 is arranged to sense the sequence of the pulses A-E and to issue direction control commands. For example, when the projector is running up, the normal pulse sequence will be A, B, C, D, E while when the projector is running down, the sequence will be the reverse.

In any event, on an output line 808 from the network 802, there may be issued a SPROCKET COUNT COUNTERCLOCKWISE signal while a line 809 provides a SPROCKET COUNT CLOCKWISE OUTPUT signal, both to gating in FIG. 26. Lines 810 and 811 also provide direction control information to gates in FIG. 26.

Lines 812 and 814 (FIG. 26) associated with opposite sections of a flip-flop 816 are arranged to provide POLARITY CONTROL and POLARITY CONTROL signals. Additionally, a line 818 connected through an inverter 820 to the line 814 provides a DIRECTION CONTROL signal.

The VELOCITY RATE signal is utilized to insure that the projector does not run at a higher than desired speed which could cause damage to the equipment. The remaining signals are employed in controlling the polarity of the various error signals as will be seen.

Returning now to the lines 808 and 809, the two are utilized as inputs by a NAND gate 824 providing an OR function which in turn drives a one-shot 826. The output of the one-shot is in turn taken to a NAND gate 828 operating as an AND gate which also receives a NULL INDICATOR signal from the null indicator circuitry as will be seen. The arrangement is such that a SPROCKET COUNT CLOCK signal, shaped by the one-shot 826 is provided, except when null is achieved by the system and consists of a pulse string of 16 pulses per frame.

The circuitry is completed by a multiple transistor circuit, generally designated 830 which receives both the POLARITY CONTROL and POLARITY CONTROL signals as well as a VELOCITY RATE signal from the one-shot 806. The circuit 830 converts the one polarity pulse string generated by the one-shot 806 to a bipolar pulse string, termed a VELOCITY signal, employed in the circuitry illustrated in FIG. 30 as will be seen. The VELOCITY signal will consist of a series of pulses timed dependent upon the velocity rate and having a polarity dependent upon whether the projector is running up or running down.

Figure 27:
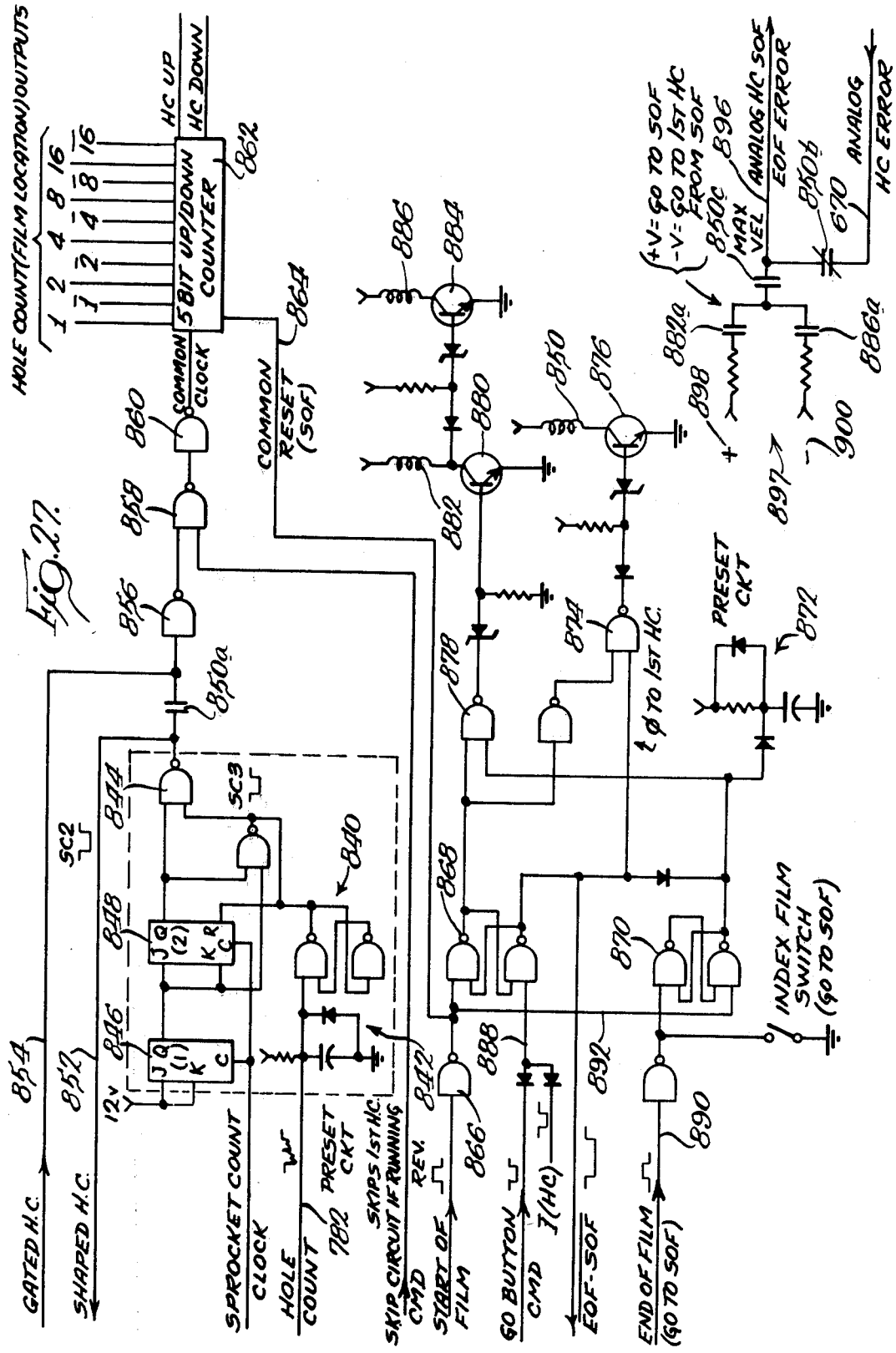
FIG. 27 is a logic diagram showing a hole counter and associated logic.

The manner in which the HOLE COUNT signal issued on the line 782 shown in FIG. 24 is utilized to best be understood in conjunction with the description of FIG. 27. The line 782 is also seen in FIG. 27 as an input to a flip-flop, generally designated 840 and which has connected to its input a presetting circuit, generally designated 842. The purpose of the presetting control 842 is to preset the flip-flop 840 to a predetermined condition when power to the system is initially applied. Other similar circuits are employed elsewhere in the system.

An output from the flip-flop 840 is taken to a gate 844 which has a second input from a pair of JK type flip-flops 846 and 848 which are connected to receive a SPROCKET COUNT CLOCK signal from the gate 828 (FIG. 26). The JK flip-flops 846 and 848 serve as a count by three counter and, in conjunction with the gate 844 insure that the hole count output signal has a duration equal to a period of three sprocket counts.

Figure 21B:
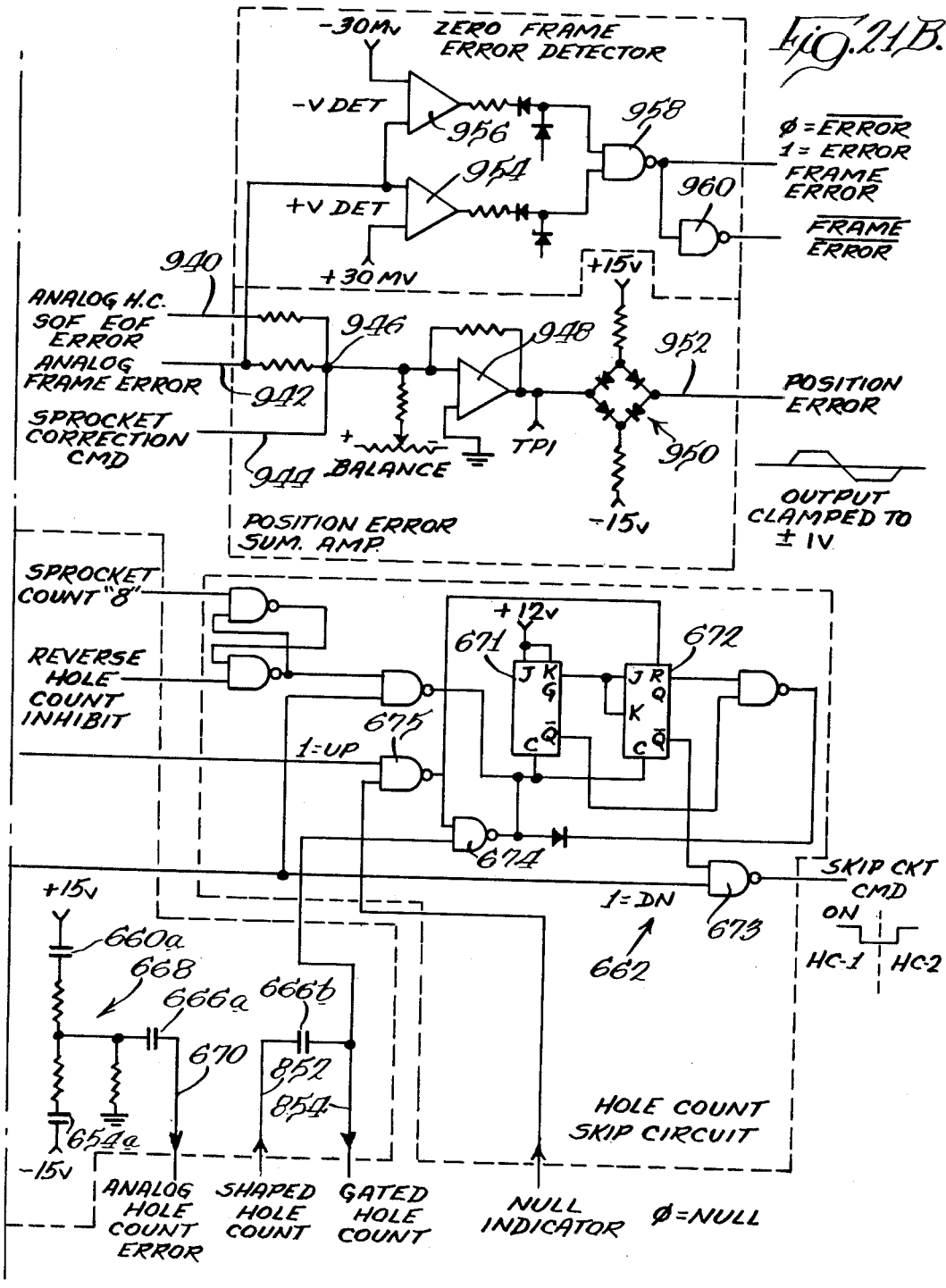

The gate 844 has a first output through normally open contacts 850a operated by a relay 850 and a second output which is issued on a line 852 and which is entitled SHAPED HOLE COUNT OUTPUT. This signal is applied through normally open contacts 666b operated by the relay 666 shown in FIG. 21 to a line 854 shown in FIG. 21B as well as in FIG. 27 and designated GATED HOLE COUNT. The line 854 is connected to the opposite side of the normally open contacts 850a and to the input of an inverting gate 856 which in turn feeds a gate 858. The gate 858 includes a second input designated SKIP CIRCUIT COMMAND and received from the skip circuit logic 662 shown in FIG. 21. The arrangement is such that when the skip circuit input is operative, the gate 858 is inhibited so that hole count pulses will not pass therethrough.

The output of the gate 858 is fed through a driver 860 to a five bit bidirectional counter 862. The counter 862 is the hole counter and has the designated outputs which are fed to the hole acquisition logic shown in FIGS. 19A and 20.

The counter 862 also includes inputs for a HOLE COUNT UP signal and a HOLE COUNT DOWN signal which are received from the corresponding outputs illustrated in FIG. 21 so as to enable the counter 862 to count either up or down depending upon whether the projector is commanded to run up or down.

Finally, the counter 862 includes a reset input on a line 864 which resets the counter whenever the film is run to the start of film position.

The reset line 864 is connected to the output of the driver 866 which is adapted to receive a start of film signal from the logic illustrated in FIG. 24 for the purpose of setting a flip-flop 868 and for resetting a flip-flop 870. Both of the flip-flops 868 and 870 are connected to a presetting circuit 872 which is for the same purpose as the presetting circuit 842 and which is operative, upon the application of power to the unit, to set the flip-flop 870 and reset the flip-flop 868.

One output of the flip-flop 868 is fed ultimately to a gate 874 which performs an OR function and which in turn drives a transistor 876 having a relay coil 850 in its emitter-collector circuit. The output of the flip-flop 868 is also fed to a gate 878 which in turn drives a transistor 880 having a relay coil 882 in its emitter-collector circuit. Interposed between the relay coil 882 and the transistor 880 is a connection to the base of a transistor 884 having a relay coil 886 in its emitter-collector circuit.

The flip-flop 868 further includes resetting inputs on a line 888 on which may be impressed a GO BUTTON COMMAND signal or a 1 hole count signal from the hole counter 862. The arrangement is such that whenever a GO BUTTON COMMAND signal or the first bit of the hole counter 862 is set, the flip-flop 868 will be reset.

Turning now to the flip-flop 870, the same includes an input on a line 890 for an END OF FILM signal which may be taken from the logic shown in FIG. 24 to set the flip-flop 870 and a resetting input on a line 892 taken from the output of the driver 886 to reset the flip-flop 870 when a START OF FILM signal is present.

The flip-flop 870 issues outputs to both the gates 874 and 878 as well as a NULL INDICATOR INHIBIT signal on an output line 894.

The logic is completed by normally closed contacts 850b operated by the relay 850 and interposed in the line 670 (see also FIG. 21) on which is impressed the ANALOG HOLE COUNT ERROR signal. The side of the contacts 850b opposite the line 670 is connected to a line 896 on which an ANALOG HOLE COUNT ERROR — SOF.EOF signal may be issued to the remainder of the control circuitry as will be seen.

Also connected to the line 896 is a set of normally open contacts 850c operated by the relay coil 850 which is connected to the common junction of a voltage divider network connected to positive source of power as at 898 and to a negative side of power as at 900. The positively connected leg of the voltage divider 897 includes normally open contacts 882a operated by the relay coil 882 while the negatively connected leg of the divider 897 includes normally open contacts 886a operated by the relay coil 886.

The purpose of the foregoing logic is to acquire a proper hole count whenever the hole count is lost as for example when the power to the unit is turned off or, for any other reason. The operation is as follows. When power is reapplied, the presetting circuit 872 will set the flip-flop 870 and reset the flip-flop 868. The outputs of the flip-flop 870 will be applied through the gate 874 to turn on the transistor 876 thereby closing contacts 850c to connect the divider 897 to the line 896 and opening the contacts 850b to disconnect the line 670 from the line 896. The output of the flip-flop 870 will also be applied through the gate 870a to turn on the transistor 870 thereby energizing the relay coil 882. When such occurs, biasing of the transistor 884 is such that it will be turned off.

The energization of the relay coil 882 will cause the contacts 882a in the divider 897 to close and as a result, a positive hole error signal will be applied from the positive source of power 898 through the contacts 882a and the contacts 850c to the line 896 to cause the projector to drive downwardly. The projector will continue to drive downwardly until the START OF FILM signal is received by the gate 866 which will then cause the flip-flop 870 to be reset which will result in the deenergization of the relay coil 882 and the energization of the relay coil 886. However, simultaneously with the resetting of the flip-flop 870, the START OF FILM signal will set the flip-flop 868 to drive, through the gate 874, the transistor 876 insuring the energization of the relay coil 850. At this time, a negative error voltage will be applied to the line 896 through the contacts 868a and the contacts 850c to cause the projector to begin to run up. Simultaneously with the setting of flip-flop 868, the counter 862 will be reset.

When the first hole count pulse is received by the counter 862, the connection of the same to the line 888 will result in the resetting of the flip-flop 868 thereby deenergizing the relay 850 so that the contacts 850c will revert to their normally open condition and the contacts 850b will revert to their normally closed position to respectively disconnect the divider 897 from the line 896 and connect the usual source of hole error signal to the line 896.

During the foregoing, the projector will be run at the maximum velocity attainable. Specifically, the resistances in the legs of the matrix 897 can be chosen so that the maximum permissible error voltages are impressed on the line 896 through the contacts 850c which will then be closed to maximize response when running down to the start of film or when going up to the first hole count from the start of film. Promptly upon the receipt of the first hole count pulse, the resultant deenergization of the relay 850 will result in the contacts 850c opening and the contacts 850b closing to provide a hole error signal generated in the usual manner described previously.

It will also be appreciated that the indexing of the counter 862 to the first hole count will occur if, for any reason, the projector is run upwardly to the point where the END OF FILM signal is generated or if the projector is run downwardly until the START OF FILM signal is generated.

Figure 28:
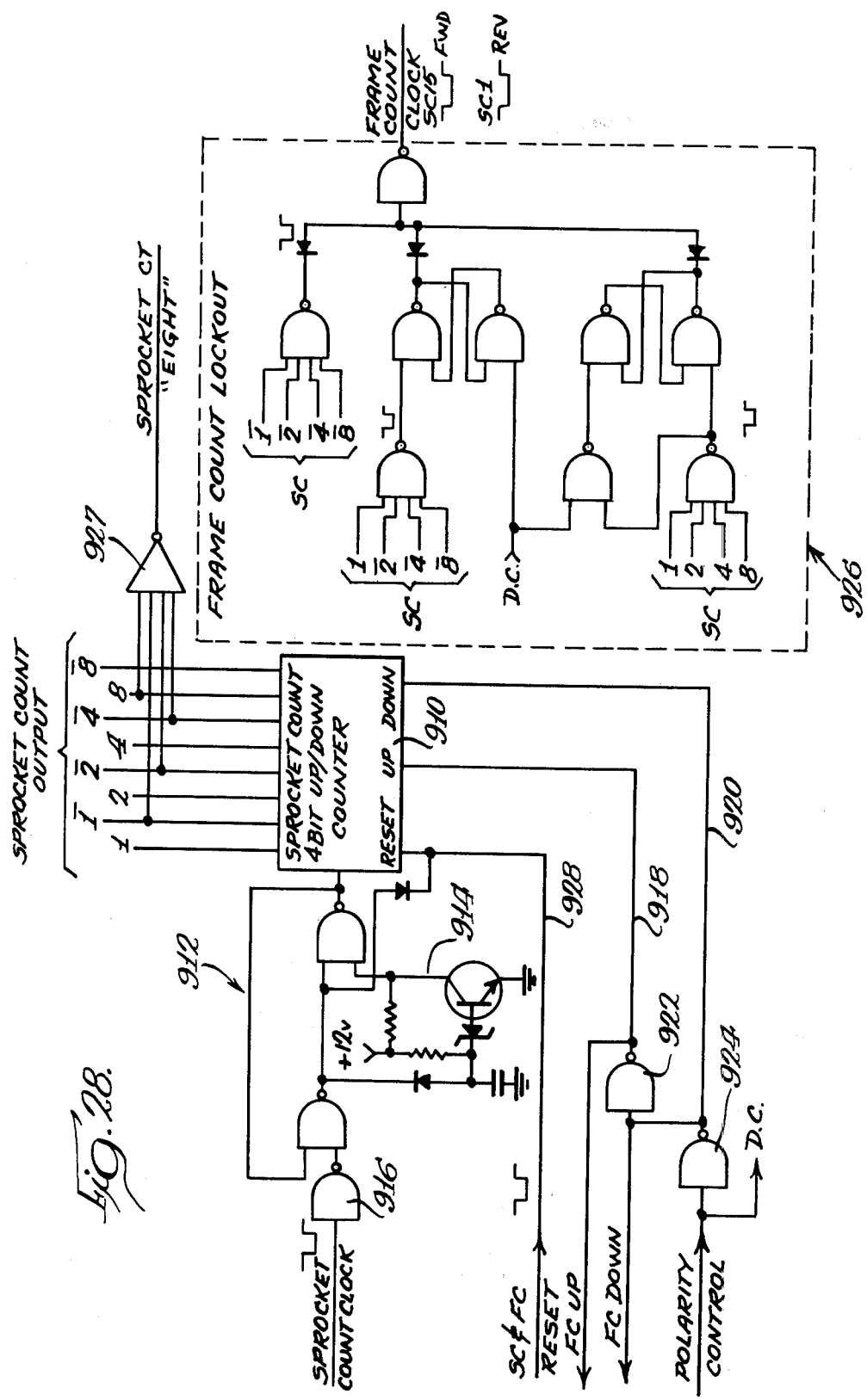
FIG. 28 is a logic diagram showing a sprocket and associated logic.

Referring now to FIG. 28, the sprocket counter is shown as a four bit binary coded, bi-directional counter 910 having the designated outputs and receiving a stepping input from a one-shot 912. Associated with the one-shot 912 is a delay circuit 914 employed to prevent the first sprocket count pulse from passing to the counter 910 until the latter has been commanded to count up or down. The one shot 912 may be driven by the output of a gate 916 which receives the SPROCKET COUNT CLOCK signal generated by the gate 828 in FIG. 26 in the manner mentioned previously.

The counter 910 includes a pair of input lines 918 and 920 which may be respectively energized to inform the counter 910 to count upwardly or downwardly. The line 918 is connected to the output of an inverter 922 which in turn receives its input from an inverter 924 receiving a POLARITY CONTROL signal generated on the line 812 shown in FIG. 26. The line 920 is connected directly to the output of the inverter 924. The output of the inverter 924 is also used to issue a FRAME COUNT DOWN signal while the output of the inverter 922 is also utilized to issue a FRAME COUNT UP signal for use by the frame counter as will be seen.

The logic further includes a frame count clock block, generally designated 926 which is connected to receive the designated outputs from the sprocket counter and issue a FRAME COUNT CLOCK signal to the frame counters will be seen.

The logic within the block 926 is operative to issue the FRAME COUNT CLOCK signal on a sprocket count of 15 when the projector is running upwardly and on a sprocket count of 1 when the projector is running downwardly.

Also provided is a gate 927 connected to the counter outputs to generate a SPROCKET COUNT "EIGHT" signal for use by the skip circuit 662 as mentioned previously.

The logic shown in FIG. 28 is completed by an input line 928 to the counter 910 on which a common reset signal for the sprocket counter and frame counter may be received to reset the counter 910 to all bit zero condition in appropriate circumstances.

Figure 29:
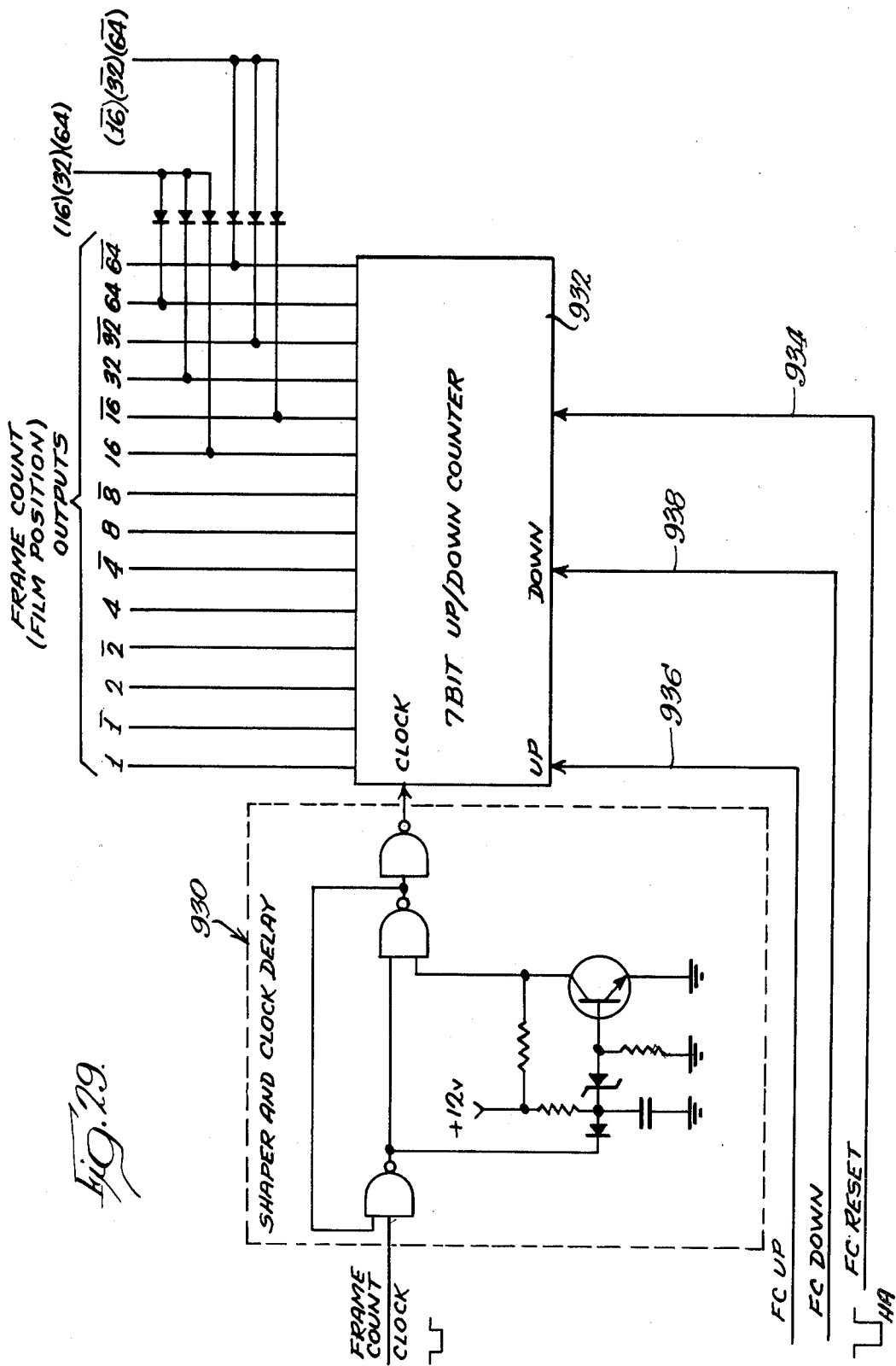
FIG. 29 is a logic diagram showing a frame counter and associated logic.

Turning now to FIG. 29, the frame counter is illustrated in block form at 932 and is seen to comprise a seven bit, binary coded bi-directional counter having the designated outputs. The same is stepped by the output of a one shot including a delay circuit, generally designated 930, which in turn is triggered by a FRAME COUNT CLOCK signal generated by the logic block 926 in FIG. 28 in the manner mentioned previously. The frame counter 932 also includes a reset line 934 on which a common sprocket counter and frame counter reset signal may be received to reset the same to an all bit zero condition as well as up count command line 936 receiving the FRAME COUNT UP signal from the logic shown in FIG. 28; and a count down command line 938 for receiving a FRAME COUNT DOWN signal generated by the logic shown in FIG. 28.

Returning now to FIG. 21, the ANALOG HOLE COUNT SOF.EOF ERROR signal from the line 896 (FIG. 27) is placed on a terminal 940 while an ANALOG FRAME ERROR signal generated by logic shown in FIG. 31A is applied to a terminal 942. Finally, the SPROCKET CORRECTION COMMAND on the line 730 in FIG. 23 is applied to a terminal 944.

The terminals 940, 942 and 944 are connected to a summing junction 946 at the input of a differential amplifier 948 which in turn provides an output signal to a clamping network, generally designated 950. The output from the clamping network 950 is placed on a line 952 and is the position error signal due to all sources of error and is clamped to a low voltage for compatible use in the servo system which includes a velocity loop as will be described in greater detail hereinafter.

The terminal 942 is also connected to differential amplifiers 954 and 956, both of which have their outputs connected as input to a gate 958 performing an OR function. The amplifier 954 has another input connected to a positive source of an extremely low voltage while the amplifier 956 has a second input connected to a negative source of an extremely low voltage. The arrangement is such that whenever a frame error exists, one of the amplifiers 954 and 956 will drive the gate 958 to cause the latter to issue a FRAME ERROR signal. However, when the frame error on the terminal 942 is extremely low and indicative of the fact that the selected frame is substantially within the projection station, neither one of the amplifiers 954 and 956 will drive the gate 958 so that the frame error signal will not be present. The output of the gate 958 is also taken through an inverter 960 which will issue a signal opposite of the polarity to the frame error signal and which is designated $\overline{\text{FRAME ERROR}}$ for use elsewhere in the system.

Figure 30:
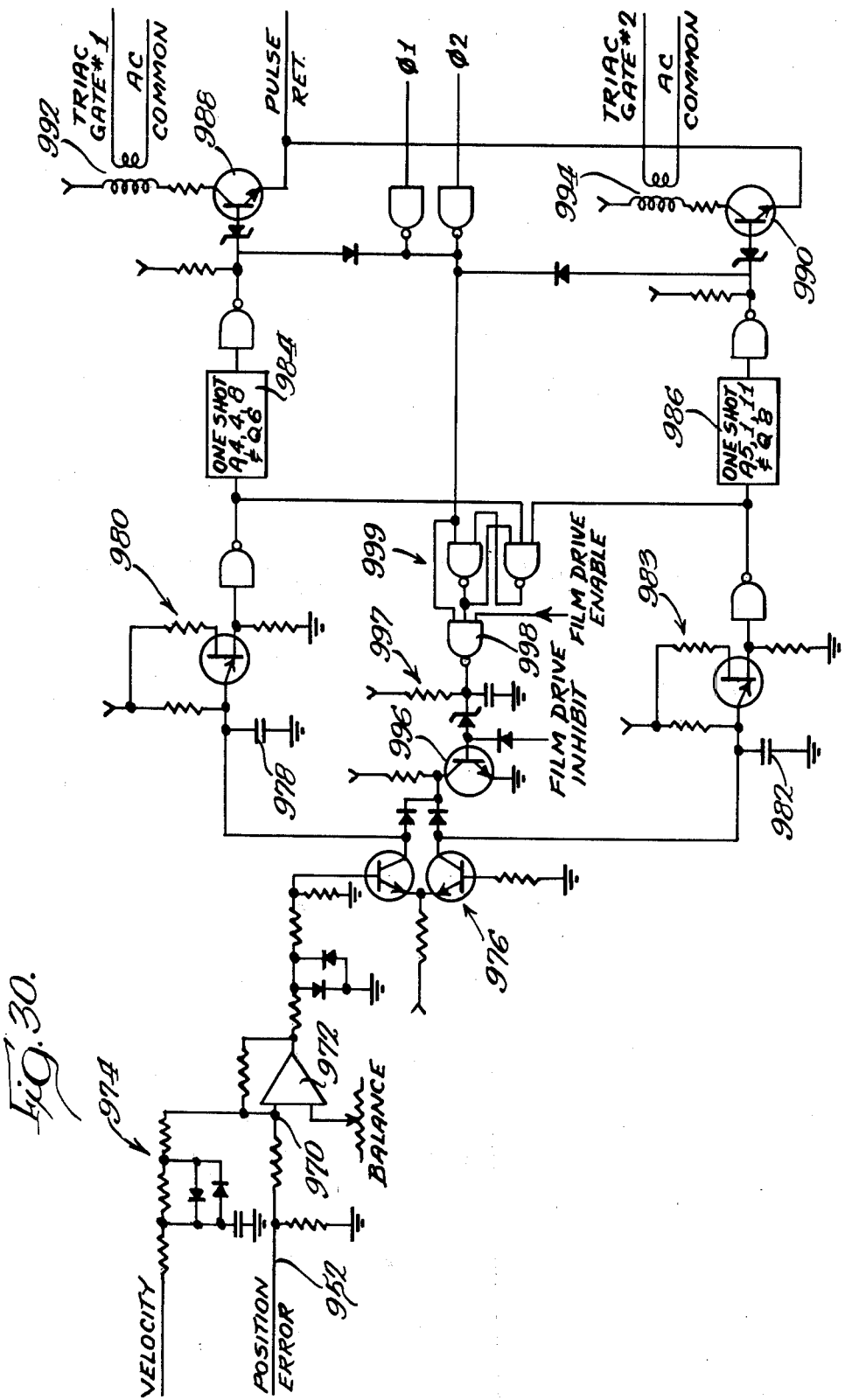
FIG. 30 is schematic illustrating a film drive motor control circuit.

Turning now to FIG. 30, the position error signal from the line 952 is fed to a summing junction 970 at the input to a differential amplifier 972. Also connected to the summing junction 970 is an RC circuit, generally designated 974 and which has an input connected to receive the VELOCITY signal from the logic block 806 illustrated in FIG. 26. The RC circuit 974 converts the string of velocity rate pulses to a constant level voltage whose magnitude is inversely proportional to the actual velocity and whose polarity is dependent upon whether the system is running up or running down. As a result, the differential amplifier 972 has an input representative of the total error signal due to both position and velocity error. The output of the differential amplifier is in turn connected to a two transistor switching circuit, generally designated 976 with one of the transistors in the circuit 976 being operative to regulate the rate of discharge of a capacitor 978 in a conventional relaxation amplifier circuit 980 and the other transistor in the circuit 976 being operative to regulate the rate of discharge of a capacitor 982 in a second conventional relaxation oscillator circuit 983.

The relaxation oscillator circuits 980 and 983 trigger corresponding one-shots 984 and 986 respectively which in turn are operative to drive respective switching transistors 988 and 990 respectively. Included in the emitter-collector circuit of the transistor 988 is one coil of a pulse transformer 992 while one coil of a pulse transformer 994 is included in the emitter-collector circuit of the transistor 990. The other coil of the transformers 992 and 994 are connected to conventional triac circuits which are operative to control the application of power to corresponding windings in the film drive motor 232.

As a result, depending upon the magnitude and the polarity of the total error signal present at the summing junction 970, one or the other of the one-shots 984 and 986 will be triggered at the varying rate dependent upon the magnitude of the total error signal to cause energization of a corresponding winding in the motor in a manner well-known. Of course, only one winding will be energized at any given point with the particular winding energized controlling the direction of rotation of the motor.

Both of the relaxation oscillator circuits 980 and 983 may be disabled through the action of a transistor 966 to insure complete deenergization of the film drive motor 232. Specifically, the collector of the transistor is connected through diodes to one side of each of the capacitors 978 and 982 in the oscillator circuits 980 and 983, respectively. The emitter of the transistor 966 is grounded and as a result, when the transistor 996 is turned on, both of the capacitors 978 and 982 are precluded from charging so that their respective oscillator circuits cannot trigger the respective one-shots 984 and 986.

The transistor 996 may be turned on by a FILM DRIVE INHIBIT signal generated in a manner to be seen when there is a malfunction or when the mechanical frame positioning mode is initiated by the lock motor 176. The transistor 996 further will normally be biased on by a a circuit 997 connected to a positive source of power even when the FILM DRIVE INHIBIT signal is not present. However, the bias provided by the circuit 997 may be overcome by the output of a gate 998 when the same receives a FILM DRIVE ENABLE signal from one of the switches 182 when the cam shaft 156 has been rotated to its fully unlocked position so that the cams thereon no longer engage their respective cam followers.

Even though the receipt of the FILM DRIVE ENABLE signal by the gate 998 will bias the transistor 996 off, the circuit is such that the issuance of a FILM DRIVE INHIBIT signal will override the output of the gate 998 to turn on the transistor 996 and shut down the system in the event of a malfunction.

The circuitry is completed by a flip-flop 999 in an interlock circuit connected to the outputs of both oscillators 980 and 983 and which is operative to disable the gate 998 regardless of whether the same is receiving the FILM DRIVE ENABLE signal if both oscillators are in operation. Should this occur, the circuit 997 will turn on the transistor 996 to shut down the system, since, obviously, upon such an occurrence, the drive motor 232 would be commanded to drive in opposite directions simultaneously.

The just described construction provides maximum system response to a scene change. When the initial position error is received on the line 952, velocity will be at a minimum and as a result, a very large total error signal will be present at the summing point 970 to provide maximum driving power to the drive motor for a fast startup. As the system picks up speed, the velocity erroor will decrease while the position error will remain relatively constant if a change from one hole to another is required. As a result as the system reaches full speed, the total power applied to the drive motor will drop off to a level required merely to maintain full speed. When the correct hole is acquired, the position error due to hole error will drop out and the position error will gradually decrease as the selected frame is approached. At this point, movement of the system will begin to slow somewhat but in view of the decreasing velocity, an increased velocity error will result so that the total error will tend to keep the system in operation at as fast a speed as possible without permitting overshoot when the commanded frame is in projection station. It will also be recalled that the position error is clamped to a desired voltage so that for large errors, the position error signal will be clamped at a constant level until the commanded scene is relatively close to the projection station, at which time the position error will drop below the clamping level. Only then will the position error signal begin to vary according to the magnitude of the actual position error so that velocity is at a maximum at all times except when position error is relatively small.

Figure 31B:
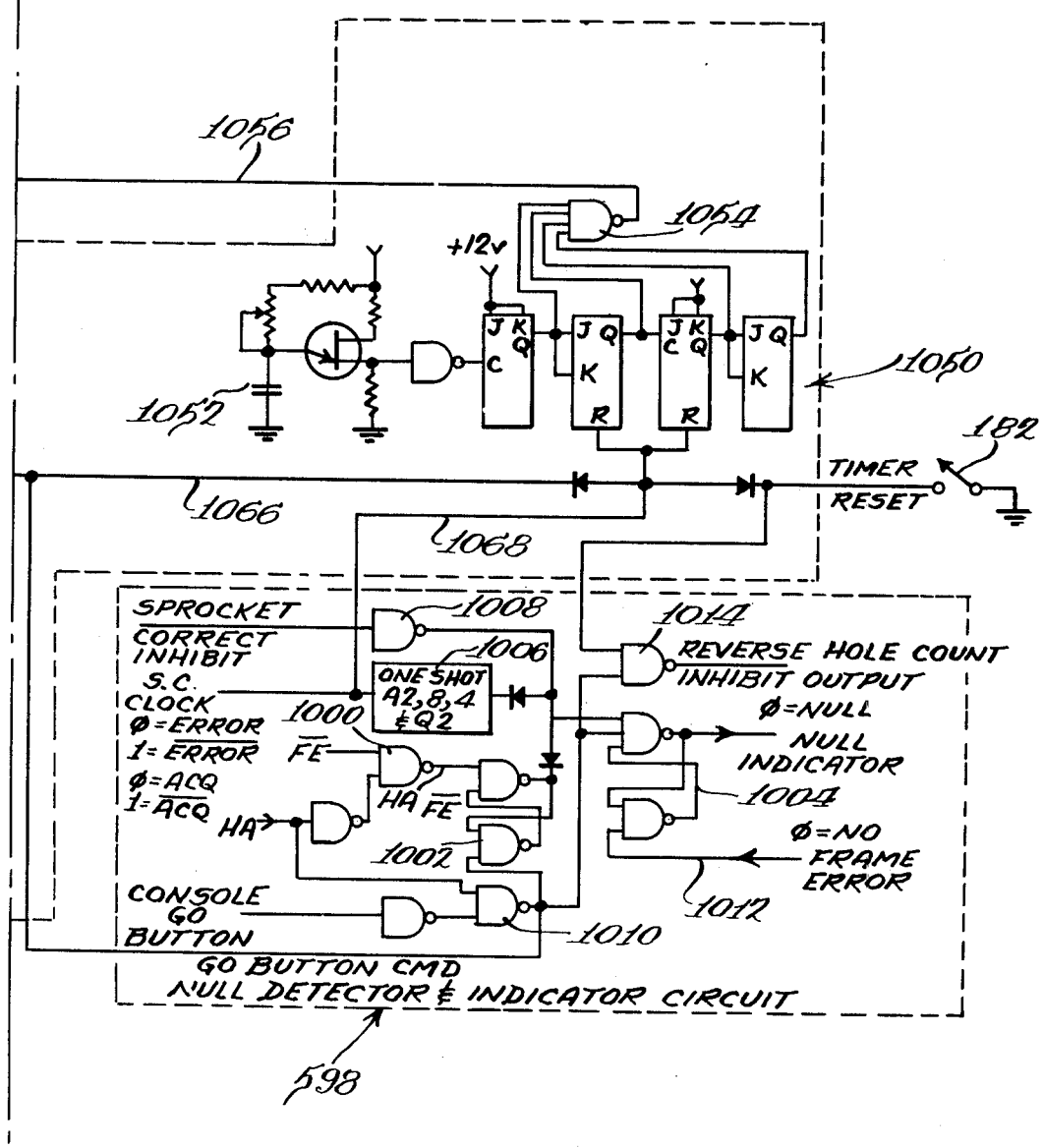
FIG. 31 is comprised of FIGS. 31a and 31b with 31b to be located to the right of FIG. 31a and illustrates a null indicator as well as circuitry for switching the display to an advertising scene when a selection has not been made for a predetermined time.

Turning now to FIGS. 31A and 31B, the null indicator 598 will be described. Included is a gate 1000 having its output connected to a flip-flop 1002. One input to the gate 1000 is a FRAME ERROR signal generated in FIG. 21 in the manner mentioned previously while a second is an INVERTED HOLE ACQUISITION signal. The gate 1000 is thus enabled when there is no frame error and the commanded hole has been acquired to set the flip-flop 1002. The flip-flop 1002 is connected to a flip-flop 1004 which serves as the null indicator and issues a NULL INDICATOR signal when null is achieved. The second input to the flip-flop 1004 is taken from a one-shot 1006 which in turn may be triggered by the SPROCKET COUNT CLOCK signal. An additional input to the flip-flop 1004 is taken from a gate 1008 which may receive a SPROCKET CORRECTOR INHIBIT signal from the sprocket corrector (FIG. 23). The total arrangement is such that flip-flop 1004 can only be set to indicate a null condition when no sprocket correction signal is present requiring sprocket adjustment, no sprocket count clock pulses are present, the proper hole has been acquired, and there is no frame error.

The null detector and indicator circuit 598 further includes a gate 1010 which is connected to receive a HOLE ACQUISITION signal and an inverted CONSOLE GO BUTTON signal and reset both the flip-flops 1002 and 1004 when both are present. That is, after a null has been achieved, a HOLE ACQUISITION signal will be present since the commanded hole had to be acquired to achieve a null and when, for the next scene selection cycle, a golfer pushes his go button, the CONSOLE GO BUTTON signal will be issued and both of the flip-flops 1002 and 1004 will be reset.

The output of the gate 1010 is also employed to issue a GO BUTTON COMMAND which is used elsewhere in the system as indicated.

An input line 1012 connected to receive a FRAME ERROR signal from the gate 958 (FIG. 21b) is also provided to issue a reset command to the null indicator flip-flop 1004 when a frame error suddenly comes into existence due to automatic operation of the circuit mentioned generally previously for switching to a scene bearing relatively unimportant information such as an advertising scene.

Finally, there is provided a gate 1014 which may issue a REVERSE HOLE COUNT INHIBIT signal to the skip circuit for the purposes mentioned previously.

FIG. 31a also illustrates the resetting, timing and shaping circuit for the frame and sprocket counters. Specifically, there is provided an output line 1020 on which may be issued a FRAME AND SPROCKET COUNTER RESET signal to the line 928 for the sprocket counter shown in FIG. 28 and line 934 for the frame counter shown in FIG. 29. The line 1020 is connected to the emitter-collector ciruit of a transistor 1022 to issue the signal whenever the transistor 1022 conducts. The base of the transistor 1022 is connected to the output of a one-shot, generally designated 1024 which may be tripped by the output of a NAND gate 1026 which acts as an AND gate for a HOLE COUNT signal and a HOLE ACQUISITION signal.

More specifically, one input to the gate 1026 is taken from a flip-flop 1028 having one input lead receiving a HOLE COUNT signal. When the HOLE COUNT signal is received, the flip-flop 1028 is set to provide one enabling input to the gate 1026. The gate 1026 receives a second input from an inverter 1030 which is connected to receive a HOLE ACQUISITION signal, which signal is also fed to the flip-flop 1028 to reset the same.

In operation, the first time a hole count signal is received, the flip-flop 1028 is set thereby providing one enabling input to the gate 1026. When the HOLE ACQUISITION signal is generated, momentarily, the second enabling input is placed on the gate 1026 which then trips the one shot 1024 to momentarily drive the transistor 1022 and issue the reset signal on the line 1020. Virtually simultaneously therewith, the flip-flop 1028 is reset thereby removing one enabling signal from the gate 1026 to terminate any further operation of the circuit.

It will therefore be seen that when the no HOLE COUNT signal is generated indicating that the projector is seeking a new frame within the already selected hole, there would be no resetting of the sprocket counter for the frame counter as is proper. That is, since the counters already contain the correct frame and sprocket information relative to that hole, that information should not be obliterated at this time. It will also be appreciated that if a new hole is being sought, there is no need for frame or sprocket error signals, the hole error signal being sufficient to appropriately drive the system to hole acquisition and the information contained in the frame and sprocket counters is irrelevant until the correct hole is acquired. Thus, the frame and sprocket counters may only be reset upon hole acquisition and after a new hole is selected as evidenced by the generation of one or more HOLE COUNT signals.

FIGS. 31a and b also illustrate circuitry for directing the projector to select a so-called advertising scene when a selection has not been made for a predetermined time so that the information bearing scenes will not be subjected to fading by being positioned in the projection station for a prolonged period. That is, only a so-called advertising scene or a scene of relatively little importance will be subjected to fading by prolonged positioning in the projection station. Referring to FIG. 31a, an input line 712 extending from the digital to analog converter 680 shown in FIGS. 22a and 22b is gated through normally open contacts 1040a operated by a relay 1140. The other side of the contacts 1040a is connected to the line 714 to return to the differential amplifier 716 shown in FIG. 22b which issues the ANALOG FRAME ERROR signal. Thus, whenever the contacts 1040a are closed, there will be a direct connection between the lines 712 and 714 and the frame error as determined by the digital to analog converter 680 will be applied to the amplifier 716.

Connected to the junction of the line 714 and the contacts 1040a is a set of normally open contacts 1042a operated by a relay 1042 and interposed between appropriately selected resistors 1044 and a positive source of power.

Therefore, when the contacts 1042a are closed and if the contact 1040a are open, an artificial frame position signal will be fed to the summing junction 717 on the input of the amplifier 716. By appropriately selecting the resistors 1044, the position of the so-called advertising frame may be commanded.

The relays 1040 and 1042 are in the emitter collector circuits of respective transistors 1046 and 1048 which are interconnected so that only one of the transistors 1046 and 1048 is conducting at any given time. A portion of the control circuit for the transistors 1046 and 1048 is shown in FIG. 31B and is seen to comprise a four bit binary counter composed of JK flip-flops and designated 1050. The input to the counter 1050 is provided by a unijunction timing circuit 1052 of conventional construction and which is designed to issue pulses to the counter 1050 intermittently over periods of long duration. For example, according to one embodiment, the resistors and the capacitor in the unijunction timing circuit 1052 are selected so that a pulse is issued every thirty seconds. In such a case, after seven and one-half minutes all bits will be of the counter 1050 will be set and this condition will be noted by a NAND gate 1054 operating as an AND gate which will issue a signal on line 1056 to the circuit including the transistor 1046 and 1048.

The line 1056 is connected to the base of the transistor 1046 and when all bits of the counter 1050 are set, the same is operative to turn off the transistor 1046 and thus deenergize the relay 1040. The line 1056 is also connected as an input to one side of a flip-flop 1058 to set the same which will result in the turning on of the transistor 1048 and the energization of the relay 1042. The other section of flip-flop 1058 is also connected to the base of the transistor 1048 and as a result, whenever the flip-flop 1058 is set, the relay 1040 will be maintained deenergized even though the condition of the counter 1050 may subsequently change. A line 1060 receiving an ADVERTISING ENABLE COMMAND signal from logic illustrated in FIG. 22b is also connected to the output of the first mentioned section of the flip-flop 1058 and to the input of the other section of the flip-flop 1058 to prevent the flip-flop 1058 from being set by the counter 1050 except when the ADVERTISING ENABLE COMMAND signal is present.

The circuit further includes an input to the first mentioned section of the flip-flop 1058 from a flip-flop 1062 which in turn may be set by the output of a gate 1064. The gate 1064 includes inputs for receiving a FRAME ERROR signal, a DIRECTION CONTROL UP signal, HOLE COUNT signals and a HOLE ACQUISITION signal. Those skilled in the art will recognize that this circuitry ultimately causes the energization of the relay coil 1042 whenever a frame error exists that is greater than any frame error possible exists. For example, if the number of frames for a given hole were to equal 60 and a frame error signal resulting from selection of a 70th frame were to exist, the aforementioned circuitry would automatically cause the projector to proceed to an advertising frame. Specifically, the existence of a frame error while the projector is running up when a hole count pulse is received is sensed to cause the above operation.

Resetting of the system from the advertising mode to the normal mode is accomplished in the following manner. A line 1066 is connected to one side of the flip-flop 1058 through a diode and to the output of the gate 1010. When the previously mentioned condition at the gate 1010 results in the same issuing GO BUTTON COMMAND signal, the flip-flop 1058 will be reset thereby turning off the relay 1042 and energizing the relay 1040. In other words, as soon as a golfer makes a new selection and pushes his go button, the projector will leave the advertising mode.

It is also to be noted that the same signal placed on line 1066 causing resetting of the flip-flop 1058 is passed to the counter 1050 to reset the same.

The counter 1050 may also be reset in other ways. For example, one of the switches 182 which is closed when the cam shaft is moved to an unlocked position indicating that a scene change is in process will reset the counter 1050 for the entire period that the cam shaft is unlocked. Also, by means of a line 1068 receiving sprocket count clock pulses, the counter 1050 may be reset. In other words, whenever the projector is in motion, the issuance of sprocket count clock signals will hold the counter 1050 in a reset position.

Of course, after a scene selection cycle has been completed and if no further go button command is issued within the selected period, the counter 1050 will ultimately time out to cause the system to revert to the advertising mode.

Turning now to FIG. 32, the NULL INDICATOR signal is employed as an input to a transistor 1120 as well as to an inverter 1122. The transistor 1120 drives a thirty microsecond delay circuit 1124 which, after its time constant has elapsed, is adapted to set a flip-flop 1126. That is, when the null indicator provides a signal having a polarity indicating that null has been achieved, after a short delay, the flip-flop 1126 will be set.

The inverter 1122 is also connected to the flip-flop 1126 when the null indicator signal is of a polarity such as to indicate null has not been achieved, the same will reset the flip-flop 1126.

The flip-flop 1126, when indicating a null, drives a gate 1128 to issue an INHIBIT FILM DRIVE signal to the transistor 998 in FIG. 30. The flip-flop 1126 also drives a pair of gates 1130 and 1132 with the former issuing a LOCK COMMAND to the motor 176 (FIG. 4) to drive the cam shaft 156 to cam the film into the proper position while the latter is operative to deliver an UNLOCK COMMAND whenever the lock command is not present to reverse the action of the motor 176.

FIG. 32 also illustrates various logic employed for safety purposes to cause the gate 1128 to issue a FILM DRIVE INHIBIT signal at times other than when null is achieved. For example, a gate 1134 is also connected to receive the null indicator signal as well as an input from one of the switches 182 (FIG. 4) associated with the cam shaft which will provide an appropriate signal to the gate 1134 when the cam shaft is in a fully unlocked position. The gate 1134 is connected to a transistor 1136 as is a VELOCITY RATE signal taken from the logic illustrated in FIG. 26. The transistor 1136 in turn shunts a capacitor in a unijunction transistor timing circuit, generally designated 1138, which in turn may drive a flip-flop 1140. The arrangement is such that when there is no null indication, the cam shaft is in a fully unlocked position and there is no velocity rate signal, the transistor 1136 will be turned off to initiate the period of the unijunction transistor timing circuit 1138. Upon the expiration of the period, the condition of the flip-flop 1140 is changed and an output therefrom to the gate 1128 will cause the FILM DRIVE INHIBIT signal to be issued. This safety feature is designed to prevent continued energization of the film drive motor when a null indication is not present but when the gear mechanism is not in operation due to mechanical failure or the like.

A second input to the flip-flop 1140 is taken from a flip-flop 1142 which can receive inputs on a line 1144 from reed switches 415 associated with the dancer arms 400 (FIG. 2). It will be recalled from the description of the dancer arms, that they are normally biased towards a predetermined position and will normally operate at a second position, away from the position to which they are biased. However, when the film breaks, one or both dancer arm assemblies will be free to move to the position to which they are biased and will trip the reed switches 415 to issue a signal on the line 1144 to the flip-flop 1142 to ultimately cause the FILM DRIVE INHIBIT signal to be issued by the gate 1128.

Still another logic circuit for causing the FILM DRIVE INHIBIT signal to be issued by the gate 1128 includes a pair of gates 1146 and 1148 receiving the inputs designated and connected as an input to the flip-flop 1140. The gate 1146 is operative to cause the INHIBIT FILM DRIVE signal to be issued if a START OF FILM signal is received when the projector is running up while the gate 1148 is operative to provide the same occurrence if an END OF FILM signal is received when the projector is running down.

Finally, a manually operable push button switch 1150 is provided to reset the flip-flops 1140 and 1142 and will normally be operated by a mechanic or the like after checking out a shut-down and repairing the cause of the same.

We claim:

1. A film searching apparatus for searching desired information from a film which is provided with many kinds of information and search marks thereon, a search mark being provided for at least one of a series of associated information groups on the film comprising:
  (a) feed means for transporting the film;
  (b) light source means for irradiating said search mark;
  (c) mark detection means for receiving a flux of light projected on the search mark to generate a detection signal;
  (d) pulse generating means operated in cooperation with said feed means for generating a pulse signal in response to the feed of film;
  (e) gate means for receiving said detection signal and said pulse signal and selectively passing either one of said signals;
  (f) counter means for counting signals passed through said gate means and generating a control signal upon a count of a predetermined value;
  (g) gate control means responsive to said control signal for controlling the selection of the signal to be passed through said gate means; and
  (h) transport control means for controlling the film feed of said feed means in response to said control signal.

2. A film searching apparatus according to claim 1, characterized in that said gate means comprises a plurality of gate circuits, and said gate control means comprises flip-flop circuits, said flip-flop circuits opening and closing each of the gate circuits so that said counter means may count pulse signals when a predetermined number of detection signals is counted.

3. A film searching apparatus according to claim 1, further comprising means for changing over the searching of film provided with search marks to the searching of film not provided with a search mark.

4. A film searching apparatus according to claim 3, characterized in that said change-over means comprises a first gate circuit for receiving a pulse signal, a second gate circuit for receiving a mark detection signal and a switch for selectively opening and closing said first and second gate circuits, the searching by search marks and the searching by the length of film feed being changed over by said switch.

5. A film searching apparatus according to claim 1, further comprising cut-off means for cutting off a detection signal from said mark detection means until the first search mark placed on the film reaches said mark detection means.

6. A film searching apparatus according to claim 5, characterized in that said signal cut-off means comprises a gate circuit for receiving a detection signal, a counter for counting pulse signals from said pulse generating means, and flip-flop circuits for opening said gate circuit when the counted valve in the counter reaches a predetermined value.

7. A film searching apparatus for searching desired information from a film which is provided with many kinds of information and search marks thereon, a search mark being provided for at least one of a series of associated information groups groups on the film comprising:
  (a) feed means for transporting the film;
  (b) light source means for irradiating said search mark;
  (c) mark detection means for receiving a flux of light projected on the search mark to generate a detection signal;
  (d) pulse generating means operated in cooperation with said feed means for generating a pulse signal in response to the feed of film;
  (e) gate means for receiving said detection signal and said pulse signal and selectively using either one of said signals;
  (f) counter means for counting signals used by said gate means and generating a control signal upon a count of a predetermined value;
  (g) gate control means responsive to said control signal for controlling the selection of the signal to be passed through said gate means; and
  (h) transport control means for controlling the film feed of said feed means in response to said control signal.

* * * * *

UNITED STATES PATENT AND TRADEMARK OFFICE
CERTIFICATE OF CORRECTION

PATENT NO. : 4,195,920
DATED : April 1, 1980
INVENTOR(S) : Jack A. Russell et al.

It is certified that error appears in the above—identified patent and that said Letters Patent is hereby corrected as shown below:

Claim 7, line 5, delete "groups", second occurrence.

*Signed and Sealed this*

*Fifth* Day of *August 1980*

[SEAL]

*Attest:*

SIDNEY A. DIAMOND

*Attesting Officer*     *Commissioner of Patents and Trademarks*